(12) United States Patent
Levien et al.

(10) Patent No.: US 8,918,861 B2
(45) Date of Patent: *Dec. 23, 2014

(54) MARKING ONE OR MORE ITEMS IN RESPONSE TO DETERMINING DEVICE TRANSFER

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/374,213

(22) Filed: Dec. 14, 2011

(65) Prior Publication Data
US 2012/0249414 A1 Oct. 4, 2012

Related U.S. Application Data

(63) Continuation-in-part of application No. 13/065,885, filed on Mar. 30, 2011, and a continuation-in-part of

Related U.S. Application Data

(51) Int. Cl.
*G06F 21/00* (2013.01)
*H04W 4/02* (2009.01)
*G06F 21/60* (2013.01)
*G06F 21/62* (2013.01)
*H04L 29/06* (2006.01)
*H04L 29/08* (2006.01)
*G06F 1/16* (2006.01)
*G06F 21/12* (2013.01)

(52) U.S. Cl.
CPC .............. *H04W 4/023* (2013.01); *G06F 21/121* (2013.01); *G06F 2221/2141* (2013.01); *G06F 21/60* (2013.01); *G06F 21/62* (2013.01); *H04L 63/105* (2013.01); *G06F 21/12* (2013.01); *H04L 67/06* (2013.01); *G06F 1/1694* (2013.01); *G06F 1/1698* (2013.01)
USPC .............. 726/16; 726/1; 726/2; 726/3; 726/4; 726/17; 726/26; 726/27; 726/28; 726/29; 726/30; 713/164; 713/165; 713/166; 713/167; 713/182; 713/183; 713/184; 713/185; 713/186; 455/403; 455/404.2; 455/410; 455/411; 455/456.1; 455/456.2; 455/456.3; 455/463; 455/26.1

(58) Field of Classification Search
CPC .......... H04L 63/08; H04L 63/10; H04L 9/32; G06F 21/60; G06F 21/62; G06F 2221/211; G06F 2221/214; G06F 21/12
USPC .......... 726/1–4, 16–17, 26–30; 713/164–167, 713/182–186; 455/403–404.2, 410–411, 455/456.1–456.3, 463, 26.1
See application file for complete search history.

(56) References Cited

U.S. PATENT DOCUMENTS 5,875,257 A 2/1999 Marrin et al.
6,002,427 A 12/1999 Kipust
(Continued)

OTHER PUBLICATIONS

U.S. Appl. No. 13/374,479, Levien et al.
(Continued)

*Primary Examiner* — Madhuri Herzog

(57) ABSTRACT

A computationally implemented method includes, but is not limited to: determining that a computing device that was presenting one or more portions of one or more items and that was in possession of a first user has been transferred from the first user to a second user; and marking, in response to said determining, the one or more portions of the one or more items to facilitate the computing device in returning to the one or more portions upon the computing device being at least transferred back to the first user. In addition to the foregoing, other method aspects are described in the claims, drawings, and text forming a part of the present disclosure.

50 Claims, 26 Drawing Sheets

Related U.S. Application Data application No. 13/065,964, filed on Mar. 31, 2011, and a continuation-in-part of application No. 13/066,848, filed on Apr. 25, 2011, and a continuation-in-part of application No. 13/066,917, filed on Apr. 26, 2011, and a continuation-in-part of application No. 13/135,314, filed on Jun. 29, 2011, and a continuation-in-part of application No. 13/135,392, filed on Jun. 30, 2011, and a continuation-in-part of application No. 13/199,237, filed on Aug. 22, 2011, and a continuation-in-part of application No. 13/199,286, filed on Aug. 23, 2011, and a continuation-in-part of application No. 13/200,743, filed on Sep. 28, 2011, and a continuation-in-part of application No. 13/200,800, filed on Sep. 29, 2011, and a continuation-in-part of application No. 13/317,827, filed on Oct. 27, 2011, and a continuation-in-part of application No. 13/317,832, filed on Oct. 28, 2011, and a continuation-in-part of application No. 13/373,679, filed on Nov. 23, 2011, and a continuation-in-part of application No. 13/373,796, filed on Nov. 29, 2011, now Pat. No. 8,726,366, and a continuation of application No. 13/374,083, filed on Dec. 8, 2011, now Pat. No. 8,739,275.

(56) References Cited

U.S. PATENT DOCUMENTS

| | | | |
|---|---|---|---|
| 6,128,003 A | 10/2000 | Smith et al. | |
| 6,961,912 B2 | 11/2005 | Aoki et al. | |
| 7,190,351 B1 | 3/2007 | Goren | |
| 7,200,248 B2 | 4/2007 | Horiguchi | |
| 7,236,156 B2 * | 6/2007 | Liberty et al. | 345/158 |
| 7,260,726 B1 | 8/2007 | Doe et al. | |
| 7,437,765 B2 | 10/2008 | Elms et al. | |
| 7,649,444 B1 | 1/2010 | Fear et al. | |
| 7,774,486 B2 | 8/2010 | Clarke | |
| 7,868,778 B2 | 1/2011 | Kenwright | |
| 8,279,242 B2 * | 10/2012 | Bentley | 345/672 |
| 8,289,130 B2 | 10/2012 | Nakajima et al. | |
| 8,406,162 B2 | 3/2013 | Haupt et al. | |
| 8,479,122 B2 | 7/2013 | Hotelling et al. | |
| 2002/0126876 A1 | 9/2002 | Paul et al. | |
| 2002/0176603 A1 | 11/2002 | Bauer et al. | |
| 2003/0016253 A1 | 1/2003 | Aoki et al. | |
| 2003/0107584 A1 | 6/2003 | Clapper | |
| 2005/0039027 A1 | 2/2005 | Shapiro | |
| 2005/0149726 A1 | 7/2005 | Joshi et al. | |
| 2006/0052132 A1 | 3/2006 | Naukkarinen et al. | |
| 2006/0277474 A1 | 12/2006 | Robarts et al. | |
| 2007/0005616 A1 | 1/2007 | Hay et al. | |
| 2007/0030824 A1 | 2/2007 | Ribaudo et al. | |
| 2007/0042714 A1 | 2/2007 | Ayed | |
| 2007/0052672 A1 | 3/2007 | Ritter et al. | |
| 2007/0118604 A1 | 5/2007 | Costa Requena | |
| 2007/0150827 A1 | 6/2007 | Singh et al. | |
| 2007/0162574 A1 | 7/2007 | Williamson et al. | |
| 2007/0174633 A1 | 7/2007 | Draper et al. | |
| 2007/0222771 A1 | 9/2007 | Brask et al. | |
| 2007/0234209 A1 | 10/2007 | Williams | |
| 2007/0247425 A1 * | 10/2007 | Liberty et al. | 345/158 |
| 2007/0259685 A1 * | 11/2007 | Engblom et al. | 455/550.1 |
| 2008/0159496 A1 | 7/2008 | Brown | |
| 2008/0201783 A1 | 8/2008 | Tamai | |
| 2008/0233996 A1 | 9/2008 | Ogasawara et al. | |
| 2008/0266089 A1 * | 10/2008 | Haren et al. | 340/568.1 |
| 2008/0271109 A1 | 10/2008 | Singh et al. | |
| 2009/0005079 A1 | 1/2009 | Shields et al. | |
| 2009/0006962 A1 | 1/2009 | Ives et al. | |
| 2009/0015425 A1 | 1/2009 | Palmqvist et al. | |
| 2009/0179765 A1 | 7/2009 | Nymark et al. | |
| 2009/0210932 A1 | 8/2009 | Balakrishnan et al. | |
| 2009/0239587 A1 | 9/2009 | Negron et al. | |
| 2009/0240569 A1 | 9/2009 | Ramer et al. | |
| 2009/0253410 A1 | 10/2009 | Fitzgerald et al. | |
| 2009/0292930 A1 | 11/2009 | Marano et al. | |
| 2009/0297064 A1 | 12/2009 | Koziol et al. | |
| 2010/0053322 A1 | 3/2010 | Marti et al. | |
| 2010/0124363 A1 | 5/2010 | Ek et al. | |
| 2010/0157135 A1 | 6/2010 | Dossaji et al. | |
| 2010/0167783 A1 | 7/2010 | Alameh et al. | |
| 2010/0180210 A1 | 7/2010 | Toyama et al. | |
| 2010/0222141 A1 | 9/2010 | LaSalvia et al. | |
| 2010/0235667 A1 | 9/2010 | Mucignat et al. | |
| 2010/0275159 A1 | 10/2010 | Matsubara et al. | |
| 2011/0025842 A1 | 2/2011 | King et al. | |
| 2011/0069940 A1 | 3/2011 | Shimy et al. | |
| 2011/0072452 A1 | 3/2011 | Shimy et al. | |
| 2011/0083109 A1 | 4/2011 | Hildebrandt et al. | |
| 2011/0093806 A1 | 4/2011 | Cohen et al. | |
| 2011/0107427 A1 | 5/2011 | Cohen et al. | |
| 2011/0110557 A1 | 5/2011 | Clark et al. | |
| 2011/0133908 A1 | 6/2011 | Leung | |
| 2011/0141011 A1 | 6/2011 | Lashina et al. | |
| 2011/0154266 A1 | 6/2011 | Friend et al. | |
| 2011/0166972 A1 | 7/2011 | Cohen et al. | |
| 2011/0197121 A1 | 8/2011 | Kletter | |
| 2011/0202269 A1 | 8/2011 | Reventlow | |
| 2011/0227856 A1 | 9/2011 | Corroy et al. | |
| 2011/0231911 A1 | 9/2011 | White et al. | |
| 2011/0265179 A1 | 10/2011 | Newman et al. | |
| 2011/0317872 A1 | 12/2011 | Free | |
| 2011/0321143 A1 * | 12/2011 | Angaluri et al. | 726/6 |
| 2012/0017147 A1 | 1/2012 | Mark | |
| 2012/0028625 A1 | 2/2012 | Konig | |
| 2012/0062729 A1 | 3/2012 | Hart et al. | |
| 2012/0081392 A1 | 4/2012 | Arthur | |
| 2012/0088543 A1 | 4/2012 | Lindner et al. | |
| 2012/0108215 A1 | 5/2012 | Kameli | |
| 2012/0131471 A1 | 5/2012 | Terlouw et al. | |
| 2012/0151339 A1 | 6/2012 | Zhang et al. | |
| 2012/0166966 A1 | 6/2012 | Wood et al. | |
| 2012/0191764 A1 | 7/2012 | Leibu et al. | |
| 2012/0235790 A1 | 9/2012 | Zhao et al. | |
| 2012/0256967 A1 | 10/2012 | Baldwin et al. | |
| 2012/0293528 A1 | 11/2012 | Larsen | |
| 2012/0311438 A1 | 12/2012 | Cranfill et al. | |
| 2012/0330660 A1 | 12/2012 | Jaiswal | |
| 2013/0065608 A1 | 3/2013 | Nakajima et al. | |
| 2013/0159939 A1 | 6/2013 | Krishnamurthi | |

OTHER PUBLICATIONS

U.S. Appl. No. 13/374,352, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,286, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
U.S. Appl. No. 13/065,885, Levien et al.
Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.
"Computer Detecting User Presence Video Mockup [Ubuntu]"; Web Upd8.org; Bearing a date of Sep. 14, 2010; pp. 1-11; located at: http://www.webupd8.org/2010/09/computer-detecting-user-presence-video.html; printed on Mar. 30, 2011.

(56) References Cited

OTHER PUBLICATIONS

"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the-chair-in-front-of-a-computer.

Pike, John; "Homeland Security: Biometrics"; GlobalSecurity.org; Bearing a date of Mar. 9, 2007; 4 Total pages; located at: http://www.globalsecurity.org/security/systems/biometrics.htm.

Kernchen et al.; "Multimodal user interfaces for context-aware mobile applications"; IEEE 16$^{th}$ International Symposium on Personal, Indoor and Mobile Radio Communications; bearing a date of Mar. 20, 2005; pp. 2268-2273; #1568961325; IEEE.

Noll et al.; "Integrating Mobile Devices into Semantic Services Environments"; The Fourth International Conference on Wireless and Mobile Communications; bearing a date of Mar. 4, 2008; pp. 137-143; IEEE Computer Society.

* cited by examiner

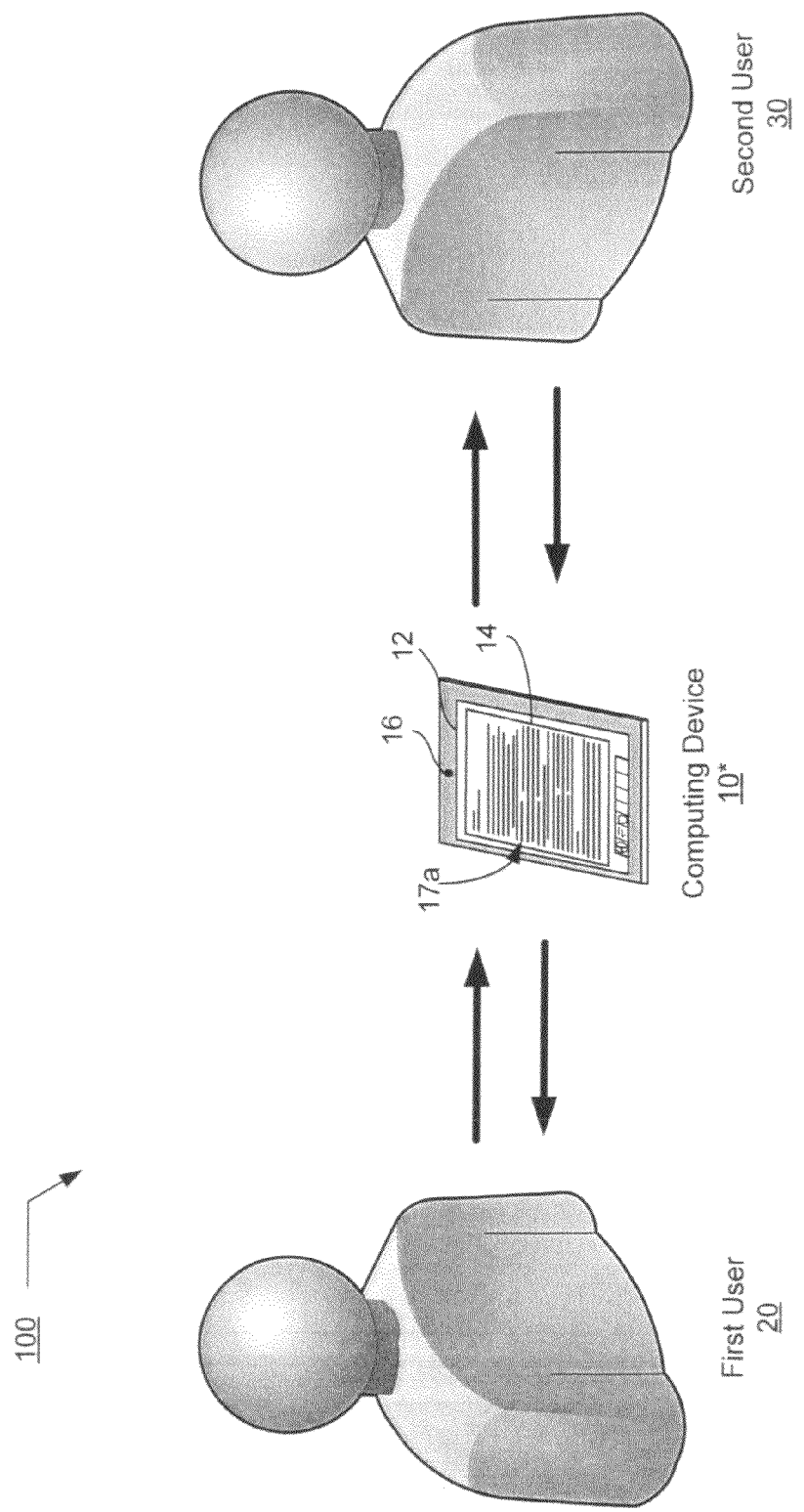

MARKING ONE OR MORE ITEMS IN RESPONSE TO DETERMINING DEVICE TRANSFER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

For purposes of the USPTO extra-statutory requirements, the present application constitutes a continuation of U.S. patent application Ser. No. 13/374,083, entitled MARKING ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 8 Dec. 2011 now U.S. Pat. No. 8,739,275, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,848, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,917, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 26 Apr. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,314, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 29 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,392, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 30 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,237, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 22 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,286, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 23 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,743, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 28 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,800, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 29 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,827, entitled PRESENTATION FORMAT SELECTION BASED AT LEAST ON DEVICE TRANSFER DETERMINATION, naming Royce A. Levien; Richard T. Lord; Robert W. Lord; Mark A. Malamud; John D. Rinaldo, Jr.; Clarence T. Tegreene as inventors, filed 27 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,832, entitled PRESENTATION FORMAT SELECTION BASED AT LEAST ON DEVICE TRANSFER DETERMINATION, naming Royce A. Levien; Richard T. Lord; Robert W. Lord; Mark A. Malamud; John D. Rinaldo, Jr.; Clarence T. Tegreene as inventors, filed 28 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/373,679, entitled ASCERTAINING PRESENTATION FORMAT BASED ON DEVICE PRIMARY CONTROL DETERMINATION, naming Royce A. Levien; Richard T. Lord; Robert W. Lord; Mark A. Malamud; John D. Rinaldo, Jr.; Clarence T. Tegreene as inventors, filed 23 Nov. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/373,796, entitled ASCERTAINING PRESENTATION FORMAT BASED ON DEVICE PRIMARY CONTROL DETERMINATION, naming Royce A. Levien; Richard T. Lord; Robert W. Lord; Mark A. Malamud; John D. Rinaldo, Jr.; Clarence T. Tegreene as inventors, filed 29 Nov. 2011 now U.S. Pat. No. 8,726,366, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to determining that a computing device that was presenting one or more portions of one or more items and that was in possession of a first user has been transferred from the first user to a second user, wherein said determining that a computing device that was presenting one or more portions of one or more items and that was in possession of a first user has been transferred from the first user to a second user is performed by the computing device; and marking, in response to said determining, the one or more portions of the one or more items to facilitate the computing device in returning to the one or more portions upon the computing device being at least transferred back to the first user. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for determining that a computing device that was presenting one or more portions of one or more items and that was in possession of a first user has been transferred from the first user to a second user; and means for marking, in response to said determining, the one or more portions of the one or more items to facilitate the computing device in returning to the one or more portions upon the computing device being at least transferred back to the first user. In addition to the foregoing, other system aspects are described in the claims, drawings, and text forming a part of the present disclosure.

A computationally implemented system includes, but is not limited to: circuitry for determining that a computing device that was presenting one or more portions of one or more items and that was in possession of a first user has been transferred from the first user to a second user; and circuitry for marking, in response to said determining, the one or more portions of the one or more items to facilitate the computing device in returning to the one or more portions upon the computing device being at least transferred back to the first user. In addition to the foregoing, other system aspects are described in the claims, drawings, and text forming a part of the present disclosure.

An article of manufacture including a non-transitory storage medium bearing one or more instructions for determining that a computing device that was presenting one or more portions of one or more items and that was in possession of a first user has been transferred from the first user to a second user; and one or more instructions for marking, in response to said determining, the one or more portions of the one or more items to facilitate the computing device in returning to the one or more portions upon the computing device being at least transferred back to the first user. In addition to the foregoing, other computer program product aspects are described in the claims, drawings, and text forming a part of the present disclosure.

A method for determining that a computing device that was presenting one or more portions of one or more items and that was in possession of a first user has been transferred from the first user to a second user, wherein said determining that a computing device that was presenting one or more portions of one or more items and that was in possession of a first user has been transferred from the first user to a second user, is performed via at least one of a machine, article of manufacture, or composition of matter; and for marking, in response to said determining, the one or more portions of the one or more items to facilitate the computing device in returning to the one or more portions upon the computing device being at least transferred back to the first user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2a shows a computing device 10* being transferred between two users in an exemplary environment 100.

DETAILED DESCRIPTION

Figure 1:
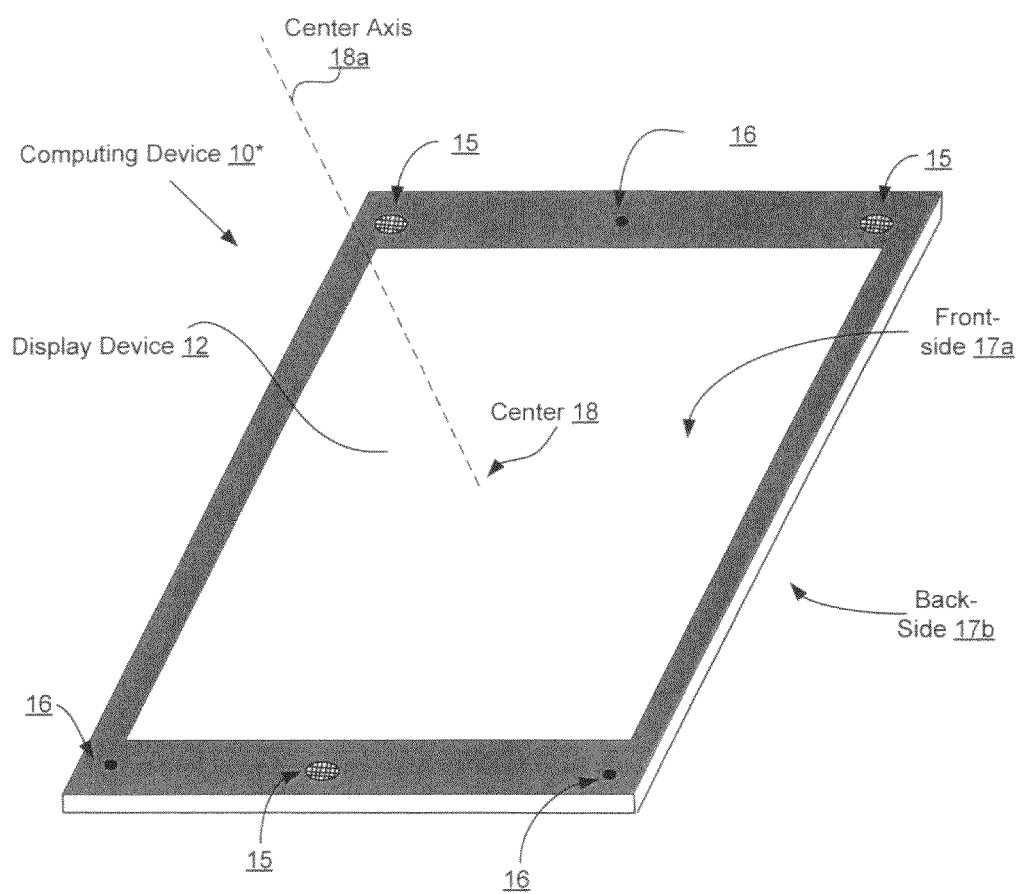
FIG. 1 shows an exemplary computing device 10* in accordance with various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have greatly facilitated in the development of computing devices having increasingly smaller form factors while still maintaining exceptional processing capabilities. Examples of such computing devices include, for example, laptops, Netbooks, tablet computers (i.e., "slate" computers), e-readers, Smartphones, and so forth. Because of their compactness, such devices are becoming much easier to share among a plurality of users. That is, due to their small form factors, such devices allow users of such devices to physically share such devices with friends, family, co-workers, clients, and so forth, in order to share the content and/or applications being presented through such devices For example, suppose a user of a tablet computer is reading an electronic book (e.g., an eBook, a digital book, etc.) through the tablet computer. While reading the electronic book, the user comes across an interesting passage that is located on a particular page (e.g., a particular portion) of the electronic book that the user wants to share with a friend sitting across a table from the user. Typically, in order to show the friend the portion (e.g., a page) of the electronic book that was being viewed by the user, the user will simply pass or handover the tablet computer to the friend thereby allowing the friend to view the portion of the electronic book that was being viewed by the user.

Unfortunately by doing so, the user is allowing the friend to obtain control over the tablet computer as well as any electronic items (e.g., the electronic book or any other content/applications) that may be accessible through the tablet computer. As a result, the user's friend, upon receiving the tablet computer, may scroll through the electronic book to another portion of electronic book or may even close the electronic book. In doing so, the user upon handed back the tablet computer from the friend may not be able to easily find the page (e.g., the portion) of the electronic book that the user was viewing before handing over the tablet computer to the friend.

In accordance with various embodiments, computationally implemented methods, systems, and articles of manufacture are provided that can determine whether a computing device that was presenting one or more portions of one or more electronic items (herein simply "items") and that was in possession of a first user has been transferred from the first user to a second user; and to mark (e.g., tag, memorialize, identify, etc.), in response to determining that the computing device has been transferred from the first user to the second user, the one or more portions of the one or more items (e.g., electronic documents, software applications such as gaming and/or productivity applications, application files, audio files, image files such as digital image folder or album, video files including movies, and so forth) to facilitate the computing device in returning to the one or more portions upon the computing device being at least transferred back to the first user. Note that the marking of the one or more portions of the one or more items does not necessarily require that the one or more items be actually marked as will be described herein. For example, in some cases, the use of pointers that point to the one or more portions may be employed in order to mark the one or more portions of the one or more items. Other ways of indirectly marking the one or more portions of the one or more items will also be described herein.

In some embodiments, the computationally implemented methods, systems, and articles of manufacture may be further designed to recall the one or more portions of the one or more items based, at least in part, on the marking of the one or more portions of the one or more items, the recalling being in response, at least in part, to determining that the computing device has been transferred back to the first user. In various embodiments, such computationally implemented methods, systems, and articles of manufacture may be implemented at the computing device.

Referring now to FIG. 1 illustrating a computing device 10* in the form of a tablet computer in accordance with various embodiments. For the embodiments, the computing device 10* may have at least a front-side 17a that includes a display device 12 (e.g., a display monitor such as a touch screen), and a back-side 17b (not visible in FIG. 1) that is opposite of the front-side 17a. As further illustrated in FIG. 1, the front-side 17a of the computing device 10* may include a center 18 (note that in FIG. 1 a center axis 18a has been drawn-in that represents an axis originating from the center 18 of the front-side 17a of the computing device 10* and perpendicular to the surface of the front-side 17a of the computing device 10*). In various embodiments, the front-side 17a of the computing device 10* may include one or more camera lens or viewing ports 16 (e.g., one or more viewing ports 16 for one or more cameras including one or more digital cameras, webcams, infrared cameras, and/or other types of image capturing devices) and/or one or more audio ports 15 (e.g., one or more audio ports for one or more microphones).

Figure 3A:
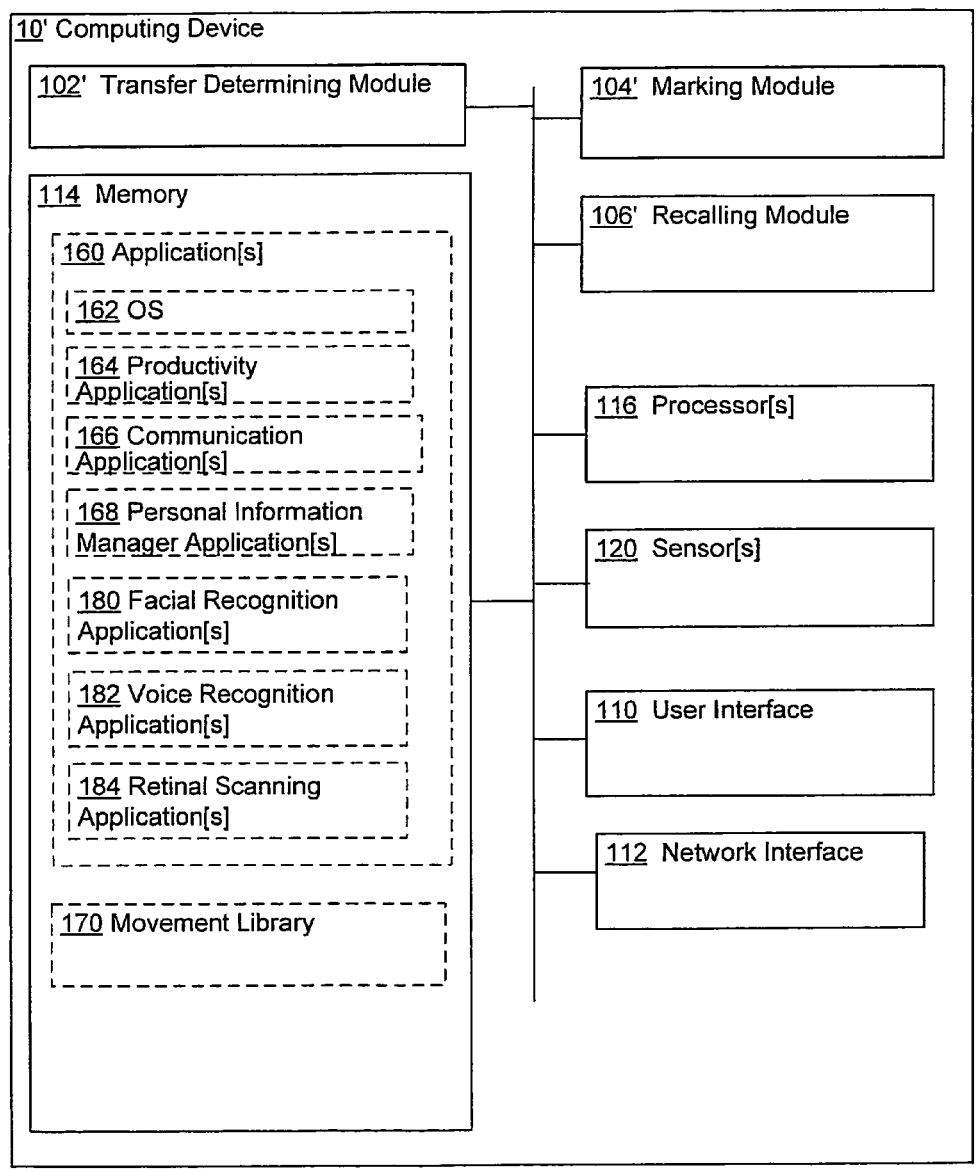
FIG. 3a shows a particular implementation of the computing device 10* of FIG. 1 illustrated as computing device 10'.
Figure 3B:
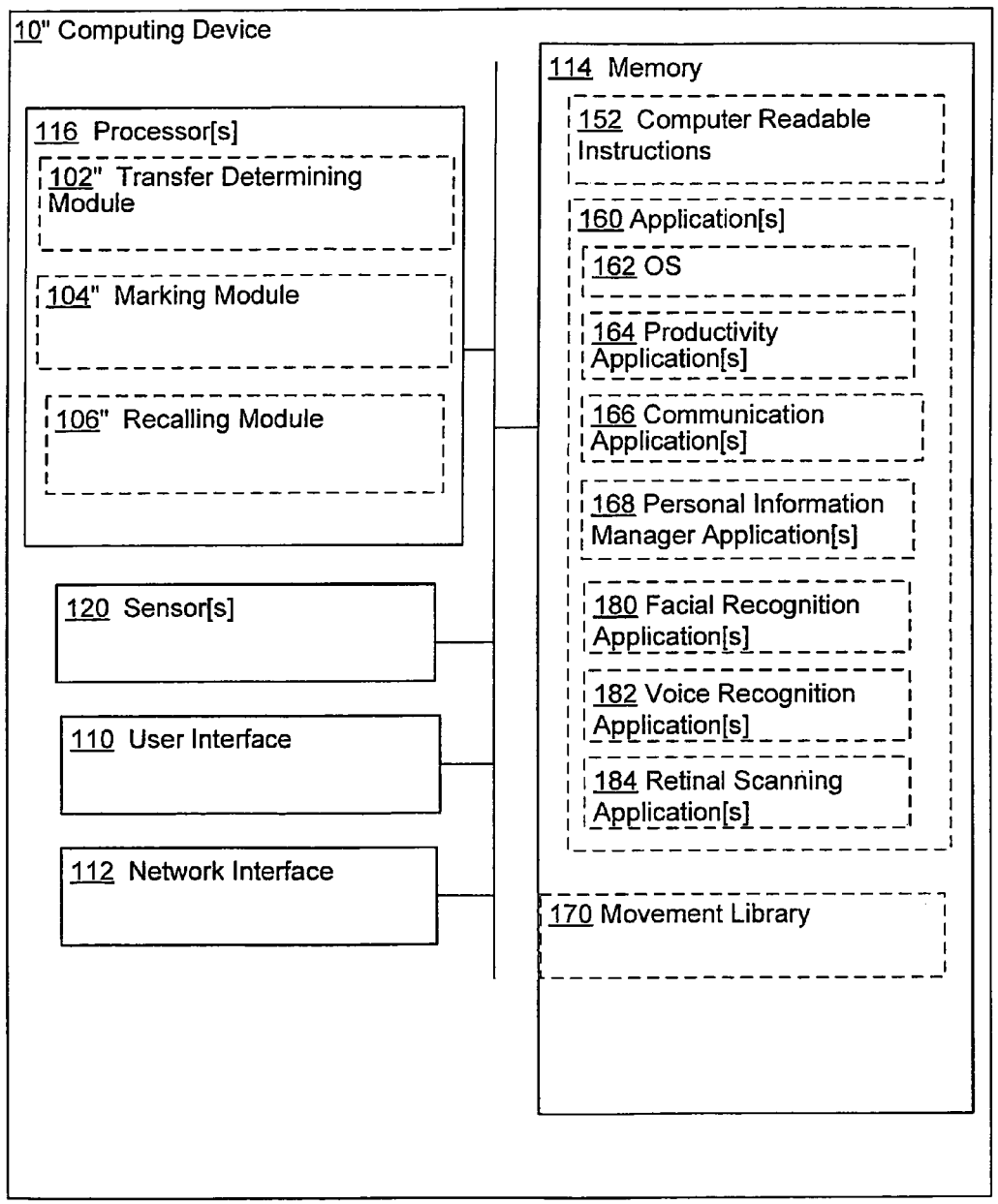
FIG. 3b shows another implementation of the computing device 10* of FIG. 1 illustrated as computing device 10".

Note that although the front-side 17a of the computing device 10* of FIG. 1 is illustrated as having three viewing ports 16 for three image capturing devices 304 (see FIG. 3f) and three audio ports 16 for three audio capturing devices 306 (see FIG. 3f), in alternative embodiments, the front-side 17a may include alternative number of viewing ports 16 and/or audio ports 15 than what is depicted in FIG. 1. Further, and although not shown in FIG. 1, in various embodiments, the backside 17b of the computing device 10* may also include one or more viewing ports 16 and/or audio ports 15. Note that FIGS. 3a and 3b illustrate two different implementations of the computing device 10* of FIG. 1 illustrated in FIG. 3a as computing device 10' and in FIG. 3b as computing device 10". Note further that for purposes of the following, "*" represents a wildcard. Thus, references in the following to the "computing device 10*" may be in reference to the computing device 10* of FIG. 1 as well as to the computing device 10' of FIG. 3a or the computing device 10" of FIG. 3b. Although the computing device 10* illustrated in FIG. 1 is depicted as being a tablet computer, in alternative embodiments, the computationally implemented methods, systems, and articles of manufacture in accordance with various embodiments may be embodied in other types of computer systems having other form factors including form factors of other types of portable computer devices such as, for example, laptops, Netbooks, Smartphones, e-readers, and so forth.

Referring now to FIG. 2a illustrating the computing device 10* in an exemplary environment 100 being transferred between two users. As will be further described herein the illustrated computing device 10* may employ the computationally implemented methods, systems, and articles of manufacture in accordance with various embodiments. The computing device 10*, in various embodiments, may be endowed with logic that is designed to determine that the computing device 10* has been transferred from a first user 20 to a second user 30; and in response to such a determination, automatically marking (e.g., tagging, memorializing, and so forth) one or more portions of one or more items that were being presented by the computing device 10* when the computing device 10* was being transferred from the first user 20 to the second user 30, the marking of the one or more portions of the one or more items to facilitate the computing device 10* in returning to the one or more portions upon the computing device 10* being at least transferred back to the first user 20. The computing device 10* or its endowed logic may further be designed to determine that the computing device 10* has been transferred back to the first user 20 and based, at least in part, on such a determination as well as based on the marking of the one or more portions of the one or more items, recall (e.g., retrieving, re-presenting, and so forth) the one or more portions of the one or more items. The computing device 10*, as illustrated again in FIG. 2a, includes a display device 12, such as a touchscreen, on the front side 17a of the computing device 10*. As further depicted in FIG. 2a, the display device 12 displaying a portion of an exemplary item in the form of an electronic textual document.

There are a number of ways to determine whether a computing device 10* is or has been transferred from one user to another user. In some cases, for instance, various sensor-provided data may be collected in order to make such a determination. Such data may indicate various environmental aspects surrounding the computing device 10* and/or aspects of the computing device 10* itself (e.g., movements displayed or exhibited by the computing device 10* as a result of being in contact with one or more users). For example, when the computing device 10* of FIG. 1 is passed from, for example, the first user 20 to another user such as the second user 30, the first user 20 may make certain recognizable as well as detectable gestures. Such gestures may include, for example, the first user 20 extending his/her arms out with the computing device 10* in one or both hands (e.g., as if to offer the computing device 10* to the second user 30); the first user 20 passing the computing device 10* from one hand to another hand, and extending the second hand with the computing device 10* out and away from the first user 20; the first user 20 rotating the computing device 10* around using his/her hands so that the front side 17a of the computing device 10* faces away from the first user 20 and faces the second user 30, who is standing or sitting across from the first user 20, and so forth. These movements or gestures made by the first user 20, when detected, may at least infer that the transfer (e.g., change in possession) of the computing device 10* from a first user 20 to a second user 30 has occurred.

One way to track the movements or gestures of the first user 20 is to track the movements of the computing device 10* itself (note that another way to detect the gestures of the first user 20 is to observe visually the gestures made by the first user 20 via one or more image capturing devices 304, which will be described in greater detail below). That is, these gestures that may be exhibited by the first user 20 during the transfer of a computing device 10* from the first user 20 to the second user 30 may cause the computing device 10* to be spatially moved in particular ways. Thus, in order to detect whether a computing device 10* is being transferred from a first user 20 to a second user 30, one may observe the spatial movements of the computing device 10* in order to detect signature movements that when detected at least infer the transfer of the computing device 10* between the first user 20 and the second user 30. For example, the computing device 10* may maintain in its memory 114 (see FIGS. 3a and 3b) a movement library 170 (see FIGS. 3a and 3b), which is a catalog or library that identifies those signature spatial movements that when detected as occurring at least infers (e.g., implies) that a transfer of the computing device 10* has occurred between two users (e.g., first user 20 and second user 30).

One way to monitor for such movements of the computing device 10* is to directly detect such movements using one or more "movement" sensors that are designed to directly detect/measure spatial movements. Examples of such movement sensors include, for example, inertia sensors, accelerometers (e.g. three-axis or 3D accelerometers), gyroscopes, and so forth. These sensors (herein "movement" sensors 302—see FIG. 3f which illustrates the one or more types of sensors 120 that may be included in the computing device 10* of FIG. 1) when integrated with a computing device 10* may be used to directly detect the actual spatial movements/motions of the computing device 10* as the computing device 10* is being transferred from, for example, a first user 20 to a second user 30 (or from the second user 30 back to the first user 20).

Since not all movements of the computing device 10* that may be detected will be as a result of the computing device 10* being transferred between two users, in various embodiments and as will be further described herein, the computing device 10* may be endowed with particular logic for determining (e.g., identifying) which movements associated with the computing device 10* that have been detected indicates or at least suggests that the computing device 10* is or has been transferred from, for example, a first user 20 to a second user 30 and which detected movements may merely be "noise movements."

Various types of movements of the computing device 10* may be tracked in order to determine or at least infer that the computing device 10* is being transferred between, for example, a first user 20 and a second user 30. Examples of the types of movements that may be tracked include, for example, the overall three-dimensional movements of the computing device 10*, or specific types of movements including tilt type movements, spin-rotation type movements, spatial relocation type movements, vibration movements, and so forth of the computing device 10*. In order to determine or at least infer that the computing device 10* has been transferred from a first user 20 to a second user 30, these movements of the computing device 10* may be, individually or in combination, tracked using one or more sensors 120 that may be included with the computing device 10* as illustrated in FIG. 2f. For example, in various embodiments, one or more movement sensors 302 (e.g., inertia devices, accelerometers, etc.) that can directly detect movements, and/or other types of sensors (e.g., image capturing devices 304, audio capturing devices 306, etc.) that may be able to indirectly detect movements may be employed in order to track the movements of the computing device 10* as will be further described herein.

Figure 2B:
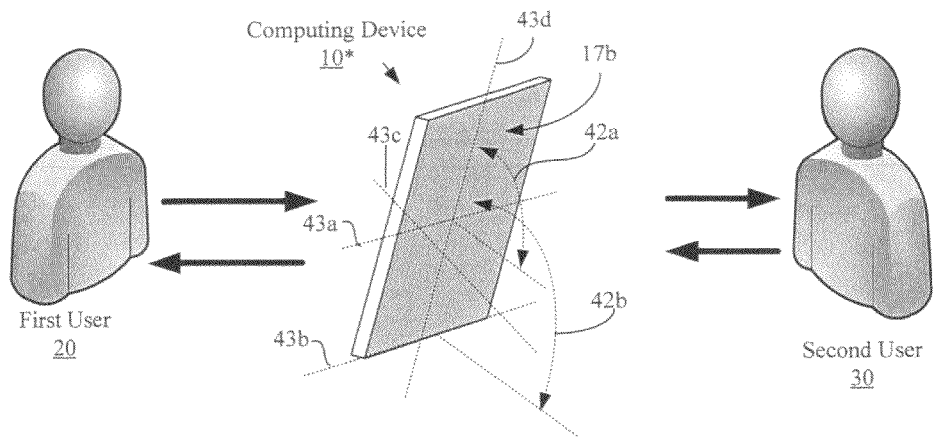
FIG. 2b shows one type of movement that may be detected/monitored by the computing device 10* of FIG. 1.

Referring now to FIG. 2b illustrating various types of tilts and tilt movements of the computing device 10* that may be detected and monitored using one or more sensors 120 (e.g., one or more movement sensors 302) in order to, for example, determine or infer that the computing device 10* has been transferred between two users (e.g., from the first user 20 to the second user 30 or from the second user 30 to the first user 20) in accordance with various embodiments. That is, FIG. 2b shows the backside 17b of the computing device 10* and some of the tilt-type movements that may be monitored by the computing device 10* in order to determine whether the computing device 10* has been transferred from, for example, a first user 20 to a second user 30 (or vice versa). Note that for ease of illustration and understanding the computing device 10* in FIG. 2b (as well as in FIGS. 2c, 2d, and 2e) is not drawn to scale at least with respect to the first user 20 and the second user 30.

One type of tilt that may be detected/monitored is tilt 42a of the computing device 10* that may occur when the computing device 10* is at least partially rotated around a central horizontal axis 43a. A second type of tilt that may be detected is tilt 42b, which may occur when the computing device 10* is at least partially rotated around a bottom horizontal axis 43b. Although not depicted, another type of tilt that may occur and that may be monitored is when the computing device 10* is at least partially rotated around an angular axis 43c that is angular with respect to a horizontal axis (e.g., axis 43a or 43b) and is parallel to the plane of the backside 17b similar to axis 43a and axis 43b. Yet another type of tilt that may occur and that may also be monitored is when the computing device 10* is at least partially rotated around a vertical axis 43d. Note that although the vertical axis 43d is depicted as being centered along the backside 17b of the computing device 10*, just like the horizontal axis 43b, the vertical axis 43d does not have to be centered on the backside 17b and instead, may be offset from the center of the backside 17b of the computing device 10* (e.g., may be closer to one end of the device rather than an opposite end of the device. Although only a few types of tilts were illustrated in FIG. 2b, those of ordinary skill in the art will recognize that other types of tilts or tilt movements of the computing device 10* may alternatively or additionally be monitored in various alternative implementations in order to determine whether the computing device 10* has been transferred between two users.

By detecting that the computing device 10* has been tilted in a particular manner from a first tilt orientation to a second tilt orientation, a determination or an inference may be made that the computing device 10* has been transferred from the first user 20 to the second user 30. In particular, when the first user 20, for example, is handing off or transferring the computing device 10* to the second user 30, the first user 20 may tilt the computing device 10* in a particular way that may be identifiable. Thus, when the computing device 10* is being transferred from a first user 20 to a second user 30 (or vice versa), the computing device 10*(or rather the logic endowed with the computing device 10*) may track the movements of the computing device 10* as it moves from a first tilt orientation (e.g., the tilt of the computing device 10* at the beginning of the transfer or when the first user 20 was using or had possession of the computing device 10*) to a second tilt orientation (e.g., the tilt of the computing device 10* at the end of the transfer or when the second user 30, for example, has obtained possession of the computing device 10*).

In order to make a determination or inference that a transfer was made between two users such as from the first user 20 to the second user 30 (or vice versa), the computing device 10* or at least the logic endowed in the computing device 10* may examine the particular movements of the computing device 10*(e.g., how the computing device 10* was reoriented from a first tilt orientation to a second tilt orientation including speed and cadence of the reorientation) as the computing device 10* moves from the first tilt orientation to a second tilt orientation. The computing device 10* may additionally or alternatively analyze the second tilt orientation (e.g., the tilt of the computing device 10* after it has finished being reoriented) at least with respect to the first tilt orientation in order to determine or infer that the computing device 10* has been transferred. To further determine or at least infer that the computing device 10* has been transferred from the first user 20 to the second user 30, for example, the examination/analysis of the detected tilt movements of the computing device 10* may involve comparing the detected tilt movements of the computing device 10* with catalogued or library tilt movements (which may be stored in the memory 114 of the computing device 10*) that are identified as being movements associated with transfer of the computing device 10* between two users.

That is, the computing device 10* may maintain in its memory 114 (see FIGS. 3a and 3b) a movement library 170 that may include a catalogue or library of movements including signature tilt movements that have been previously identified as tilt movements that may occur when, for example, a computing device 10* is transferred between two users (e.g., first user 20 and second user 30). Thus, when tilt movements that match with catalogued or library tilt movements (e.g., signature tilt movements) have been detected, then a determination or at least an inference may be made that a transfer of the computing device 10* between two users has occurred. Note that the above discussed tilt movements relates to the movement of the computing device 10* as it moves from a first tilt orientation to a second tilt orientation.

Thus, another aspect of tilt orientation changes that may be considered in order to determine or infer that a transfer has taken place is to simply look at the end points of the tilt reorientation and their differences. In other words, to analyze the first tilt orientation (e.g., the tilt orientation of the computing device 10* before the computing device 10* being reoriented) and the second tilt orientation (e.g., the end tilt orientation of the computing device 10* after it has been reoriented) with respect to each other, and the differences between the first tilt orientation and the second tilt orientation. Thus, in some embodiments, the computing device 10* may also or additionally maintain a catalogue or library of changes of tilt orientation (e.g., tilt orientation changes) that have been previously identified as tilt changes that occur when, for example, a computing device 10* is transferred between two users. Such catalogue or library of tilt orientation changes may be stored as part of a movement library 170 stored in memory 114 (see FIGS. 3a and 3b) of the computing device 10* of FIG. 1 (e.g., the computing device 10' of FIG. 3a or the computing device 10" of FIG. 3b). Therefore, when tilt orientation changes that match with catalogued or library tilt orientation changes (e.g., as stored in the movement library 170 of the memory 114) have been detected, then at least an inference may be made that a transfer of the computing device 10* between two users has occurred.

Figure 2C:
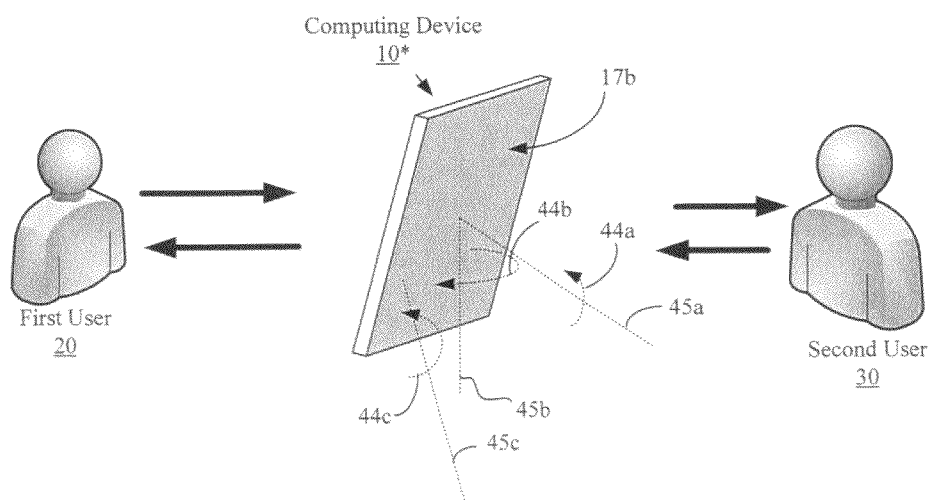
FIG. 2c shows another type of movement that may be detected/monitored by the computing device 10* of FIG. 1.

Referring now to FIG. 2c illustrating another type of movement of the computing device 10* that may be detected/monitored in order to determine or at least infer that the computing device 10* has been transferred between two users. In particular, FIG. 2c shows a couple types of spin rotation and spin rotation movements of the computing device 10* that may be detected/monitored using one or more sensors 120 (e.g., one or more movement sensors 302) in order to determine or infer that a transfer of the computing device 10* has occurred between at least two users. Note that this type of rotation (e.g., spin rotation) is different from the type of rotation associated with the previously described tilt movement where the "tilt" rotation involves the entire backside 17b of the computing device 10* rotating around some axis in a sweeping motion. In a spin rotation, the backside 17b (or the front side 17a) of the computing device 10* substantially spins around an axis without the sweeping motion. Referring back to FIG. 2c, which shows some of the various types of spin rotations that may be detected/monitored by the computing device 10* in order to, for example, determine whether the computing device 10* has been transferred between two users such as, for example from a first user 20 to a second user 30 (or vice versa). Examples of the type of spin rotations that may be monitored include a spin rotation 44a of the computing device 10* that occurs when the computing device 10* is rotated around a center axis 45a that is centered and vertical to the backside 17b of the computing device 10*. Another type of rotation that may be monitored is a spin rotation 44b of the computing device 10* that occurs when the computing device 10* is rotated around a center axis 45b that may be centered but not vertical to the backside 17b of the computing device 10*. Instead, the center axis 45b is angular to the backside 17b of the computing device 10* such that when the computing device 10* is rotating around the center axis 45b, the computing device 10* will have a constant tilt with respect to the center axis 45b. Another type of rotation that may be monitored is spin rotation 44c of the computing device 10* that may occur when the computing device 10* is rotated around an axis 45c that may not be centered on the backside 17b of the computing device and that may not be vertical to the backside 17b of the computing device 10*.

By detecting that the computing device 10* has been spin rotated in a particular manner, a determination or an inference may be made that the computing device 10* has been transferred from the first user 20 to the second user 30. In particular, when the first user 20 is, for example, handing off or transferring the computing device 10* to the second user 30, the first user 20 may spin rotate the computing device 10* in a particular way. Thus, when the computing device 10* is being transferred from, for example, the first user 20 to the second user 30, the computing device 10*(or rather the logic endowed with the computing device 10*) may track the movements of the computing device 10* as it moves from a first spin orientation (e.g., the orientation of the computing device 10* at the beginning of the transfer or when the first user 20 was using the computing device 10*) to a second spin orientation (e.g., the orientation of the computing device 10* at the end of the transfer or when the second user 30 has obtained possession of the computing device 10*).

Similar to the tilt or tilt movement detection/analysis described earlier, in order to make a determination or inference that a transfer was made from, for example, the first user 20 to the second user 30 (or vice versa), the computing device 10* or at least the logic endowed in the computing device 10* may scrutinize the particular movements of the computing device 10* as the computing device 10* spin rotates from a first orientation to a second orientation. The computing device 10* may additionally or alternatively analyze the second orientation (e.g., the orientation of the computing device 10* after it has finished being spin rotated) at least with respect to the first orientation (e.g., the orientation of the computing device 10* before it was spin rotated) in order to determine or at least infer that the computing device 10* has been transferred.

To further determine or at least infer that the computing device 10* has been transferred from the first user 20 to the second user 30, the examination/analysis of the detected spin rotation of the computing device 10* from the first orientation to the second orientation may involve comparing the detected spin rotation movement of the computing device 10* with catalogued or library spin rotation movements that are identified as being associated with transfer of the computing device 10*. That is, the computing device 10* may maintain in its memory 114 (see FIGS. 3a and 3b) a movement library 170 that may include a catalogue or library of movements including signature spin rotation movements that when detected as occurring may infer that a transfer of the computing device 10* between two users has occurred.

Figure 2D:
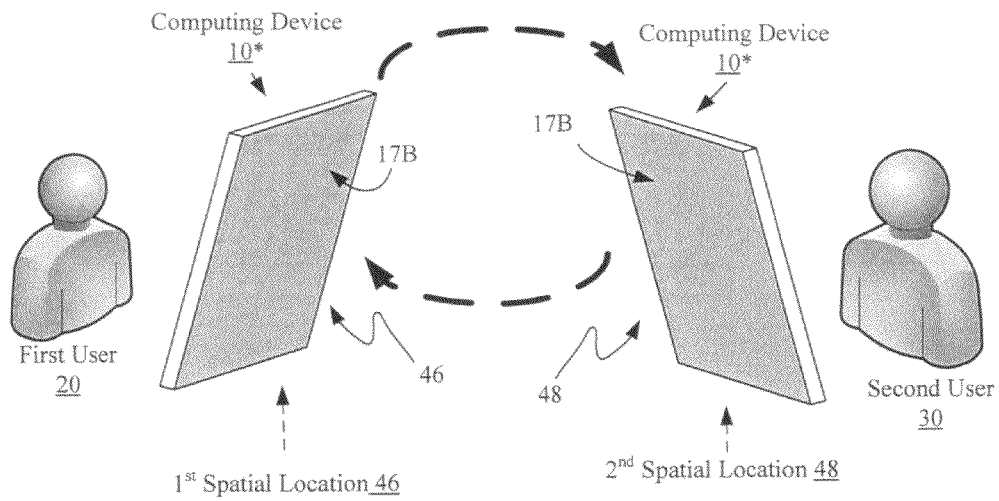
FIG. 2d shows another type of movement that may be detected/monitored by the computing device 10* of FIG. 1.

Turning now to FIG. 2d illustrating yet another type of movement of the computing device 10* that may be detected/monitored in order to determine or infer that the computing device 10* has been transferred between two users. In particular, FIG. 2d shows the computing device 10* being relocated by moving from a first spatial location 46 to a second spatial location 48 when the computing device 10* is transferred between two users such as from a first user 20 to a second user 30 (or vice versa). In various embodiments, such movements from the first spatial location 46 to the second spatial location 48, which will be referred to herein as "spatial relocation movements," may be detected using one or more sensors 120 (e.g., one or more movement sensors 302). In order to make a determination or inference that a transfer was made from the first user 20 to the second user 30, the computing device 10* or at least the logic endowed in the computing device 10* may examine/analyze the particular spatial relocation movements of the computing device 10* as it moves from the first spatial location 46 to the second spatial location 48, and to compare the pattern of spatial relocation movements (e.g., path, speed, acceleration, and so forth) with those catalogued or library signature spatial movements stored in a movement library 170 that when detected as occurring at least infers that the computing device 10* has been transferred between at least two users (e.g., between a first user 20 and a second user 30).

In some cases, the computing device 10*(or rather the logic endowed with the computing device 10*) may additionally or alternatively analyze the second spatial location 48 with respect to the first spatial location 46 in order to determine or at least infer that the computing device 10* has been transferred from the first user 20 to the second user 30. To further determine or at least infer that the computing device 10* has been transferred from, for example, the first user 20 to the second user 30, the examination/analysis of the detected spatial relocation movements of the computing device 10* may be compared with catalogued or library signature spatial relocation movements that have been identified as being associated with the transfer of the computing device 10 between two users. That is, the computing device 10* may maintain in its memory 114 (see FIGS. 3a and 3b) a movement library 170 that may include a catalogue or library of movements including signature spatial movements that when detected as occurring may at least infer that a transfer of the computing device 10* between two users has occurred.

In some embodiments, in order to determine or at least infer that the computing device 10* has been transferred from the first user 20 to the second user 30 (or vice versa), the computing device 10* may be endowed with logic that detects/monitors vibrations. That is, each user who may come in contact with the computing device 10* may pass on to the computing device 10* unique vibration pattern or signature (e.g., as a result of the heartbeat of the "touching" user). Thus, when the first user 20 is holding the computing device 10*, the computing device 10* may vibrate in a particular vibration pattern that is associated with the first user 20. In contrast, when the computing device 10* has been transferred to the second user 30 and the second user 30 is holding the computing device 10*, the computing device 10* may vibrate in a manner that is associated with the second user 30. Thus, one way to determine whether the computing device 10* has been transferred from the first user 20 to the second user 30 (or vice versa) is to detect/monitor at least changes in vibrations of the computing device 10*. In some cases, this may involve the computing device 10*(or at least the logic endowed with the computing device 10*) initially detecting the particular vibration pattern of the computing device 10* when the computing device 10* is being used by, for example, the first user 20, and to detect when the computing device 10* no longer vibrates in such a particular vibration pattern. In order to determine whether the computing device 10* has been transferred from the first user 20 to the second user 30, the computing device 10* in some cases may be further designed to determine that the computing device 10* is vibrating in a way that matches with a vibration pattern of the second user 30. By making such a determination, an inference may be made that the computing device 10* is being held or is in contact with the second user 30.

In some embodiments, the computing device 10* may include logic that is designed to determine whether the computing device 10* has moved away from the first user 20 in order to determine whether, for example, the computing device 10* has been transferred from the first user 20 to the second user 30. That is, by making such a determination, an inference may be made that the computing device 10* has been transferred from the first user 20 to the second user 30. In some embodiments, in order to make such a determination, data from a combination of sensors 120 may be processed and analyzed. That is, in order to determine whether the computing device 10 has moved away from, for example, the first user 20, a combination of one or more movement sensors 302

(see FIG. 3f) for directly detecting movements of the computing device 10*, one or more image capturing devices 304 (e.g., webcam or digital camera), and/or one or more audio capturing devices 306 (e.g., microphones) may be employed in order to determine whether the computing device 10* is moving away from the first user 20 (and thus, an inference that the computing device 10* has been transferred to the second user 30). For example, the computing device 10* in some cases may employ one or more movement sensors 302 to detect the actual movements of the computing device 10* and one or more image capturing devices 304 (along with facial recognition system/application) to determine that a face associated with the first user 20 is moving away from the computing device 10*. Based on the data provided by both the movement sensors 302 and the image capturing devices 304, at least an inference may be made that the computing device 10* has moved away from the first user 20*.

Figure 2E:
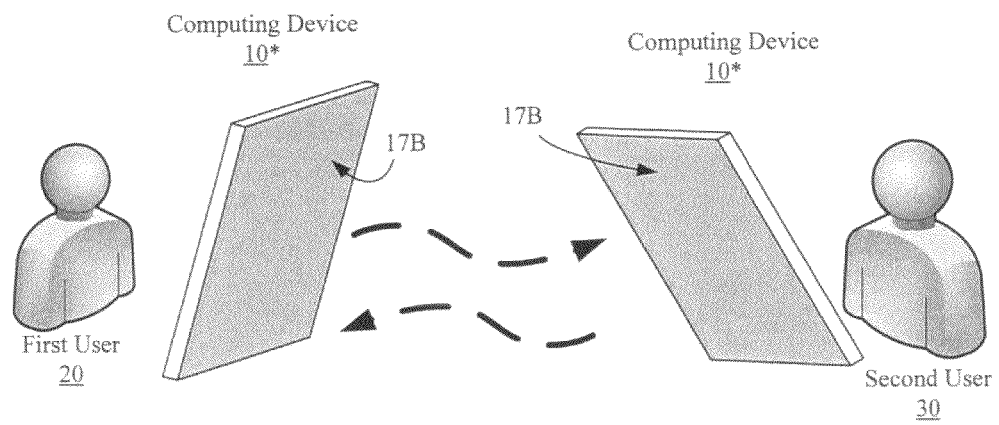
FIG. 2e shows overall 3-dimensional movements of the computing device 10* of FIG. 1 that may be detected/monitored by the computing device 10*.

In some embodiments, and as illustrated in FIG. 2e, rather than only detecting/monitoring for a particular type of movement (e.g., tilt-type movements, spin rotation movements, spatial relocation movements, vibration movements, and so forth) the computing device 10* may be endowed with logic that is designed to detect/monitor the overall three-dimensional movements of the computing device 10* and to determine whether the computing device 10* has moved in a particular three-dimensional way that infers that the computing device 10* has been transferred from the first user 20 to the second user 30. In order to accomplish this, the computing device 10* may maintain in its memory 114 (see FIGS. 3a and 3b) a movement library 170 that may include a catalogue or library of movements including signature three-dimensional movements that when detected as occurring may infer at least that a transfer of the computing device 10* between two users has occurred.

As described briefly above, in addition to directly detecting the movements of the computing device 10* using movement sensors 302 (e.g., inertia sensors, accelerometers, gyroscopes, and so forth), other types of environmental aspects may be detected/monitored in order to determine whether the computing device 10* has been transferred from a first user 20 to a second user 30. For instance, in some embodiments, the computing device 10* or the logic endowed with the computing device 10* may be designed to detect, using one or more image capturing devices 304, certain visual cues that when detected at least infers the transfer of the computing device 10* from a first user 20 to a second user 30. For example, in some embodiments, the computing device 10* may be endowed with certain logic that is able to detect certain visual cues, such as gestures made by a first user 20 that when visually detected as occurring at least infers that the computing device 10* has been transferred from the first user 20 to another user. In the same or alternative embodiments, the computing device 10* may additionally or alternatively be endowed with logic that at least detects, via one or more image capturing devices 304, changes in lighting in the proximate vicinity of the computing device 10*. That is, generally when an object is moved from one spatial location to another spatial location, as in the case of a computing device 10* being transferred between two users, the object will be exposed to changes in lighting conditions. Thus, by merely detecting changes in lighting conditions of the computing device 10*, at least an inference may be made that the computing device 10* is being transferred between users.

Alternatively or additionally, in some embodiments, the computing device 10* may be endowed with a facial recognition system (e.g., facial recognition software or application) that when employed with one or more image capturing devices 304 may be used in order to determine the presence or absence of a face associated with the first user 20 or the second user 30 within the proximate vicinity of the computing device 10*. If the face associated with the first user 20 is not detected in the proximate vicinity of the computing device 10* and/or if a face not associated with the first user 20 is detected in the proximate vicinity of the computing device 10*, such as the face of the second user 30, then a determination or at least an inference may be made by the computing device 10* or by the endowed logic of the computing device 10* that a transfer of the computing device 10* from the first user 20 to the second user 30 may have occurred. The phrase "proximate vicinity" as used here is in reference to the immediate area surrounding the computing device 10* such as within a distance from the computing device 10* from which an object or a person is visually (or audibly) discernible or identifiable by the computing device 10* using, for example, a facial recognition system (or a voice verification/recognition system). Depending on sensitivity of the various systems, this may mean within three feet, within five feet, within six feet, and so forth, of the computing device 10*.

In some cases, an inference that the computing device 10* has been transferred from, for example, the first user 20 to the second user 30 will not be made until the computing device 10* (or at least the logic endowed with the computing device 10*) determines that the face of a person other than the first user 20 is detected as being in the proximate vicinity of the computing device 10* and is detected as being located at one or more specified locations relative to the specific orientation of the computing device 10*. For example, in some cases, the inference that the computing device 10* has been transferred from, for example, the first user 20 to the second user 30 will not be made at least until it is determined that the face of the second user 30 is determined to be in the proximate vicinity of the computing device 10* and is detected as being at or on the display side (e.g., front side 17a) of the computing device 10*. Note that since the computing device 10* may be endowed with multiple sensors 120 (e.g., image capturing devices 304 and/or audio capturing devices 306) located on both the front side 17a as well as the backside 17b of the computing device 10*, it may be possible to detect the presence of a person or a face of the person on either side of the computing device 10*.

Another type of visual cues that the computing device 10* or at least the logic endowed with the computing device 10* may look for in order to determine whether the computing device 10* has been transferred from, for example, a first user 20 to a second user 30 is the presence or absence of one or more eyes (e.g., irises or retinas) in the proximate vicinity of the computing device 10* that are determined to be associated with the first user 20 or the second user 30. In particular, if the eyes of the first user 20 is determined not to be at least in the field of view of an image capturing device 304 (e.g., an image capturing device 304 that employs the viewing port 16 disposed on the front side 17a) of the computing device 10* and/or if one or more eyes of another person (e.g., second user 30) other than the first user 20 is determined to be in the field of view of the image capturing device 304, then at least an inference may be made that the computing device 10* has been transferred from the first user 20 to the second user 30.

In some cases, an inference that the computing device 10* has been transferred from for example, the first user 20 to the second user 30 (or vice versa) will not be made until the computing device 10 (or at least the logic endowed with the computing device 10*) determines that the eye of a person other than the first user 20 is detected in the proximate vicinity of the computing device 10* and is detected as being located at one or more specified locations (e.g., nearby the front side 17a) relative to the specific orientation of the computing device 10*. In other words, the inference or determination that the computing device 10* has been transferred from the first user 20 to the second user 30, for example, will not be made at least until it is determined that the eye or eyes of the second user 30 is determined to be in the proximate vicinity of the computing device 10* and is detected as being at or on the display side (e.g., the front side 17a) of the computing device 10*.

In various embodiments, the computing device 10* or at least the logic that may be endowed with the computing device 10* may be designed to detect for the absence or presence of audio cues in the proximate vicinity of the computing device 10* in order to determine or at least infer as to whether the computing device 10* has been transferred from, for example, a first user 20 to a second user 30 (or vice versa). For example, in some embodiments, the computing device 10* may be endowed with voice verification system or application that may be designed to detect, via one or more audio capturing devices 306 (e.g., one or more microphones), a voice in the proximate vicinity of the computing device 10* having a voice pattern that may be different from the signature voice pattern of the first user 20. By making such a determination and/or by detecting absence for at least a predefined period of time of a voice pattern associated with the first user 20 in the proximate vicinity of the computing device 10*, an inference may be made that the computing device 10* has been transferred from, for example, the first user 20. In some embodiments, an inference may be made that the computing device 10* has been transferred from, for example, the first user 20 to the second user 30 when a voice pattern belonging to person other than the first user 20 is detected in the proximate vicinity of the computing device 10* and is detected being originating from a point on the display side (e.g., the front side 17a) of the computing device 10*

In some embodiments, the computing device 10* or at least the logic endowed with the computing device 10* may be designed to determine the transfer of the computing device 10* from the first user 20 to the second user 30 based on one or more detected movements of the computing device 10*, one or more detected visual cues, and/or one or more detected audio cues. That is, since in many situations, a particular type of data or measurement (e.g., detected movements of the computing device 10* or detected visual cues in the proximate vicinity of the computing device 10*) may not reliably or conclusively indicate that the transfer of the computing device 10* from the first user 20 to the second user 30 has occurred, in various embodiments, the computing device 10* may make the determination as to whether the computing device 10* has been transferred based on different types of measurements (e.g., movements of the computing device 10*, visual cues, and/or audio cues).

As described earlier, in response to determining that the computing device 10* has been transferred from the first user 20 to the second user 30, the computing device 10* or at least the logic that may be endowed with the computing device 10* may be designed to, mark one or more portions of one or more items that were being presented to the first user 20 via the computing device 10* when the first user 20 had possession of the computing device 10* and just prior to being transferred to the second user 30. By marking the one or more portions of the one or more items, the one or more portions of the one or more items may be easily recalled (e.g., retrieved and/or re-presented) when the computing device 10* is transferred back to the first user 20. There are a number of ways to mark the one or more portions of the one or more items depending on a number of factors including depending on the types of items that are being marked. In some cases, the marking of the one or more portions of the one or more items may be by inserting tags to the one or more portions, by memorializing the one or more portions, by generating pointers (which may be included with the one or more items or stored in memory) that point to the one or more portions of the one or more items, or by other alternative means. In still other cases, in which the one or more items are software applications the marking of the one or more portions of the one or more items may involve memorizing the state of the one or more items when the items were being presented immediately prior to the transfer of the computing device 10*. These concepts will be described in greater detail herein.

In various embodiments, the one or more items that may be marked through the computing device 10* may include a wide variety of electronic items that may be accessible through the computing device 10* in various alternative implementations. For example, in various embodiments, the one or more items that may be marked (or at least one or more portions thereof that may be marked) may include one or more alphanumeric documents (e.g., textual documents such as a word processing document or electronic messages such as email messages), audio messages, productivity documents (e.g., word processing documents, spreadsheet documents, presentation documents, etc.), image files (e.g., digital photos, video files, etc.) such as digital photo album or folders, audio files (e.g., voice messages), video files, electronic folders, software applications (e.g., productivity applications, messaging applications, or gaming applications), application interfaces, Internet websites and so forth.

In various embodiments, the computing device 10* or at least the endowed logic of the computing device 10* may be designed to recall (e.g., locating or finding, retrieving, re-presenting, and so forth) the one or more portions of the one or more items for presentation through the computing device 10* based, at least in part, on the marking of the one or more portions of the one or more items, the recalling further being in response, at least in part, to determining that the computing device 10* has been transferred back to the first user 20. The determination as to whether the computing device 10* has been transferred back to the first user 20 may be based on the same or similar factors (e.g., detected movements of the computing device 10*, visual cues, and/or audio cues) used to determine whether the computing device 10* has been transferred from the first user 20 to the second user 30 as described herein. A more detailed discussion related to the above described transfer determining operation (e.g., determining whether the computing device 10* has been transferred from the first user 20 to the second user 30), the marking operation (e.g., marking the one or more portions of the one or more items that were being presented through the computing device 10 when the computing device 10* was being transferred) and the recalling operation (e.g., recalling the one or more portions of the one or more items upon determining that the computing device 10* has been transferred back to the first user 20) will be described in greater detail below.

Referring now to FIGS. 3a and 3b, FIGS. 3a and 3b are two block diagrams representing two different implementations of the computing device 10* of FIG. 1 illustrated in FIG. 3a as computing device 10' and in FIG. 3b as computing device 10". In particular, and as will be further described herein, FIG. 3a illustrates a computing device 10' that is the "hardwired" or "hard" implementation of the computing device 10* of FIG. 1 in which certain logic modules including a transfer determining module 102', a marking module 104', and a recalling module 106' are implemented using purely hardware or circuitry components (e.g., application specific integrated circuit or ASIC). In contrast, FIG. 3b illustrates a computing device 10" that is the "soft" implementation of the computing device 10* of FIG. 1 in which certain logic modules including a transfer determining module 102", a marking module 104", and a recalling module 106" are implemented using electronic circuitry such as one or more processors (e.g., microprocessors, controllers, etc.) executing one or more programming instructions (e.g., software).

Note that the embodiments of the computing device 10* illustrated in FIGS. 3a and 3b are two extreme or opposite versions/implementations of the computing device 10* of FIG. 1 in which certain logic modules (e.g., the transfer determining module 102*, the marking module 104*, and the recalling module 106*) are implemented using purely "hardware solutions" (e.g., implemented using circuitry such as ASIC) as illustrated in FIG. 3a, or using purely "software solutions" (e.g., implemented using software executed by hardware such as one or more processors 116) as illustrated in FIG. 3b. That is, those of ordinary skill in the art will recognize that the computing device 10* or at least the logic modules (e.g., the transfer determining module 102*, the marking module 104*, and the recalling module 106*) illustrated in FIGS. 3a, 3b, 3c, 3d, and 3e may be implemented using essentially any combination of hardware and software solutions. Since, there are many ways of combining hardware, software; and/or firmware in order to implement the various logic modules (e.g., the transfer determining module 102*, the marking module 104*, and the recalling module 106*), only the two extreme implementations (e.g., the purely hardware solution as illustrated in FIG. 3a and the software solution of FIG. 3b) are illustrated here. It should be noted here that with respect to the "soft" implementation illustrated in FIG. 3b, hardware such as one or more processors 116 are still needed in order to execute the software. Further details related to the two implementations of computing device 10* illustrated in FIGS. 3a and 3b will be provided in greater detail below.

Referring particularly now to FIG. 3a, which illustrates a computing device 10' that includes a transfer determining module 102', a marking module 104', a recalling module 106', a memory that may store one or more applications 160 (e.g., an operating system (OS) 162, one or more productivity applications 164 such as a word processing application and/or spreadsheet application, one or more communication applications 166 such as an email or text messaging application, one or more personal information manager applications 168 such as Microsoft Outlook, one or more facial recognition applications 180, one or more voice recognition applications 182, one or more retinal scanning applications 184, and/or other applications including gaming applications) and/or a movement library 170, one or more processors 116 (e.g., microprocessors, controllers, etc.), one or more sensors 120, user interface 110 (e.g., a display monitor such as a touchscreen, a keypad, a mouse, a microphone, a speaker, a camera, etc.), and a network interface 112 (e.g., network interface card or NIC).

In various embodiments, the transfer determining module 102' of FIG. 3a is a logic module that is designed to determine that the computing device 10*, which was presenting one or more portions of one or more items and that was in possession of a first user 20 has been transferred from the first user 20 to a second user 30. The marking module 104' is a logic module that is designed to mark, in response to the determining by the transfer determining module 102' that the computing device 10* is or has been transferred from the first user 20 to the second user 30, the one or more portions of the one or more items to facilitate the computing device 10* in returning to the one or more portions upon the computing device 10* being at least transferred back to the first user 20. In contrast, the recalling module 106' is a logic module that is designed to, among other things, recall the one or more portions of the one or more items based, at least in part, on the marking of the one or more portions of the one or more items, the recalling being in response, at least in part, to determining that the computing device 10* has been transferred back to the first user 20. For this particular embodiment of the computing device 10* of FIGS. 1, 2a, 2b, 2c, 2d, and 2e, the three logic modules (e.g., the transfer determining module 102', the marking module 104', and the recalling module 106') are implemented using purely circuitry components such as application specific integrated circuit or ASIC. Thus, and as indicated before, the computing device 10' illustrated in FIG. 3a may be referred to as the "hardwired" version or embodiment of the computing device 10* of FIGS. 1, 2a, 2b, 2c, 2d, and 2e.

Turning now to FIG. 3b, which illustrate a "soft" version or embodiment of the computing device 10* of FIGS. 1, 2a, 2b, 2c, 2d, and 2e. In particular, FIG. 3b shows a computing device 10" that has components similar or the same as the components of the computing device 10' of FIG. 3a. That is, computing device 10", similar to computing device 10' of FIG. 3a, may comprise of a memory 114 (storing one or more applications 160 and/or a movement library 170), one or more processors 116, one or more sensors 120, user interface 110, and/or a network interface 112. And similar to the computing device 10' of FIG. 3a, the computing device 10" of FIG. 3b may include logic modules including a transfer determining module 102", a marking module 104", and a recalling module 106" that correspond to and mirror the transfer determining module 102', the marking module 104', and the recalling module 106' of the computing device 10' of FIG. 3a. However, unlike the logic modules (e.g., the transfer determining module 102', the marking module 104', and the recalling module 106') of the computing device 10' of FIG. 3a, the logic modules (e.g., the transfer determining module 102", the marking module 104", and the recalling module 106") of the computing device 10" of FIG. 3b are implemented by the one or more processors 116 executing computer readable instructions 152 (e.g., software and/or firmware) that may be stored in the memory 114.

Note that although FIG. 3a illustrates all of the logic modules (e.g., the transfer determining module 102', the marking module 104', and the recalling module 106') being implemented using purely circuitry components such as ASIC, and although FIG. 3b illustrates all of the logic modules (e.g., the transfer determining module 102", the marking module 104", and the recalling module 106") being implemented using one or more processors 116 executing computer readable instructions 152, in other embodiments, these logic modules may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as FPGA) executing computer readable instructions 152 (e.g., software and/or firmware).

In various embodiments, the memory 114 of the computing device 10' of FIG. 3a and the computing device 10" of FIG. 3b may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 3C:
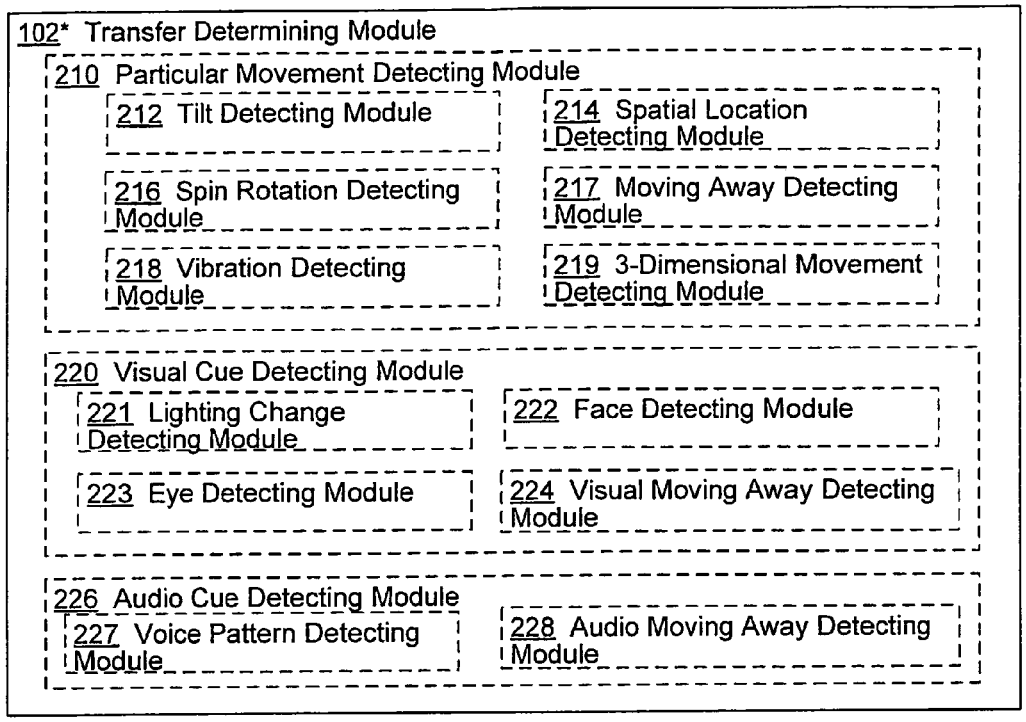
FIG. 3c shows another perspective of the transfer determining module 102* of FIGS. 3a and 3b.

Turning now to FIG. 3c illustrating a particular implementation of the transfer determining module 102* (e.g., the transfer determining module 102' or the transfer determining module 102") of FIGS. 3a and 3b. As illustrated, the transfer determining module 102* may include one or more sub-logic modules in various alternative implementations. For example, in various implementations, the transfer determining module 102* may include a particular movement detecting module 210 (which may further include a tilt detecting module 212, a spatial location detecting module 214, a spin rotation detecting module 216, a moving away detecting module 217, a vibration detecting module 218, and/or a 3-dimensional movement detecting module 219), a visual cue detecting module 220 (which may further include a lighting change detecting module 221, a face detecting module 222, an eye detecting module 223, and/or a visual moving away detecting module 224), and/or an audio cue detecting module 226 (which may further include a voice pattern detecting module 227 and/or an audio moving away detecting module 228). Specific details related to the transfer determining module 102* as well as the above-described sub-modules of the transfer determining module 102* will be provided below with respect to the operations and processes to be described herein.

Figure 3D:
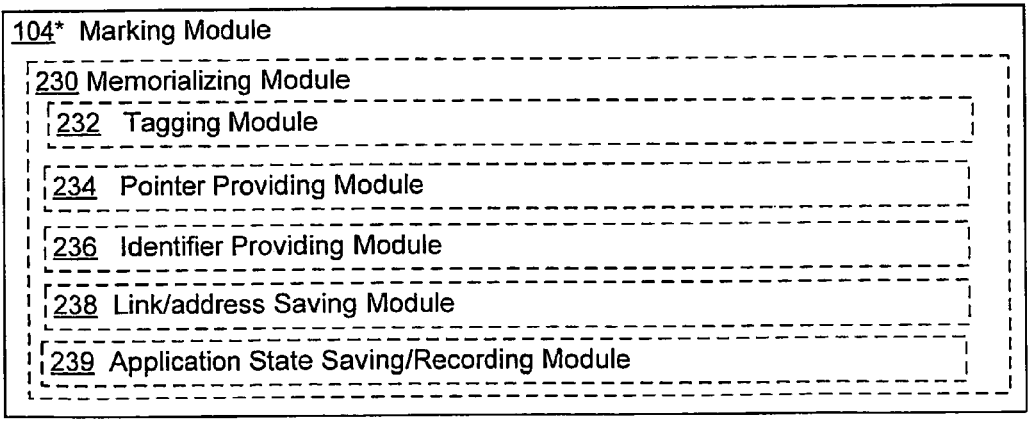
FIG. 3d shows another perspective of the marking module 104* of FIGS. 3a and 3b.

Referring now to FIG. 3d illustrating a particular implementation of the marking module 104*(e.g., the marking module 104' or the marking module 104") of FIGS. 3a and 3b. As illustrated, the marking module 104* may include one or more sub-logic modules in various alternative implementations. For example, in various implementations, the marking module 104* may include a memorializing module 230, which may further include a tagging module 232, a pointer providing module 234, an identifier providing module 236, a link/address saving module 238, and/or an application state saving/recording module 239. Specific details related to the marking module 104* as well as the above-described sub-modules of the marking module 104* will be provided below with respect to the operations and processes to be described herein.

Figure 3E:
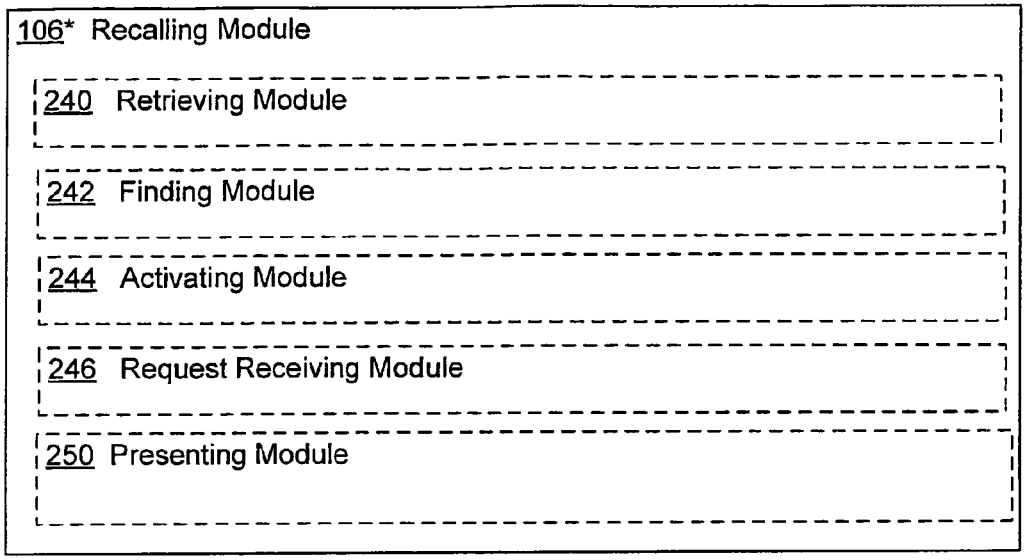
FIG. 3e shows another perspective of the recalling module 106* of FIGS. 3a and 3b.

Referring now to FIG. 3e illustrating a particular implementation of the recalling module 106*(e.g., the recalling module 106' or the recalling module 106") of FIGS. 3a and 3b. As further illustrated in FIG. 3e, the recalling module 106* may include one or more sub-logic modules in various alternative implementations. For example, in various implementations, the recalling module 106* may include a retrieving module 240, a finding module 242, an activating module 244, a request receiving module 246, and/or a presenting module 250. Specific details related to the recalling module 106* as well as the above-described sub-modules of the recalling module 106* will be provided below with respect to the operations and processes to be described herein.

Figure 3F:
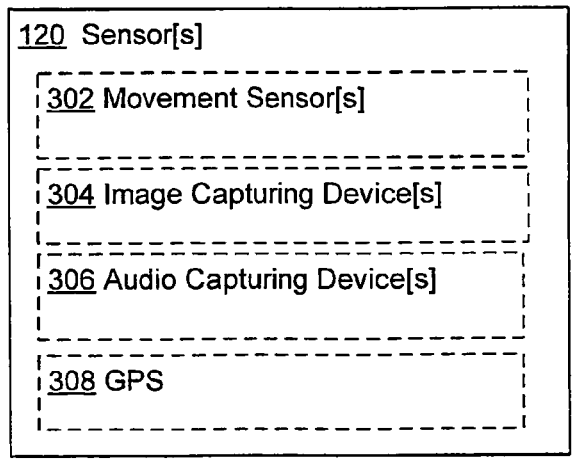
FIG. 3f shows various types of sensors 120 that may be included in the computing device 10' and the computing device 10" of FIGS. 3a and 3b.

FIG. 3f illustrates the various types of sensors 120 that may be included with the computing device 10*(e.g., the computing device 10' of FIG. 3a or the computing device 10" of FIG. 3b) of FIGS. 1, 2a, 2b, 2c, 2d, and 2e. As illustrated, the sensors 120 that may be included with the computing device 10* may include one or more movement sensors 302 (e.g., one or more accelerometers, inertia sensors, and/or gyro sensors), one or more image capturing devices 304 (e.g., one or more web cams, digital cameras, etc.), one or more audio capturing devices 306 (e.g., microphones), and/or a global positioning system (GPS) 308 (which may include any device that can determine its geographic location including those devices that determine its geographic location using triangulation techniques applied to signals transmitted by satellites or by communication towers such as cellular towers).

Figure 4:
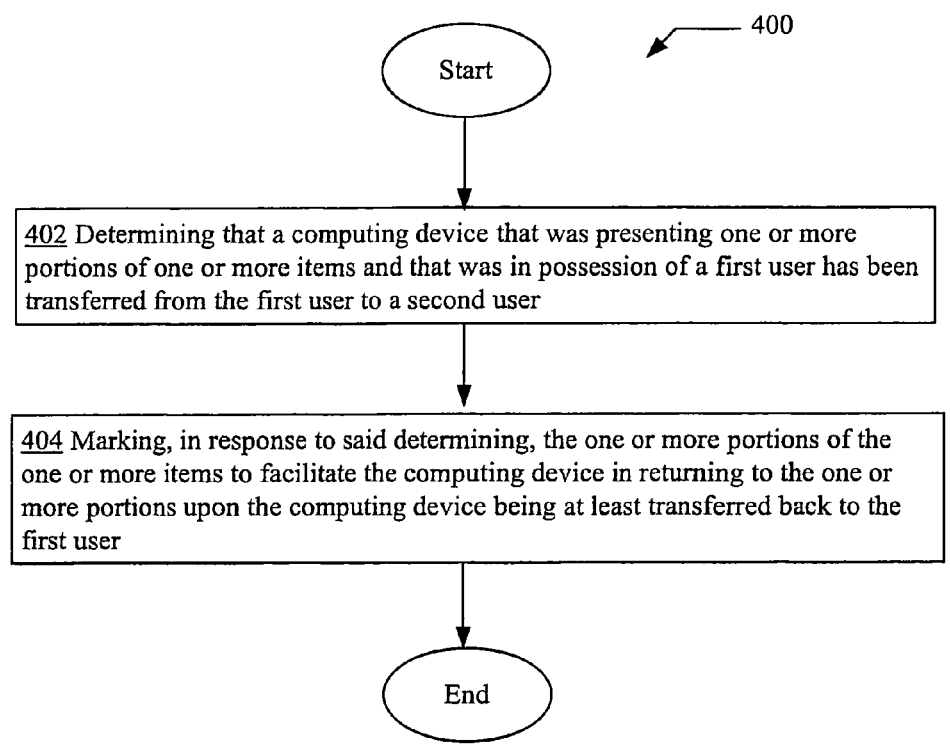
FIG. 4 is a high-level logic flowchart of a process.

A more detailed discussion related to the computing device 10* of FIGS. 1, 2a, 2b, 2c, 2d, and 2e (e.g., the computing device 10' of FIG. 3a or the computing device 10" of FIG. 3b) will now be provided with respect to the processes and operations to be described herein. FIG. 4 illustrates an operational flow 400 representing example operations for, among other things, determining that a computing device that was presenting one or more portions of one or more items (e.g., software applications, electronic documents including productivity documents, audio or image files, electronic messages including emails, passwords, so forth) and that was in possession of a first user 20 has been transferred from the first user 20 to a second user 30; and marking (e.g., memorializing or tagging), in response to said determining, the one or more portions of the one or more items to facilitate the computing device 10* in returning to the one or more portions upon the computing device 10* being, for example, transferred back to the first user 20. In FIG. 4 and in the following figures that include various examples of operational flows, discussions and explanations will be provided with respect to the computing device 10* described above and as illustrated in FIG. 1 and/or with respect to other examples (e.g., as provided in FIGS. 2a, 2b, 2c, 2d, 2e, 3a, 3b, 3c, 3d, 3e, 3f, 9a, 9b, and 9c) and contexts. However, it should be understood that the operational flows may be executed in a number of other environments and contexts, and/or in modified versions of FIGS. 2a, 2b, 2c, 2d, 2e, 3a, 3b, 3c, 3d, 3e, 3f, 9a, 9b, and 9c. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a transfer determining operation 402 for determining that a computing device that was presenting one or more portions of one or more items and that was in possession of a first user has been transferred from the first user to a second user. For instance, and as an illustration, the transfer determining module 102*(e.g., the transfer determining module 102' of FIG. 3a or the transfer determining module 102" of FIG. 3b) of the computing device 10* of FIG. 1 (e.g., the computing device 10' of FIG. 3a or the computing device 10" of FIG. 3b) determining that a computing device 10* that was presenting one or more portions of one or more items (e.g., software applications, textual files or documents, audio and/or image files, video files, electronic messages, web pages, and so forth) and that was in possession of a first user 20 has been transferred from the first user 20 to a second user 30. In various embodiments, the one or more portions of the one or more items may be presented by the computing device 10* when the one or more portions of the one or more items are opened or activated, are visually displayed and/or audibly played, and so forth by the computing device 10*. Note that a user (e.g., the first user 20 or the second user 30) may have possession of the computing device 10* may have possession of the computing device 10* when the user has control over the computing device 10* by holding the computing device 10* or by being in close proximity of the computing device (e.g., such as within arm's length of the computing device 10*).

In addition to the transfer determining operation 402, operational flow 400 may include a marking operation 404 for marking, in response to said determining, the one or more portions of the one or more items to facilitate the computing device in returning to the one or more portions upon the computing device being at least transferred back to the first user. For instance, the marking module 104*(e.g., the marking module 104' of FIG. 3a or the marking module 104" of FIG. 3b) of the computing device 10* of FIG. 1 (e.g., the computing device 10' of FIG. 3a or the computing device 10" of FIG. 3b) marking (e.g., memorizing, tagging, and so forth), in response to said determining that the computing device 10* has been transferred from the first user 20 to the second user 30, the one or more portions of the one or more items to facilitate the computing device 10* in returning to (e.g., re-presenting such as by re-displaying and/or audibly re-playing again) the one or more portions upon the computing device 10* being at least transferred back to the first user 20.

Figure 5A:
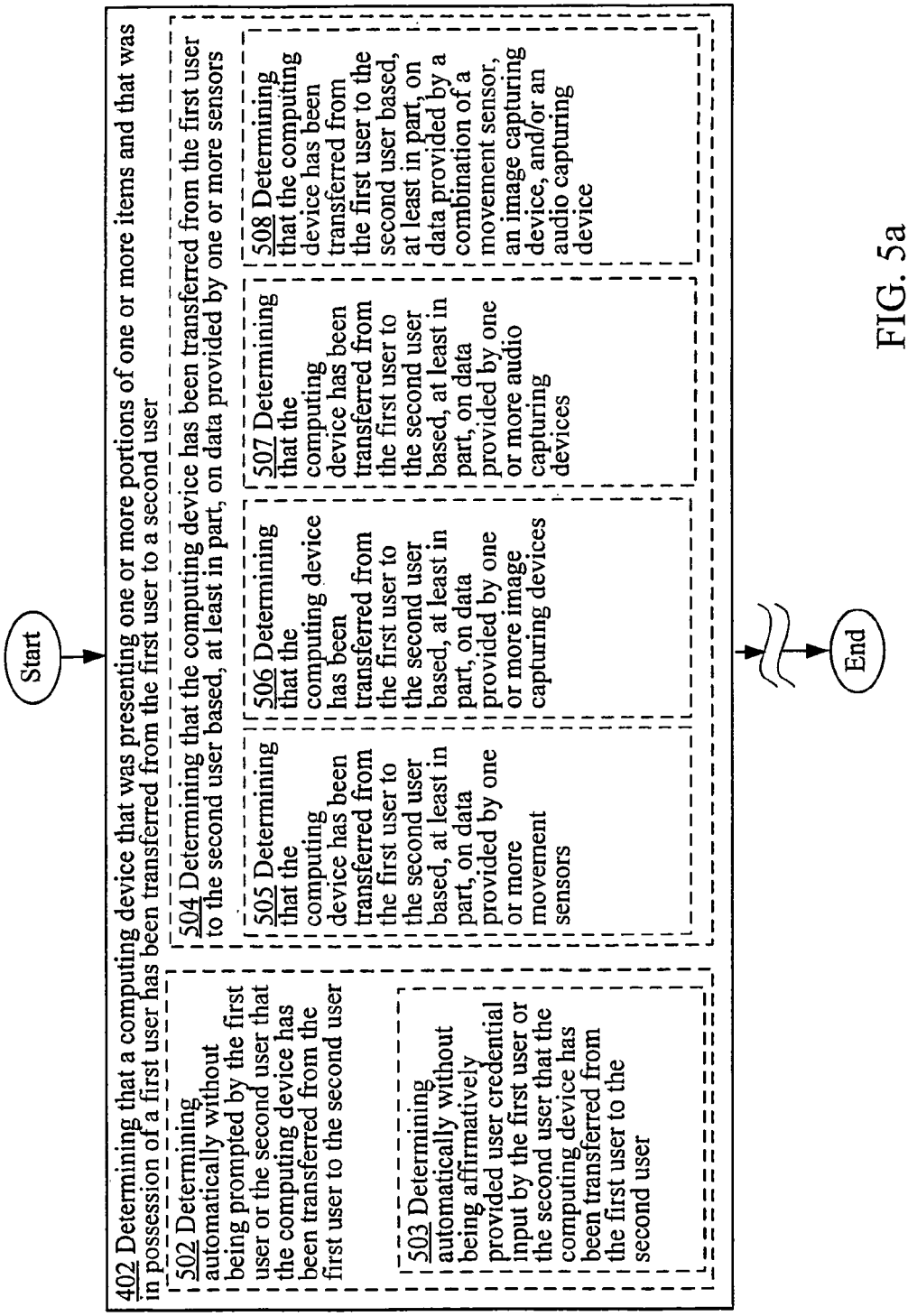
FIG. 5a is a high-level logic flowchart of a process depicting alternate implementations of the transfer determining operation 402 of FIG. 4.

As will be further described herein, the transfer determining operation 402 and the marking operation 404 of FIG. 4 may be executed in a variety of different ways in various alternative implementations. FIGS. 5a, 5b, 5c, 5d, 5e, 5f, 5g, 5h, and 5i, for example, illustrate at least some of the alternative ways that the transfer determining operation 402 of FIG. 4 may be executed in various alternative implementations. For example, in various implementations, the transfer determining operation 402 of FIG. 4 may include an operation 502 for determining automatically without being prompted by the first user or the second user that the computing device has been transferred from the first user to the second user as depicted in FIG. 5a. For instance, the transfer determining module 102*(see, for example, the transfer determining module 102' of FIG. 3a or the transfer determining module 102" of FIG. 3b) of the computing device 10* of FIG. 1 (e.g., the computing device 10' of FIG. 3a or the computing device 10" of FIG. 3b) determining automatically without being prompted by the first user 20 or the second user 30 that the computing device 10* has been transferred from the first user 20 to the second user 30.

As further illustrated in FIG. 5a, in some implementations, the transfer determining operation 402 may further include an operation 503 for determining automatically without being affirmatively provided user credential input by the first user or the second user that the computing device has been transferred from the first user to the second user. For instance, the transfer determining module 102* of the computing device 10* of FIG. 1 (e.g., the computing device 10' of FIG. 3a or the computing device 10" of FIG. 3b) determining automatically without being affirmatively provided user credential input (e.g., user identification input such as a username and/or a user password) by the first user 20 or the second user 30 that the computing device 10* has been transferred from the first user 20 to the second user 30. The phrase "determining automatically without being affirmatively provided user credential input" is in reference to making the determination automatically that the computing device 10* has been transferred from the first user 20 to the second user 30 without the first user 20 or the second user 30 inputting user credential data such as a username or a password. For example, the computing device 10* may be designed to make the transfer determination that the computing device 10* has been transferred from the first user 20 to the second user 30 without the second user 30 having to input a username or password as is sometimes required in order to use or log on to a computing device 10*.

In the same or different implementations, the transfer determining operation 402 may additionally or alternative include an operation 504 for determining that the computing device has been transferred from the first user to the second user based, at least in part, on data provided by one or more sensors. For instance, the transfer determining module 102* of the computing device 10* of FIG. 1 determining that the computing device 10* has been transferred from the first user 20 to the second user 30 based, at least in part, on data provided by one or more sensors 120 (see FIGS. 3a, 3b, and 3f.

Data from various types of sensors 120 may be used in order to determine whether the computing device 10 has been transferred. For example, and as further illustrated in FIG. 5a, operation 504 may include an operation 505 for determining that the computing device has been transferred from the first user to the second user based, at least in part, on data provided by one or more movement sensors. For instance, the transfer determining module 102* of the computing device 10* of FIG. 1 determining that the computing device 10* has been transferred from the first user 20 to the second user 30 based, at least in part, on data provided by one or more movement sensors 302 (e.g., an accelerometer, an inertia sensor, or a gyro sensor) that are designed to sense (e.g., directly detect) movements of the computing device 10*.

In the same or different implementations, operation 504 may include an operation 506 for determining that the computing device has been transferred from the first user to the second user based, at least in part, on data provided by one or more image capturing devices as further depicted in FIG. 5a. For instance, the transfer determining module 102* of the computing device 10* of FIG. 1 determining that the computing device 10 has been transferred from the first user 20 to the second user 30 based, at least in part, on data provided by one or more image capturing devices 304 (e.g., a webcam, a digital camera, and so forth), which may be integrated in the computing device 10*. Note that references to "computing device 10*" in the following description, unless indicated otherwise, may be in reference to the computing device 10' of FIG. 3a or to the computing device 10" of FIG. 3b.

In the same or alternative implementations, operation 504 may include an operation 507 for determining that the computing device has been transferred from the first user to the second user based, at least in part, on data provided by one or more audio capturing devices. For instance, the transfer determining module 102* of the computing device 10* of FIG. 1 determining that the computing device 10* has been transferred from the first user 20 to the second user 30 based, at least in part, on data provided by one or more audio capturing devices 306 (e.g., microphone), which may be integrated in the computing device 10*.

In some cases, operation 504 may include an operation 508 for determining that the computing device has been transferred from the first user to the second user based, at least in part, on data provided by a combination of a movement sensor, an image capturing device, and/or an audio capturing device. For instance, the transfer determining module 102* of the computing device 10* of FIG. 1 determining that the computing device 10* has been transferred from the first user 20 to the second user 30 based, at least in part, on data provided by a combination of a movement sensor 302, an image capturing device 304, and/or an audio capturing device 306.

Figure 5B:
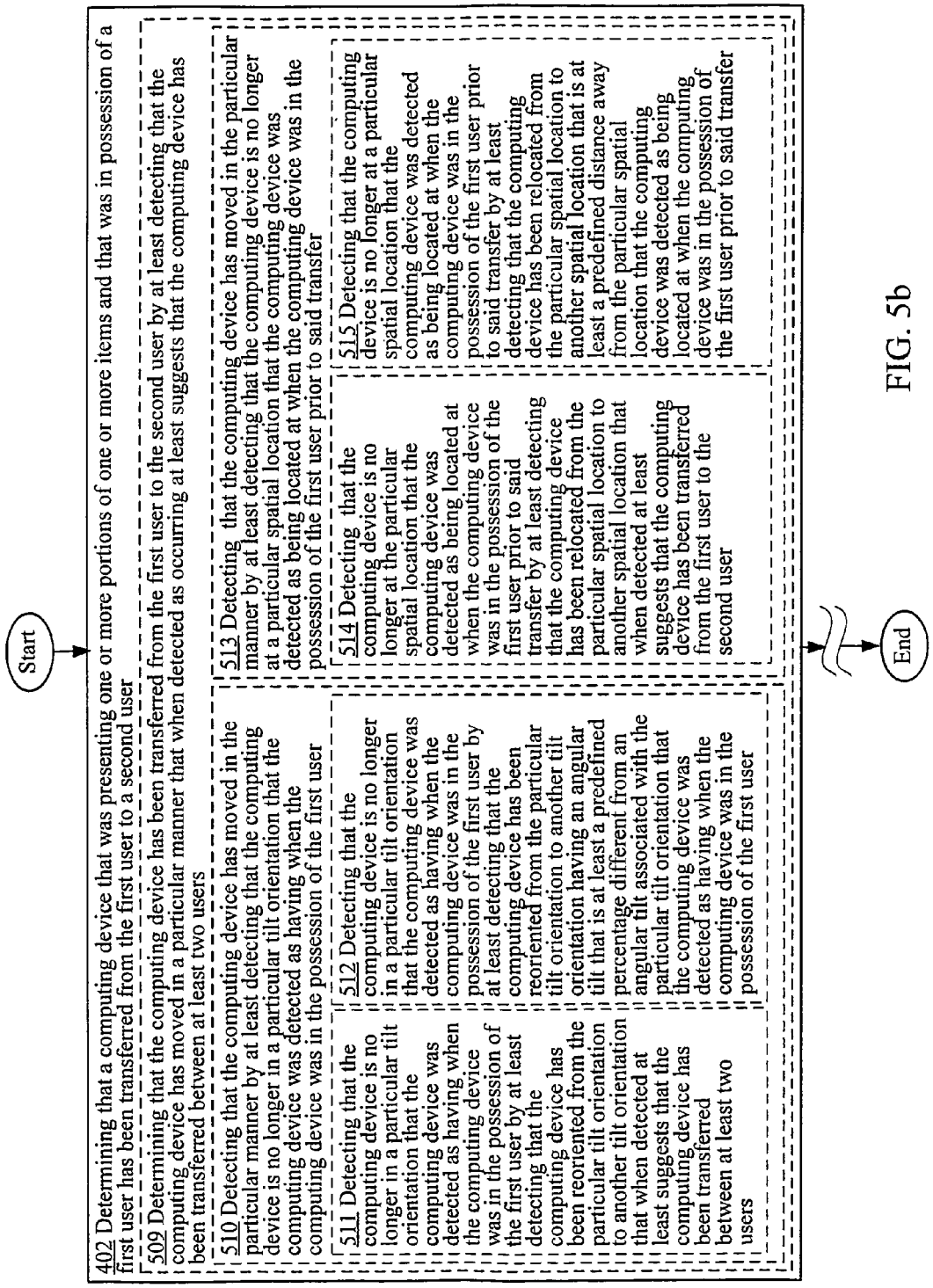
FIG. 5b is a high-level logic flowchart of a process depicting alternate implementations of the transfer determining operation 402 of FIG. 4.

In various implementations, the transfer determining operation 402 of FIG. 4 may involve making the determination that the computing device 10* has been transferred from the first user 20 to the second user 30 based, at least in part, on the detected movements of the computing device 10*. For example, in some implementations, the transfer determining operation 402 may include an operation 509 for determining that the computing device has been transferred from the first user to the second user by at least detecting that the computing device has moved in a particular manner that when detected as occurring at least suggests that the computing device has been transferred between at least two users as depicted in FIG. 5b. For instance, the transfer determining module 102* including a particular movement detecting module 210 (see FIG. 3c) of the computing device 10* determining that the computing device 10* has been transferred from the first user 20 to the second user 30 when the particular movement detecting module 210 at least detects that the computing device 10* has moved in a particular manner (e.g., has spatially moved along a particular path or moved to a particular spatial location with respect to its initial spatial location) that when detected as occurring (e.g., upon being detected as occurring) at least suggests (e.g., infers or implies) that the computing device 10* has been transferred between two users.

Figure 5C:
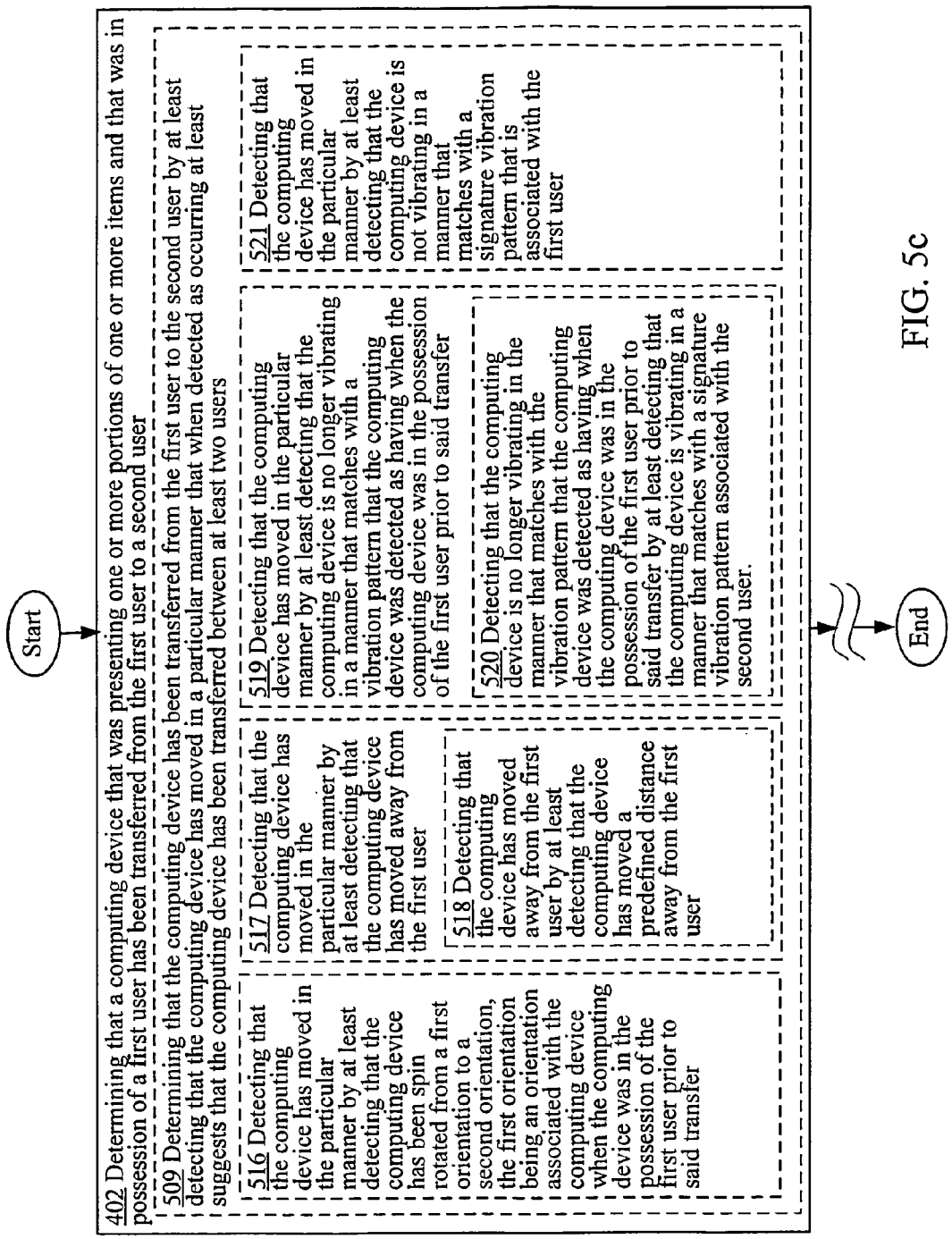
FIG. 5c is a high-level logic flowchart of a process depicting alternate implementations of the transfer determining operation 402 of FIG. 4.
Figure 5D:
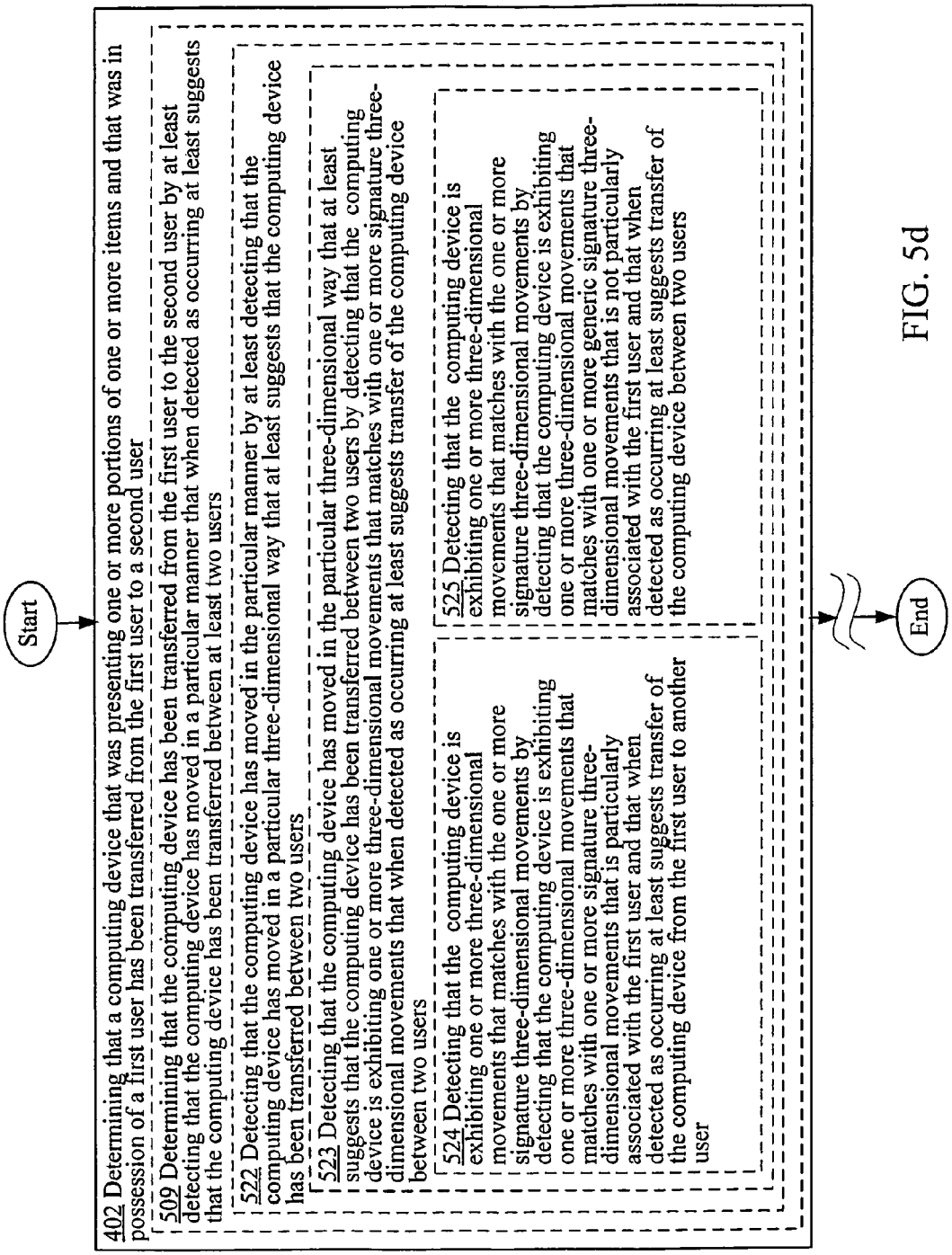
FIG. 5d is a high-level logic flowchart of a process depicting alternate implementations of the transfer determining operation 402 of FIG. 4.

As further illustrated in FIGS. 5b, 5c, and 5d, operation 509 may, in some cases, involve one or more operations for detecting various types of movements of the computing device 10* in order to determine or at least infer that the computing device 10* has been transferred from a first user 20 to a second user 30. For example, in some implementations, operation 509 may include an operation 510 for detecting that the computing device has moved in the particular manner by at least detecting that the computing device is no longer in a particular tilt orientation that the computing device was detected as having when the computing device was in the possession of the first user as illustrated in FIG. 5b. For instance, the particular movement detecting module 210 including the tilt detecting module 212 (see FIG. 3c) of the computing device 10*detecting that the computing device has moved in the particular manner when the tilt detecting module 212 at least detects that the computing device 10* is no longer in a particular tilt orientation that the computing device 10* was detected as having when the computing device 10* was in the possession of the first user 20. Thus, in various implementations, the computing device 10* may also be endowed with logic to determine whether the computing device 10 was in the possession of the first user 20. Such a determination for determining whether the computing device 10* was in the possession of a particular user, such as the first user 20, may be made using a variety of sensing means to automatically detect the presence of a user. For example, a facial recognition system or application may be used in order to determine whether the face of the first user 20* is detected in the vicinity of the computing device 10*(e.g., in the visual range of a webcam or other types of image capturing devices 304 that may be part of the computing device 10*). In other cases, a voice recognition system or application may be used in order to determine whether the voice of the first user 20 is detected in the vicinity of the computing device 10*. In still other cases, other sensing or detecting means for detecting indicators (e.g., signature movements or vibration) that indicate the presence or absence of the first user 20 in the vicinity of the computing device 10* may be employed in order to determine whether the first user 20 has possession of the computing device 10*.

In some cases, operation 510 may, in turn, include an operation 511 for detecting that the computing device is no longer in a particular tilt orientation that the computing device was detected as having when the computing device was in the possession of the first user by at least detecting that the computing device has been reoriented from the particular tilt orientation to another tilt orientation that when detected at least suggests that the computing device has been transferred between at least two users as further depicted in FIG. 5b. For instance, the tilt detecting module 212 of the computing device 10* detecting that the computing device 10* is no longer in a particular tilt orientation that the computing device 10* was detected as having when the computing device 10* was in the possession of the first user 20 by at least detecting that the computing device 10* has been reoriented from the particular tilt orientation to another tilt orientation that when detected at least suggests that the computing device 10* has been transferred between at least two users (e.g., the first user 20 and the second user 30).

In the same or different implementations, operation 510 may include an operation 512 for detecting that the computing device is no longer in a particular tilt orientation that the computing device was detected as having when the computing device was in the possession of the first user by at least detecting that the computing device has been reoriented from the particular tilt orientation to another tilt orientation having an angular tilt that is at least a predefined percentage different from an angular tilt associated with the particular tilt orientation that the computing device was detected as having when the computing device was in the possession of the first user as further depicted in FIG. 5b. For instance, the tilt detecting module 212 of the computing device 10* detecting that the computing device 10* is no longer in a particular tilt orientation that the computing device 10* was detected as having when the computing device 10* was in the possession of the first user 20 by at least detecting that the computing device 10* has been reoriented from the particular tilt orientation to another tilt orientation having an angular tilt that is at least a predefined percentage different from an angular tilt associated with the particular tilt orientation that the computing device 10* was detected as having when the computing device 10* was in the possession of the first user 20. Such an operation may be executed in order to, for example, filter out "noise" tilts (e.g., random changes in tilt caused by the first user 20 when, for example, the first user 20 accidentally or intentionally moves his/her body or hands in order to, for example, get in a more comfortable body position causing the computing device 10* to move and change in tilt orientation).

In various implementations, the operation 509 for determining that the computing device has been transferred from the first user to the second user by at least detecting that the computing device has moved in a particular manner that when detected as occurring at least suggests that the computing device has been transferred between at least two users may involve detecting that the computing device 10* has at least been relocated away from a particular location. For example, in some implementations, operation 509 may include an operation 513 for detecting that the computing device has moved in the particular manner by at least detecting that the computing device is no longer at a particular spatial location that the computing device was detected as being located at when the computing device was in the possession of the first user prior to said transfer as depicted in FIG. 5b. For instance, the particular movement detecting module 210 including the spatial location detecting module 214 (see FIG. 3c) of the computing device 10\* detecting that the computing device 10\* has moved in a particular manner when the spatial location detecting module 214 at least detects that the computing device 10\* is no longer at a particular spatial location (e.g., see spatial location 46 of FIG. 2d) that the computing device 10\* was detected as being located at when the computing device 10\* was in the possession of the first user 20 prior to said transfer.

In various implementations, operation 513 may include an operation 514 for detecting that the computing device is no longer at the particular spatial location that the computing device was detected as being located at when the computing device was in the possession of the first user prior to said transfer by at least detecting that the computing device has been relocated from the particular spatial location to another spatial location that when detected at least suggests that the computing device has been transferred from the first user to the second user. For instance, the spatial location detecting module 214 of the computing device 10\* detecting that the computing device 10\* is no longer at a particular spatial location 46 (see FIG. 3d) that the computing device 10\* was detected as being located at when the computing device 10\* was in the possession of the first user 20 prior to said transfer by at least detecting that the computing device 10\* has been relocated from the particular spatial location 46 to another spatial location 48 that when detected at least suggests that the computing device 10\* has been transferred from the first user 20 to the second user 30.

In the same or different implementations, operation 513 may include an operation 515 for detecting that the computing device is no longer at a particular spatial location that the computing device was detected as being located at when the computing device was in the possession of the first user prior to said transfer by at least detecting that the computing device has been relocated from the particular spatial location to another spatial location that is at least a predefined distance away from the particular spatial location that the computing device was detected as being located at when the computing device was in the possession of the first user prior to said transfer. For instance, the spatial location detecting module 214 of the computing device 10\* detecting that the computing device 10\* is no longer at a particular spatial location (e.g., spatial location 46 of FIG. 3d) that the computing device 10\* was detected as being located at when the computing device 10\* was in the possession of the first user 20 prior to said transfer by at least detecting that the computing device 10\* has been relocated from the particular spatial location 46 to another spatial location 48 that is at least a predefined distance away from the particular spatial location 46 that the computing device 10\* was detected as being located at when the computing device 10\* was in the possession of the first user 20 prior to said transfer.

Turning to FIG. 5c, in various implementations, operation 509 for determining that the computing device has been transferred from the first user to the second user by at least detecting that the computing device has moved in a particular manner that when detected as occurring at least suggests that the computing device has been transferred between at least two users may include an operation 516 for detecting that the computing device has moved in the particular manner by at least detecting that the computing device has been spin rotated from a first orientation to a second orientation, the first orientation being an orientation associated with the computing device when the computing device was in the possession of the first user prior to said transfer. For instance, the particular movement detecting module 210 including the spin rotation detecting module 216 (see FIG. 3c) of the computing device 10\* detecting that the computing device 10\* has moved in the particular manner when the spin rotation detecting module 216 at least detects that the computing device 10\* has been spin rotated from a first orientation to a second orientation, the first orientation being an orientation associated with the computing device 10\* when the computing device 10\* was in the possession of the first user 20 prior to said transfer.

In the same or different implementations, operation 509 may include an operation 517 for detecting that the computing device has moved in the particular manner by at least detecting that the computing device has moved away from the first user. For instance, the particular movement detecting module 210 including the moving away detecting module 217 (see FIG. 3c) of the computing device 10\* detecting that the computing device 10\* has moved in a particular manner when the moving away detecting module 217 detects that the computing device 10\* has moved away from the first user 20. Such detection may be based on data provided by one or more sensors 120 including one or more movement sensors 302, one or more image capturing devices 304 (which may detect the face of the first user 20 moving away from the computing device 10\*), and/or one or more audio capturing devices 306 (which may detect a voice having the voice signature of the first user 20 diminishing in volume thus inferring or suggesting that the first user 20 is or was moving away from the computing device 10\*).

In some implementations, operation 517 may further include an operation 518 for detecting that the computing device has moved away from the first user by at least detecting that the computing device has moved a predefined distance away from the first user. For instance, the moving away detecting module 217 of the computing device 10\* detecting that the computing device 10\* has moved away from the first user 20 by at least detecting that the computing device 10\* has moved a predefined distance away from the first user 20. In doing so, the computing device 10\* may filter out movements that may be considered "noise" (e.g., random or accidental relocation movements of the computing device 10\* caused by, for example, the random or accidental movements of the first user 20 holding the computing device 10\*).

In various embodiments, operation 509 may involve tracking or sensing one or more vibrations that may be exhibited by the computing device 10\* through its physical contact with one or more users. That is, users may each be associated with different and relatively distinct signature vibration patterns (e.g., distinct heart rates). Thus, by detecting at least a change in vibration as exhibited by the computing device 10\* as a result of, for example, the computing device 10\* being passed from one user to another user, at least an inference may be made that a transfer of the computing device 10\* has occurred. Thus, in various implementations, operation 509 may include an operation 519 for detecting that the computing device has moved in the particular manner by at least detecting that the computing device is no longer vibrating in a manner that matches with a vibration pattern that the computing device was detected as having when the computing device was in the possession of the first user prior to said transfer as further illustrated in FIG. 5c. For instance, the particular movement detecting module 210 including the vibration detecting module 218 (see FIG. 3c) of the computing device 10\* determining that the computing device 10\* has moved in a particular manner when the vibration detecting module 218 at least detects that the computing device 10\* is no longer vibrating in a manner that matches with a vibration pattern that the computing device 10\* was detected having when the computing device 10* was in the possession of the first user 20 prior to said transfer.

As further illustrated in FIG. 5c, in some implementations, operation 519 may further include an operation 520 for detecting that the computing device is no longer vibrating in the manner that matches with the vibration pattern that the computing device was detected as having when the computing device was in the possession of the first user prior to said transfer by at least detecting that the computing device is vibrating in a manner that matches with a signature vibration pattern associated with the second user. For instance, the vibration detecting module 218 of the computing device 10* detecting that the computing device 10* is no longer vibrating in a manner that matches with a vibration pattern that the computing device 10* was detected as having when the computing device 10* was in the possession of the first user 20 prior to said transfer by at least detecting that the computing device 10* is vibrating in a manner that matches with a signature vibration pattern associated with the second user 30. For example, if the second user 30 is a primary user or an owner of the computing device 10* than the computing device 10* may store in its memory 114 the signature vibration pattern of the second user 30.

In the same or different implementations, operation 509 may include an operation 521 for detecting that the computing device has moved in the particular manner by at least detecting that the computing device is not vibrating in a manner that matches with a signature vibration pattern that is associated with the first user. For instance, particular movement detecting module 210 including the vibration detecting module 218 of the computing device 10* determining that the computing device 10* has moved in a particular manner when the vibration detecting module 218 at least detects that the computing device 10* is not vibrating in a manner that matches with a signature vibration pattern that is associated with the first user 20.

Referring now to FIG. 5d, in various implementations, operation 509 for determining that the computing device has been transferred from the first user to the second user by at least detecting that the computing device has moved in a particular manner that when detected as occurring at least suggests that the computing device has been transferred between at least two users may involve tracking the overall movements of the computing device 10* rather than tracking any particular type of movements (e.g., tilt movements, spin rotation movements, spatial relocation movements, vibration movements, etc.) in order to determine whether the computing device 10* has been transferred from the first user 20 to the second user 30. For example, in some implementations, operation 509 may include an operation 522 for detecting that the computing device has moved in the particular manner by at least detecting that the computing device has moved in a particular three-dimensional way that at least suggests that the computing device has been transferred between two users. For instance, the particular movement detecting module 210 including the three-dimensional movement detecting module 219 (see FIG. 3c) of the computing device 10* detecting that the computing device 10* has moved in the particular manner when the three-dimensional movement detecting module 219 at least detects that the computing device 10* has moved in a particular three-dimensional way that at least suggests that the computing device 10* has been transferred between two users.

As further illustrated in FIG. 5d, operation 522 may include one or more additional operations in various alternative implementations. For example, in some implementations, operation 522 may include an operation 523 for detecting that the computing device has moved in the particular three-dimensional way that at least suggests that the computing device has been transferred between two users by detecting that the computing device is exhibiting one or more three-dimensional movements that matches with one or more signature three-dimensional movements that when detected as occurring at least suggests transfer of the computing device between two users. For instance, the three-dimensional movement detecting module 219 of the computing device 10* detecting that the computing device 10* has moved in the particular three-dimensional way that at least suggests that the computing device 10* has been transferred between two users (e.g., between the first user 20 and the second user 30) by detecting that the computing device 10* is exhibiting one or more three-dimensional movements that matches with one or more signature three-dimensional movements (e.g., one or more signature three-dimensional movements that may be stored in the movement library 170 of the memory 114) that when detected as occurring at least suggests transfer of the computing device 10* between two users.

In some cases, operation 523 may further include an operation 524 for detecting that the computing device is exhibiting one or more three-dimensional movements that matches with the one or more signature three-dimensional movements by detecting that the computing device is exhibiting one or more three-dimensional movements that matches with one or more signature three-dimensional movements that is particularly associated with the first user and that when detected as occurring at least suggests transfer of the computing device from the first user to another user. For instance, the three-dimensional movement detecting module 219 of the computing device 10* detecting that the computing device 10* is exhibiting one or more three-dimensional movements that matches with the one or more signature three-dimensional movements by detecting that the computing device 10* is exhibiting one or more three-dimensional movements that matches with one or more signature three-dimensional movements (e.g., as indicated in the movement library 170 of the memory 114) that is particularly associated with the first user 20 and that when detected as occurring at least suggests transfer of the computing device 10* from the first user 20 to another user. In some implementations, the one or more signature three-dimensional movements of the computing device 10* may be the one or more signature movements of the computing device 10* that may be exhibited by the computing device 10* when the first user 20 is passing-off (e.g., transferring) the computing device 20 to another user. For these implementations, the computing device 10* may be endowed with logic that may allow the computing device 10* to detect and learn its own movements when the computing device 10* is being handed-off from the first user 20 to another user, and based on such detected/learned movements (e.g., signature movements) the computing device 10*(or its endowed logic) may determine or at least infer that the computing device 10* has been transferred from the first user 20 to another user whenever it detects movements that matches with the previously detected/learned movements. In various implementations, the movements of the computing device 10* may be monitored using one or more movements sensors 302 and/or one or more image capturing devices 304.

In the same or different implementations, operation 523 may include an operation 525 for detecting that the computing device is exhibiting one or more three-dimensional movements that matches with the one or more signature three-dimensional movements by detecting that the computing device is exhibiting one or more three-dimensional movements that matches with one or more generic signature three-dimensional movements that is not particularly associated with the first user and that when detected as occurring at least suggests transfer of the computing device between two users. For instance, the three-dimensional movement detecting module 219 of the computing device 10* detecting that the computing device 10* is exhibiting one or more three-dimensional movements that matches with the one or more signature three-dimensional movements by detecting that the computing device 10* is exhibiting one or more three-dimensional movements that matches with one or more generic signature three-dimensional movements that is not particularly associated with the first user 20 (e.g., one or more generic signature three-dimensional movements of the computing device 10* that are not associated with any specific user) and that when detected as occurring at least suggests transfer of the computing device between two users.

Figure 5E:
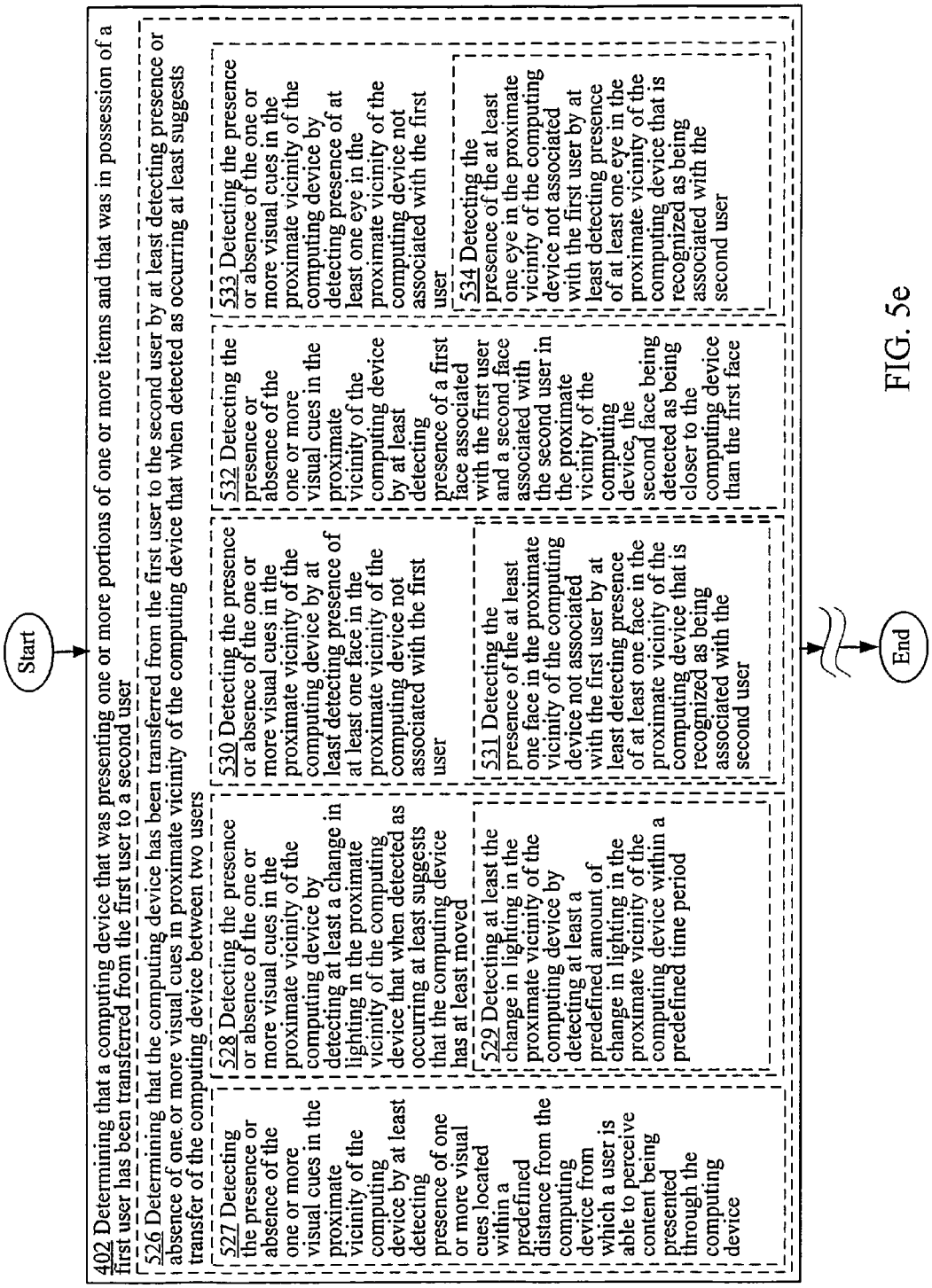
FIG. 5e is a high-level logic flowchart of a process depicting alternate implementations of the transfer determining operation 402 of FIG. 4.

Referring now to FIG. 5e, in various implementations, the transfer determining operation 402 of FIG. 4 may involve determining that the computing device 10* has been transferred from the first user 20 to the second user 30 based, at least in part, on one or more visual cues. For example, in some implementations, the transfer determining operation 402 may include an operation 526 for determining that the computing device has been transferred from the first user to the second user by at least detecting presence or absence of one or more visual cues in proximate vicinity of the computing device that when detected as occurring at least suggests transfer of the computing device between two users as illustrated in FIG. 5e. For instance, the transfer determining module 102* including the visual cue detecting module 220 (see FIG. 3c) of the computing device 10* determining that the computing device 10* has been transferred from the first user 20 to the second user 30 when the visual cue detecting module 220 at least detects presence or absence of one or more visual cues (e.g., detecting presence or absence of faces of the first user 20 and/or second user 30, detecting background movement relative to the computing device 10*, and so forth) in proximate vicinity (e.g., within a distance from the computing device 10* from which an object or a person is visually discernible or identifiable by the computing device 10*) of the computing device 10* that when detected as occurring at least suggests transfer of the computing device 10* between two users.

Figure 5F:
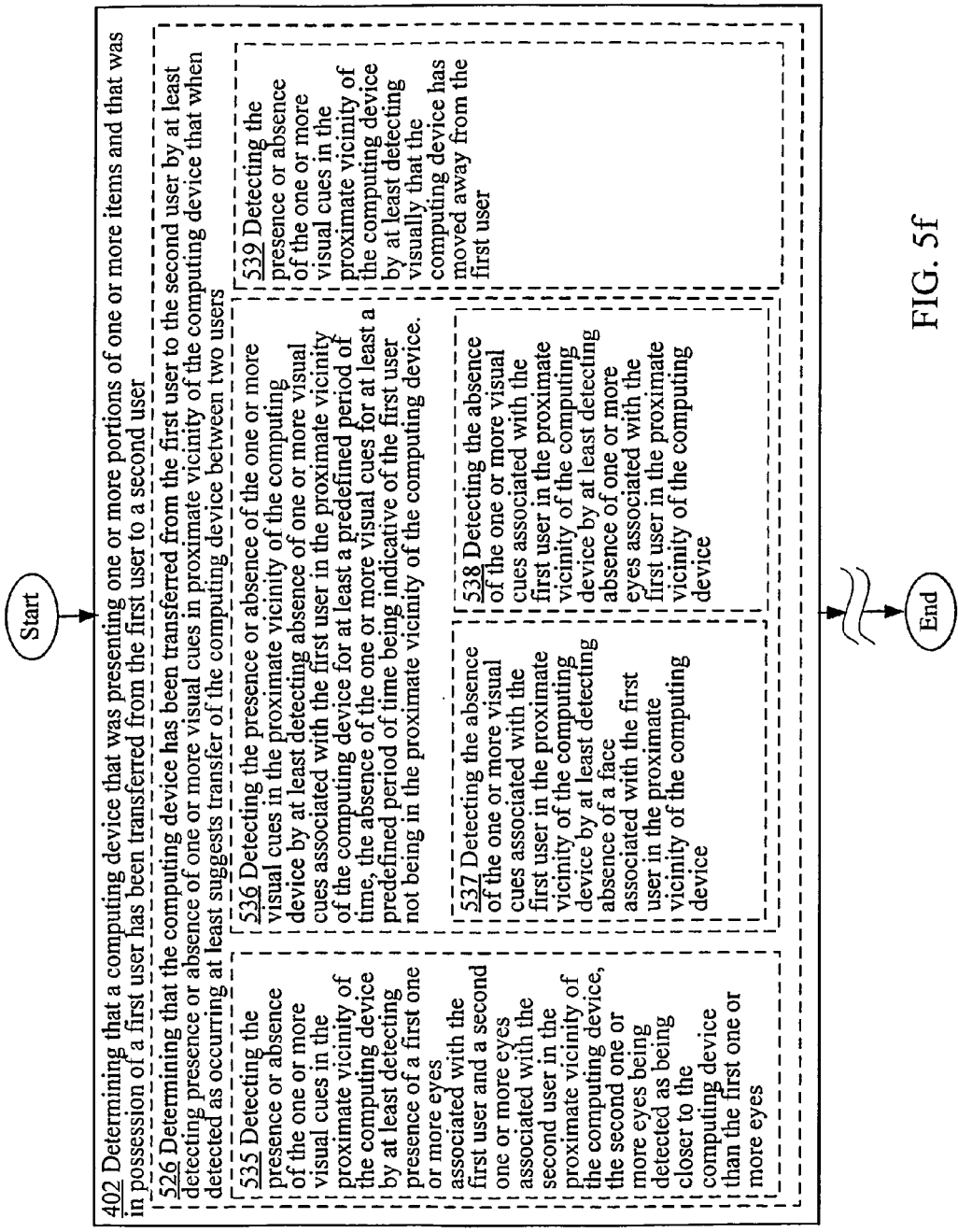
FIG. 5f is a high-level logic flowchart of a process depicting alternate implementations of the transfer determining operation 402 of FIG. 4.
Figure 5G:
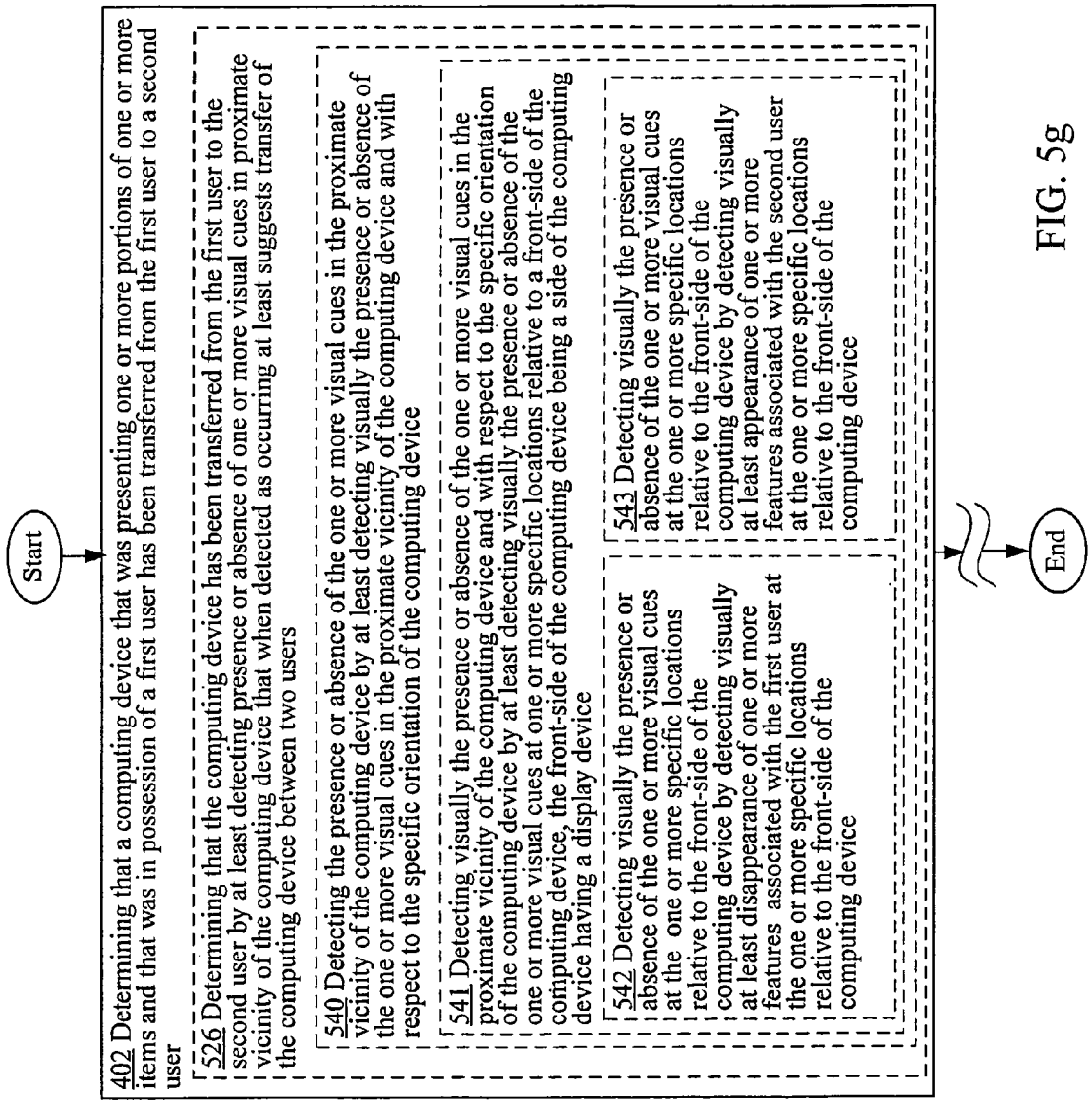
FIG. 5g is a high-level logic flowchart of a process depicting alternate implementations of the transfer determining operation 402 of FIG. 4.

As further illustrated in FIGS. 5e, 5f, and 5g, operation 526 may be implemented in a number of different ways in various alternative implementations. For example, in some implementations, operation 526 may include an operation 527 for detecting the presence or absence of the one or more visual cues in the proximate vicinity of the computing device by at least detecting presence of one or more visual cues located within a predefined distance from the computing device from which a user is able to perceive content being presented through the computing device as illustrated in FIG. 5e. For instance, the visual cue detecting module 220 of the computing device 10* detecting the presence or absence of the one or more visual cues in the proximate vicinity of the computing device 10* by at least detecting presence of one or more visual cues located within a predefined distance from the computing device 10* from which a user is able to (e.g., user can) perceive content being presented through the computing device 10*. For example, if the face (or eyes) of the second user 30 is determined to be within a distance from the computing device 10* from which the second user 30 is able to visually ascertain what is being displayed through the computing device 10*, then determining that the transfer of the computing device 10* has occurred from the first user 20 to the second user 30.

In the same or different implementations, operation 526 may include an operation 528 for detecting the presence or absence of the one or more visual cues in the proximate vicinity of the computing device by detecting at least a change in lighting in the proximate vicinity of the computing device that when detected as occurring at least suggests that the computing device has at least moved. For instance, the visual cue detecting module 220 including the lighting change detecting module 221 (see FIG. 3c) of the computing device 10* detecting the presence or absence of the one or more visual cues in the proximate vicinity of the computing device 10* when the lighting change detecting module 221 detects at least a change in lighting in the proximate vicinity of the computing device 10* that when detected as occurring at least suggests that the computing device 10* has at least moved. That is, typically when a device such as a computing device 10* is moved from one location to another location, there may be a variation in the type/amount of light being exposed to the device. Thus, by merely detecting changes in lighting conditions surrounding the computing device 10*, an inference could be made that, for example, a computing device 10* is being moved/transferred.

In some cases, operation 528 may further include an operation 529 for detecting at least the change in lighting in the proximate vicinity of the computing device by detecting at least a predefined amount of change in lighting in the proximate vicinity of the computing device within a predefined time period as further depicted in FIG. 5e. For instance, the lighting change detecting module 221 of the computing device 10* detecting at least the change in lighting in the proximate vicinity of the computing device 10* by detecting at least a predefined amount of change in lighting in the proximate vicinity of the computing device 10* within a predefined time period. In doing so, inconsequential lighting changes will be filtered out such as those as a result of changes in daylight, which typically occurs slowly.

In the same or different implementations, operation 526 may include an operation 530 for detecting the presence or absence of the one or more visual cues in the proximate vicinity of the computing device by at least detecting presence of at least one face in the proximate vicinity of the computing device not associated with the first user. For instance, the visual cue detecting module 220 including the face detecting module 222 (see FIG. 3c) of the computing device 10* detecting the presence or absence of the one or more visual cues in the proximate vicinity of the computing device 10* when the face detecting module 222 at least detects presence of at least one face (e.g., detecting presence of the at least one face based on image data provided by an image capturing device 304) in the proximate vicinity of the computing device 10* not associated with the first user 20.

As further illustrated in FIG. 5e, in some implementations, operation 530 may include an operation 531 for detecting the presence of the at least one face in the proximate vicinity of the computing device not associated with the first user by at least detecting presence of at least one face in the proximate vicinity of the computing device that is recognized as being associated with the second user. For instance, the face detecting module 222 of the computing device 10* detecting the presence of the at least one face in the proximate vicinity of the computing device 10* not associated with the first user 20 by at least detecting presence of at least one face in the proximate vicinity of the computing device 10* that is recognized or detected as being associated with the second user 30. In some cases, the computing device 10* may store in its memory 114 facial images of one or more users including, for example, a facial image of the second user 30.

In some cases, operation 526 may alternatively or additionally include an operation 532 for detecting the presence or absence of the one or more visual cues in the proximate vicinity of the computing device by at least detecting presence of a first face associated with the first user and a second face associated with the second user in the proximate vicinity of the computing device, the second face being detected as being closer to the computing device than the first face. For instance, the visual cue detecting module 220 including the face detecting module 222 of the computing device 10* detecting the presence or absence of the one or more visual cues in the proximate vicinity of the computing device 10* when the face detecting module 222 at least detects presence of a first face associated with the first user 20 and a second face associated with the second user 30 in the proximate vicinity of the computing device 10*, the second face being detected as being closer to the computing device 10*than the first face of the first user 20. Note that in this particular implementation, the computing device 10* or at least the logic endowed with the computing device 10* may only need to recognize that the first face and the second face are two different faces belonging to, for example, two different users.

In the same or different implementations, operation 526 may include an operation 533 for detecting the presence or absence of the one or more visual cues in the proximate vicinity of the computing device by detecting presence of at least one eye in the proximate vicinity of the computing device not associated with the first user as further depicted in FIG. 5e. For instance, the visual cue detecting module 220 including the eye detecting module 223 (see FIG. 3c) of the computing device 10* detecting the presence or absence of the one or more visual cues in the proximate vicinity of the computing device 10* when the eye detecting module 223 detects presence of at least one eye (e.g., iris or retina characteristics) in the proximate vicinity of the computing device 10* not associated with the first user 20. In other words, determining that there is at least one eye having iris or retina characteristics in the proximate vicinity of the computing device 10* that is different from the iris or retina characteristics of the eye or eyes of the first user 20.

In some cases operation 533 may further include an operation 534 for detecting the presence of the at least one eye in the proximate vicinity of the computing device not associated with the first user by at least detecting presence of at least one eye in the proximate vicinity of the computing device that is recognized as being associated with the second user. For instance, the eye detecting module 223 of the computing device 10* detecting the presence of the at least one eye in the proximate vicinity of the computing device 10* not associated with the first user 20 by at least detecting presence of at least one eye in the proximate vicinity of the computing device 10* that is recognized as being associated with the second user 30. Thus, in some cases, the computing device 10* may store in its memory 114 images of eyes (e.g., images of irises or retinas) belonging to one or more users including, for example, the second user 30.

In the same or different implementations, operation 526 may include an operation 535 for detecting the presence or absence of the one or more visual cues in the proximate vicinity of the computing device by at least detecting presence of a first one or more eyes associated with the first user and a second one or more eyes associated with the second user in the proximate vicinity of the computing device, the second one or more eyes being detected as being closer to the computing device than the first one or more eyes as illustrated in FIG. 5f. For instance, the visual cue detecting module 220 including the eye detecting module 223 of the computing device 10* detecting presence or absence of one or more visual cues in the proximate vicinity of the computing device 10* when the eye detecting module 223 at least detects presence of a first one or more eyes associated with the first user 20 and a second one or more eyes associated with the second user 30 in the proximate vicinity of the computing device 10*, the second one or more eyes being detected as being closer to the computing device 10* than the first one or more eyes.

In the same or different implementations, operation 526 may include an operation 536 for detecting the presence or absence of the one or more visual cues in the proximate vicinity of the computing device by at least detecting absence of one or more visual cues associated with the first user in the proximate vicinity of the computing device for at least a predefined period of time, the absence of the one or more visual cues for at least a predefined period of time being indicative of the first user not being in the proximate vicinity of the computing device as further illustrated in FIG. 5f. For instance, the visual cue detecting module 220 of the computing device 10* detecting the presence or absence of the one or more visual cues in the proximate vicinity of the computing device 10* by at least detecting absence of one or more visual cues associated with the first user 20 in the proximate vicinity of the computing device 10* for at least a predefined period of time, the absence of the one or more visual cues (e.g., an eye or a face associated with the first user 20*) for at least a predefined period of time being indicative of the first user 20 not being in the proximate vicinity of the computing device 10*. Note that since it is possible for the one or more visual cues (e.g., an eye or a face) of the first user 20 to disappear momentarily for short periods of time (such as when the head of the first user 20 turns to look at something other than the computing device 10*) even though the first user 20 has not actually given up control of the computing device 10* or has not transferred the computing device 10* to another user (e.g., the second user 30), the computing device 10*(or its logic) may not infer or conclude that the computing device 10* has been transferred unless the visual cue (e.g., eye or face of the first user 20) is detected as being absent in the proximate vicinity of the computing device 10* for at least a certain amount of predefined time (e.g., 10 second, 20 seconds, 25 seconds, or some other time period).

As further illustrated in FIG. 5f, in some implementations, operation 536 may include one or more additional operations including an operation 537 for detecting the absence of the one or more visual cues associated with the first user in the proximate vicinity of the computing device by at least detecting absence of a face associated with the first user in the proximate vicinity of the computing device. For instance, the visual cue detecting module 220 including the face detecting module 222 of the computing device 10 detecting the absence of the one or more visual cues associated with the first user 20 in the proximate vicinity of the computing device 10* when the face detecting module 222 at least detects absence of a face associated with the first user 20 in the proximate vicinity of the computing device 10*. For example, if the computing device 10* includes an image capturing device 304, such as a webcam, then the computing device 10* may detect the absence of a visual cue of the first user 20 that indicates the presence of the first user 20 when the webcam does not detect the face of the first user 20* in the proximate vicinity of the computing device 10*(e.g., within 3 feet, 5 feet, 10 feet, or within some other distance from the computing device 10* that a face of the first user 20 can be detected/identified by the computing device 10*).

In the same or different implementations, operation 536 may include an operation 538 for detecting the absence of the one or more visual cues associated with the first user in the proximate vicinity of the computing device by at least detecting absence of one or more eyes associated with the first user in the proximate vicinity of the computing device as further depicted in FIG. 5f. For instance, the visual cue detecting module 220 including the eye detecting module 223 of the computing device 10* detecting the absence of the one or more visual cues associated with the first user 20 in the proximate vicinity of the computing device 10* when the eye detecting module 223 at least detects absence of one or more eyes associated with the first user 20 in the proximate vicinity of the computing device 10*. For example, if the computing device 10* includes an image capturing device 304, then the computing device 10* may detect the absence of the visual cue of the first user 20 that indicates the presence of the first user 20 when the image capturing device 304 does not detect the one or more eyes of the first user 20* near the computing device 10*(e.g., within 2 feet, 4 feet, 6 feet, or within some other distance from the computing device 10* that a characteristics of an eye, such as a retinal or iris characteristic, of the first user 20 can be detected/identified by the computing device 10*).

In various implementations, operation 526 for determining that the computing device has been transferred from the first user to the second user by at least detecting presence or absence of one or more visual cues in proximate vicinity of the computing device that when detected as occurring at least suggests transfer of the computing device between two users may further include an operation 539 for detecting the presence or absence of the one or more visual cues in the proximate vicinity of the computing device by at least detecting visually that the computing device has moved away from the first user as further depicted in FIG. 5f. For instance, the visual cue detecting module 220 including the visual moving away detecting module 224 (see FIG. 3c) of the computing device 10* detecting the presence or absence of the one or more visual cues in the proximate vicinity of the computing device 10* when the visual moving away detecting module 224 at least detects visually (e.g., via an image capturing device 304) that the computing device 10* has moved away from the first user 20.

Turning now to FIG. 5g, in various implementations, operation 526 may include an operation 540 for detecting the presence or absence of the one or more visual cues in the proximate vicinity of the computing device by at least detecting visually the presence or absence of the one or more visual cues in the proximate vicinity of the computing device and with respect to the specific orientation of the computing device. For instance, the visual cue detecting module 220 of the computing device 10* detecting the presence or absence of the one or more visual cues in the proximate vicinity of the computing device 10* by at least detecting visually (e.g., via one or more image capturing devices 304) the presence or absence of the one or more visual cues in the proximate vicinity of the computing device 10* and with respect to the specific orientation of the computing device 10*. For example detecting the presence or absence of one or more visual cues (e.g., user faces or eyes) on the front-side 17a of the computing device 10*.

As further illustrated in FIG. 5g, operation 540 may include one or more additional operations in various alternative implementations. For example, in some implementations, operation 540 may include an operation 541 for detecting visually the presence or absence of the one or more visual cues in the proximate vicinity of the computing device and with respect to the specific orientation of the computing device by at least detecting visually the presence or absence of the one or more visual cues at one or more specific locations relative to a front-side of the computing device, the front-side of the computing device being a side of the computing device having a display device. For instance, the visual cue detecting module 220 of the computing device 10* detecting visually the presence or absence of the one or more visual cues in the proximate vicinity of the computing device 10* and with respect to the specific orientation of the computing device 10* by at least detecting visually the presence or absence of the one or more visual cues at one or more specific locations (e.g., predefined locations) relative to a front-side 17a of the computing device 10*, the front-side 17a of the computing device 10* being a side of the computing device 10* having a display device 12.

In some cases, operation 541 may include an operation 542 for detecting visually the presence or absence of the one or more visual cues at the one or more specific locations relative to the front-side of the computing device by detecting visually at least disappearance of one or more features associated with the first user at the one or more specific locations relative to the front-side of the computing device. For instance, the visual cue detecting module 220 of the computing device 10* detecting visually the presence or absence of the one or more visual cues at the one or more specific locations (e.g., predefined locations) relative to the front-side 17a of the computing device 10* by detecting visually at least disappearance of one or more features (e.g., face or one or more eyes) associated with the first user 20 at the one or more specific locations (e.g., predefined locations) relative to the front-side 17a of the computing device 10*.

In some cases, operation 541 may include an operation 543 for detecting visually the presence or absence of the one or more visual cues at the one or more specific locations relative to the front-side of the computing device by detecting visually at least appearance of one or more features associated with the second user at the one or more specific locations relative to the front-side of the computing device. For instance, the visual cue detecting module 220 of the computing device 10* detecting visually the presence or absence of the one or more visual cues at the one or more specific locations relative to the front-side 17a of the computing device 10* by detecting visually at least appearance of one or more features (e.g., a face or one or more eyes) associated with the second user 30 at the one or more specific locations relative to the front-side 17a of the computing device 10*.

Figure 5H:
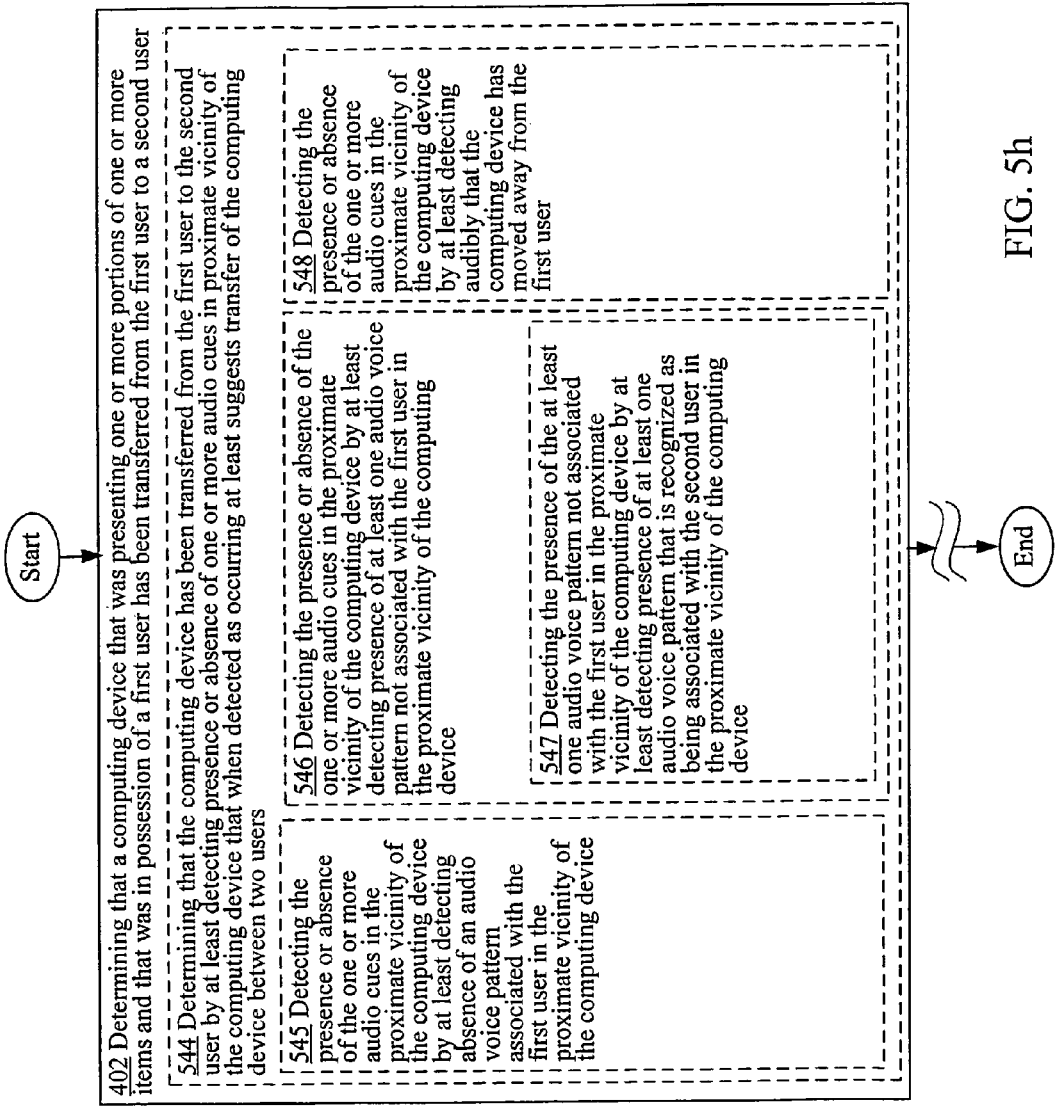
FIG. 5h is a high-level logic flowchart of a process depicting alternate implementations of the transfer determining operation 402 of FIG. 4.

In various implementations, the transfer determining operation 402 of FIG. 4 for determining that a computing device that was presenting one or more portions of one or more items and that was in possession of a first user has been transferred from the first user to a second user may involve making the transfer determination based, at least in part, on audio cues. For example, and as illustrated in FIG. 5h, in some implementations, the transfer determining operation 402 may include an operation 544 for determining that the computing device has been transferred from the first user to the second user by at least detecting presence or absence of one or more audio cues in proximate vicinity of the computing device that when detected as occurring at least suggests transfer of the computing device between two users. For instance, the transfer determining module 102* including the audio cue detecting module 226 (see FIG. 3c) of the computing device 10* determining that the computing device 10* has been transferred from the first user 20 to the second user 30 when the audio cue detecting module 226 at least detects presence or absence of one or more audio cues (e.g., absence of audio cues associated specifically with the first user 20 or presence of audio cues associated specifically with the second user 30) in proximate vicinity of the computing device 10*.

As further illustrated in FIG. 5h, operation 544 may include one or more additional operations in various alternative implementations. For example, in some implementations, operation 544 may include an operation 545 for detecting the presence or absence of the one or more audio cues in the proximate vicinity of the computing device by at least detecting absence of an audio voice pattern associated with the first user in the proximate vicinity of the computing device. For instance, the audio cue detecting module 226 including the voice pattern detecting module 227 of the computing device 10* detecting the presence or absence of the one or more audio cues in the proximate vicinity of the computing device 10* when the voice pattern detecting module 227 at least detects absence (e.g., detects absence for at least a predefined amount of time such as 3 seconds, 5 seconds, 10 seconds, and so forth) of an audio voice pattern associated with the first user 20 in the proximate vicinity (e.g., within 10 feet or within some other distance from which voice of the first user 20 is at least clearly discernible) of the computing device 10*.

In the same or different implementations, operation 544 may include an operation 546 for detecting the presence or absence of the one or more audio cues in the proximate vicinity of the computing device by at least detecting presence of at least one audio voice pattern not associated with the first user in the proximate vicinity of the computing device. For instance, the audio cue detecting module 226 including the voice pattern detecting module 227 of the computing device 10* detecting the presence or absence of the one or more audio cues in the proximate vicinity of the computing device 10* when the voice pattern detecting module 227 at least detects presence of at least one audio voice pattern not associated with the first user 20 in the proximate vicinity (e.g., within 5 feet or within some other distance from which voice of the second user 30 is at least clearly discernible or identifiable) of the computing device 10*.

As further illustrated in FIG. 5h, in some cases, operation 546 may further include an operation 547 for detecting the presence of the at least one audio voice pattern not associated with the first user in the proximate vicinity of the computing device by at least detecting presence of at least one audio voice pattern that is recognized as being associated with the second user in the proximate vicinity of the computing device. For instance, the voice pattern detecting module 227 of the computing device 10* detecting the presence of the at least one audio voice pattern not associated with the first user 20 in the proximate vicinity of the computing device 10* by at least detecting presence of at least one audio voice pattern that is recognized as being associated with the second user 30 in the proximate vicinity of the computing device 10*.

In the same or different implementations, operation 544 may include an operation 548 for detecting the presence or absence of the one or more audio cues in the proximate vicinity of the computing device by at least detecting audibly that the computing device has moved away from the first user. For instance, the audio cue detecting module 226 including the audio moving away detecting module 228 of the computing device 10* detecting presence or absence of one or more audio cues in the proximate vicinity of the computing device 10* when the audio moving away detecting module 228 at least detects audibly (e.g., using one or more audio capturing device 306) that the computing device 10* has moved away from the first user 20. For example, the audio moving away detecting module 228 detecting that the volume of an audio cue, such as a voice pattern, that is associated with the first user 20 is diminishing or has diminished, which may be an inference that the computing device 10* may be or may have moved away from the first user 20.

Figure 5I:
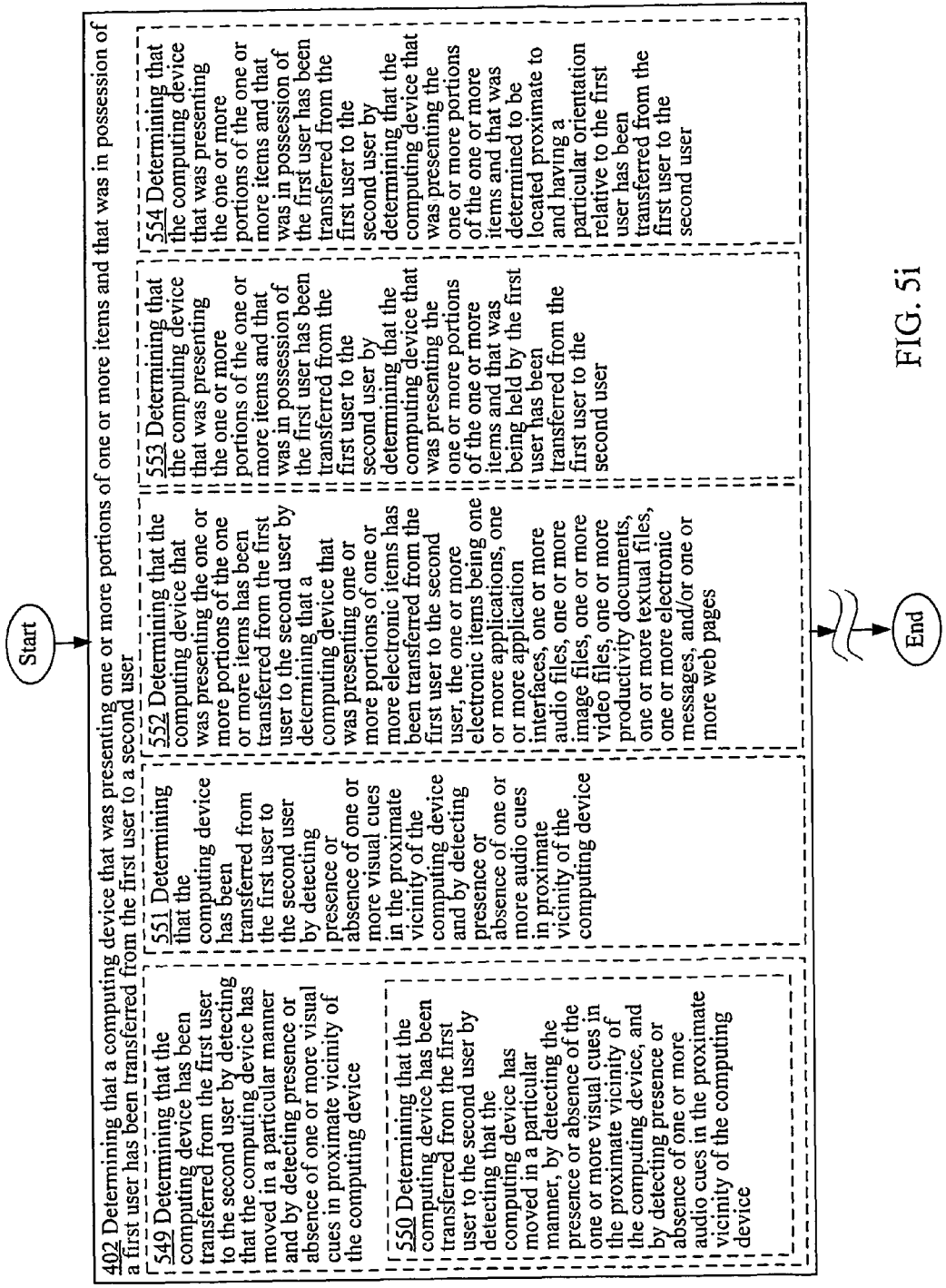
FIG. 5i is a high-level logic flowchart of a process depicting alternate implementations of the transfer determining operation 402 of FIG. 4.

In various implementations, the transfer determining operation 402 of FIG. 4 for determining that a computing device that was presenting one or more portions of one or more items and that was in possession of a first user has been transferred from the first user to a second user may involve determining the transfer of the computing device 10* based on a combination of detecting direct movements of the computing device 10*, detecting visual cues, and/or detecting audio cues. For example, in some implementations and as illustrated in FIG. 5i, the transfer determining operation 402 may include an operation 549 for determining that the computing device has been transferred from the first user to the second user by detecting that the computing device has moved in a particular manner and by detecting presence or absence of one or more visual cues in proximate vicinity of the computing device. For instance, the transfer determining module 102* including the particular movement detecting module 210 and the visual cue detecting module 220 of the computing device 10* determining that the computing device 10* has been transferred from the first user 20 to the second user 30 when the particular movement detecting module 210 detects that the computing device 10* has moved in a particular manner and the visual cue detecting module 220 detects presence or absence of one or more visual cues in proximate vicinity of the computing device 10*.

As further illustrated in FIG. 5i, in some cases, operation 549 may further include an operation 550 for determining that the computing device has been transferred from the first user to the second user by detecting that the computing device has moved in a particular manner, by detecting the presence or absence of the one or more visual cues in the proximate vicinity of the computing device, and by detecting presence or absence of one or more audio cues in the proximate vicinity of the computing device. For instance, the transfer determining module 102* including the particular movement detecting module 210, the visual cue detecting module 220, and the audio cue detecting module 226 of the computing device 10* determining that the computing device 10* has been transferred from the first user 20 to the second user 30 when the particular movement detecting module 210 detects that the computing device 10* has moved in a particular manner, the visual cue detecting module 220 detects the presence or absence of the one or more visual cues in the proximate vicinity of the computing device 10*, and the audio cue detecting module 226 detects presence or absence of one or more audio cues in the proximate vicinity of the computing device 10*.

In some alternative implementations, the transfer determining operation 402 may include an operation 551 for determining that the computing device has been transferred from the first user to the second user by detecting presence or absence of one or more visual cues in the proximate vicinity of the computing device and by detecting presence or absence of one or more audio cues in proximate vicinity of the computing device as further depicted in FIG. 5i. For instance, the transfer determining module 102* including the visual cue detecting module 220 and the audio cue detecting module 226 of the computing device 10* determining that the computing device 10* has been transferred from the first user 20 to the second user 30 when the visual cue detecting module 220 detects presence or absence of one or more visual cues in the proximate vicinity of the computing device 10* and when the audio cue detecting module 226 detects presence or absence of one or more audio cues in proximate vicinity of the computing device 10*.

As further illustrated in FIG. 5i, in the same or alternative implementations, the transfer determining operation 402 may include an operation 552 for determining that the computing device that was presenting the one or more portions of the one or more items has been transferred from the first user to the second user by determining that a computing device that was presenting one or more portions of one or more electronic items has been transferred from the first user to the second user, the one or more electronic items being one or more applications, one or more application interfaces, one or more audio files, one or more image files, one or more video files, one or more productivity documents, one or more textual files, one or more electronic messages, and/or one or more web pages. For instance, the transfer determining module 102* of the computing device 10* determining that the computing device 10* that was presenting the one or more portions of the one or more items has been transferred from the first user 20 to the second user 30 by determining that a computing device 10* that was presenting one or more portions of one or more electronic items has been transferred from the first user 20 to a second user 30, the one or more electronic items being one or more applications, one or more application interfaces, one or more audio files, one or more video files, one or more productivity documents, one or more textual files, one or more electronic messages, and/or one or more web pages.

In the same or alternative implementations, the transfer determining operation 402 may include an operation 553 for determining that the computing device that was presenting the one or more portions of the one or more items and that was in possession of the first user has been transferred from the first user to the second user by determining that the computing device that was presenting the one or more portions of the one or more items and that was being held by the first user has been transferred from the first user to the second user. For instance, the transfer determining module 102* of the computing device 10* determining that the computing device 10* that was presenting the one or more portions of the one or more items and that was in possession of the first user 20 has been transferred from the first user 20 to the second user 30 by determining that the computing device 10* that was presenting the one or more portions of the one or more items and that was being held by the first user 20 has been transferred from the first user 20 to the second user 30.

In the same or alternative implementations, the transfer determining operation 402 may include an operation 554 for determining that the computing device that was presenting the one or more portions of the one or more items and that was in possession of the first user has been transferred from the first user to the second user by determining that the computing device that was presenting the one or more portions of the one or more items and that was determined to be located proximate to and having a particular orientation relative to the first user has been transferred from the first user to the second user. For instance, the transfer determining module 102* of the computing device 10* determining that the computing device 10* that was presenting the one or more portions of the one or more items and that was in possession of the first user 20 has been transferred from the first user 20 to the second user 30 by determining that the computing device 10* that was presenting the one or more portions of the one or more items and that was determined to be located proximate to and having a particular orientation relative to the first user 20 has been transferred from the first user 20 to the second user 30. Such an operation may be executed in order to determine that the possession of the computing device 10* is being actually transferred from the first user 20 to the second user 30, where the first user 20 may previously had possession of the computing device 10* based on location of the first user 20 relative to the particular orientation of the computing device 10*(e.g., relative to the front-side 17a of the computing device 10* or the center 18 or center axis 18a of the front-side 17a of the computing device 10*).

Figure 6A:
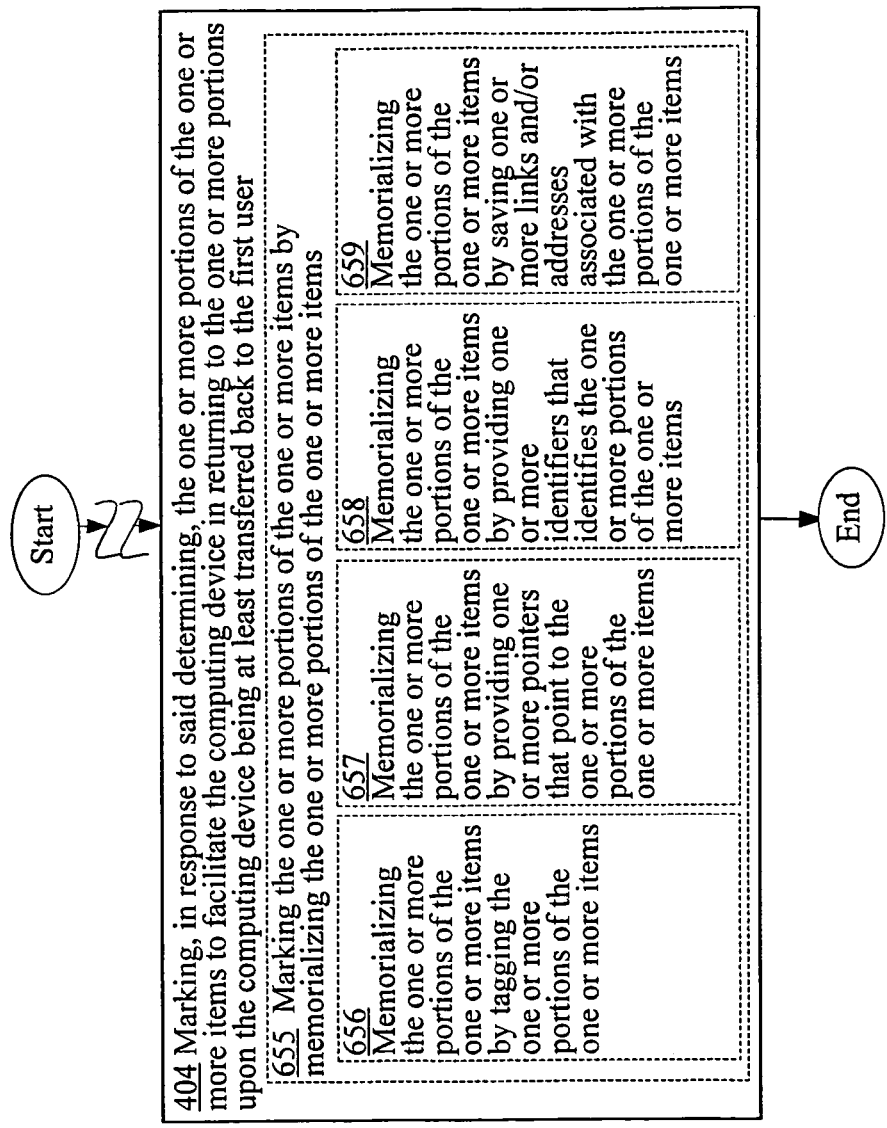
FIG. 6a is a high-level logic flowchart of a process depicting alternate implementations of the marking operation 404 of FIG. 4.
Figure 6B:
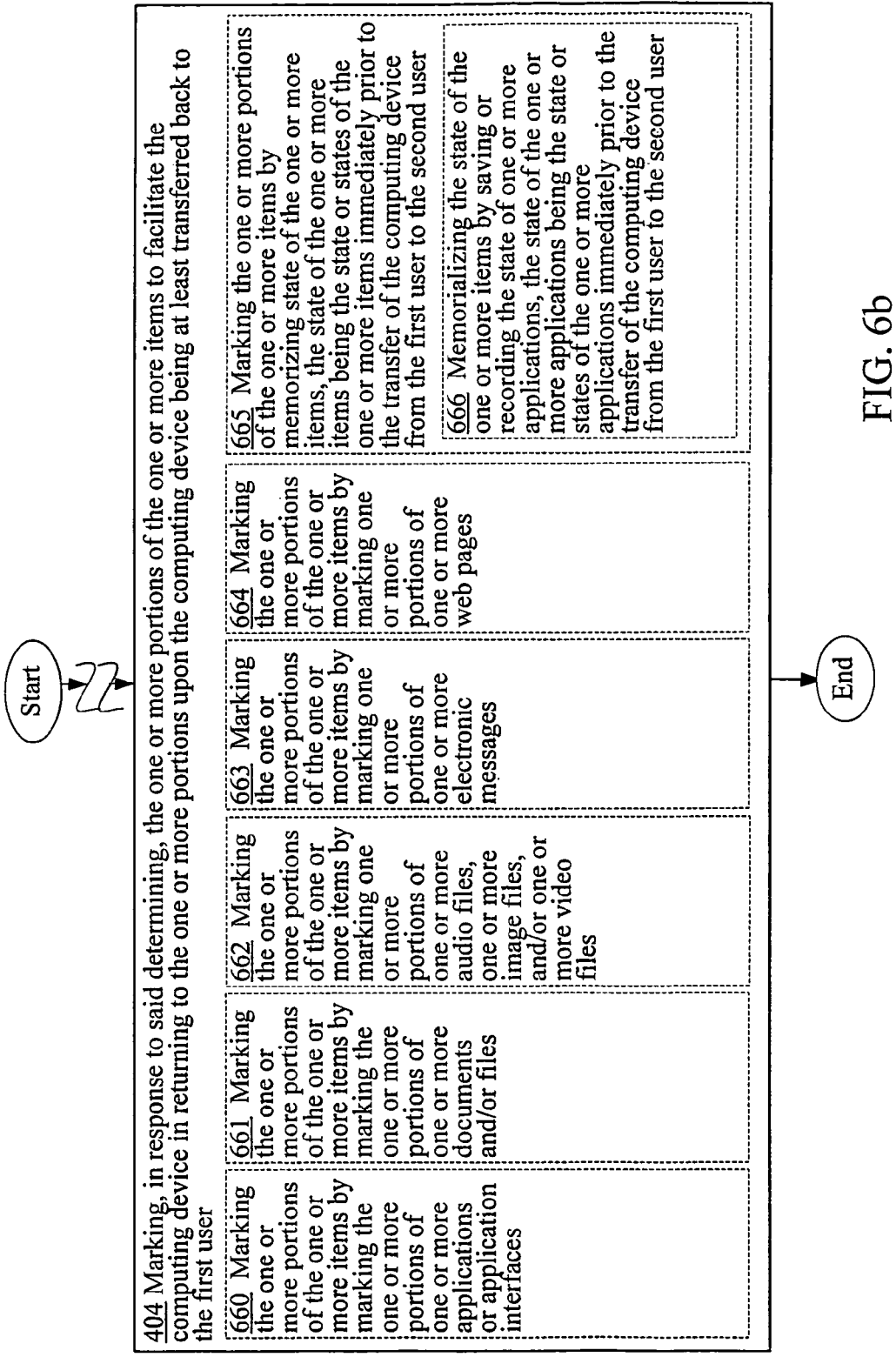
FIG. 6b is a high-level logic flowchart of a process depicting alternate implementations of the marking operation 404 of FIG. 4.

Referring back to the marking operation 404 of FIG. 4, the marking operation 404 similar to the transfer determining operation 402 of FIG. 4 may be executed in a number of different ways in various alternative embodiments as illustrated in FIGS. 6a and 6b. In some implementations, for example, the marking operation 404 of FIG. 4 may include an operation 655 for marking the one or more portions of the one or more items by memorializing the one or more portions of the one or more items as illustrated in FIG. 6a. For instance, the marking module 104* including the memorializing module 230 (see FIG. 3d) of the computing device 10* of FIG. 1 marking the one or more portions of the one or more items by having the memorializing module 230 memorialize (e.g., memorize by saving or storing one or more addresses or locations of the one or more portions of the one or more items, or tagging the one or more portions of the one or more items) the one or more portions of the one or more items.

As further illustrated in FIG. 6a, operation 655 may further include one or more operations in various alternative implementations. For example, in some implementations, operation 655 may include an operation 656 for memorializing the one or more portions of the one or more items by tagging the one or more portions of the one or more items. For instance, the memorializing module 230 including the tagging module 232 (see FIG. 3d) of the computing device 10* memorializing the one or more portions of the one or more items by having the tagging module 232 tag the one or more portions of the one or more items (e.g., including or inserting a tag or mark into the one or more portions of the one or more items). In some cases, the tags that may be included into the one or more portions may be in the form of metadata.

In some implementations, operation 655 may include an operation 657 for memorializing the one or more portions of the one or more items by providing one or more pointers that point to the one or more portions of the one or more items. For instance, the memorializing module 230 including the pointer providing module 234 (see FIG. 3d) of the computing device 10* memorializing the one or more portions of the one or more items by having the pointer providing module 234 provide one or more pointers that point to (e.g., identifies or directs to) the one or more portions of the one or more items. In some cases, the one or more pointers that may be provided may be included with one or more items and/or may be in the form of metadata.

In some implementations, operation 655 may include an operation 658 for memorializing the one or more portions of the one or more items by providing one or more identifiers that identifies the one or more portions of the one or more items. For instance, the memorializing module 230 including the identifier providing module 236 (see FIG. 3d) of the computing device 10* memorializing the one or more portions of the one or more items by having the identifier providing module 236 provide one or more identifiers that identifies the one or more portions of the one or more items. In some cases, the one or more provided identifiers may then be saved, stored, or registered in various types of memory (e.g., volatile memory, non-volatile memory, cache memory, and so forth).

In some implementations, operation 655 may include an operation 659 for memorializing the one or more portions of the one or more items by saving one or more links and/or addresses associated with the one or more portions of the one or more items. For instance, the memorializing module 230 including the links/address saving module 238 (see FIG. 3d) of the computing device 10* memorializing the one or more portions of the one or more items by having the links/address saving module 238 save (e.g., storing, registering, or recording) one or more links and/or addresses associated with the one or more portions of the one or more items.

The "one or more items" referred to in the transfer determining operation 402 and the marking operation 404 of FIG. 4 may be in reference to a variety of electronic items that may be presented via the computing device 10*. For example, in some implementations, the marking operation 404 of FIG. 4 may include an operation 660 for marking the one or more portions of the one or more items by marking the one or more portions of one or more applications or application interfaces as illustrated in FIG. 6b. For instance, the marking module 104* of the computing device 10* marking the one or more portions, of the one or more items by marking the one or more portions of one or more applications (e.g., software applications such as gaming applications, productivity applications including word processing and/or spread sheet applications, communication applications, and/or other software applications) or application interfaces.

In the same or different implementations, the marking operation 404 may include an operation 661 for marking the one or more portions of the one or more items by marking the one or more portions of one or more documents and/or files. For instance, the marking module 104* of the computing device 10* marking the one or more portions of the one or more items by marking one or more portions of one or more documents and/or files (e.g., productivity documents such as word processing documents, spreadsheet documents, presentation graphics document, and so forth, or other types of documents and/or files such as electronic or digital books).

In the same or different implementations, the marking operation 404 may include an operation 662 for marking the one or more portions of the one or more items by marking one or more portions of one or more audio files, one or more image files, and/or one or more video files. For instance, the marking module 104* of the computing device 10* marking the one or more portions of the one or more items by marking one or more portions of one or more audio files (e.g., audio recordings), one or more image files (e.g., digital photos), and/or one or more video files (e.g., movies). Note that the phrases "one or more audio files" or "one or more image files" may be in reference to an audio folder containing one or more individual audio recordings or a digital image folder or album containing one or more digital images.

In the same or different implementations, the marking operation 404 may include an operation 663 for marking the one or more portions of the one or more items by marking one or more portions of one or more electronic messages. For instance, the marking module 104* of the computing device 10* marking the one or more portions of the one or more items by marking one or more portions of one or more electronic messages (e.g., emails, text messages, instant messages, audio messages, video messages, and so forth).

In the same or different implementations, the marking operation 404 may include an operation 664 for marking the one or more portions of the one or more items by marking one or more portions of one or more web pages. For instance, the marking module 104* of the computing device 10* marking the one or more portions of the one or more items by marking one or more portions of one or more web pages (e.g., Internet websites).

In some implementations in which the one or more items include one or more software applications, the marking of the one or more portions of the one or more items may involve memorizing the state of the one or more items at the time the computing device 10* was being transferred from the first user to the second user. For these implementations, the marking operation 404 may include an operation 665 for marking the one or more portions of the one or more items by memorizing state of the one or more items, the state of the one or more items being the state or states of the one or more items immediately prior to the transfer of the computing device from the first user to the second user. For instance, the marking module 104* including the memorializing module 230 of the computing device 10* marking the one or more portions of the one or more items by having the memorializing module 230 memorialize state of the one or more items (e.g., software applications, the state of the one or more items being the state or states of the one or more items immediately prior to the transfer of the computing device 10* from the first user 20 to the second user 30. Note that the phrase "immediately prior to" as used here is in reference to point in time just before the transfer of the computing device 10* occurring.

As further illustrated in FIG. 6b, in some implementations, operation 665 may include an operation 666 for memorializing the state of the one or more items by saving or recording the state of one or more applications, the state of the one or more applications being the state or states of the one or more applications immediately prior to the transfer of the computing device from the first user to the second user. For instance, the memorializing module 230 including the application state saving/recording module 239 (see FIG. 3d) of the computing device 10* memorializing the state of the one or more the items by having the application state saving/recording module 239 save or record the state of one or more applications (e.g., gaming applications), the state of the one or more applications being the state or states of the one or more applications immediately prior to the transfer of the computing device 10* from the first user 20 to the second user 30.

Figure 7:
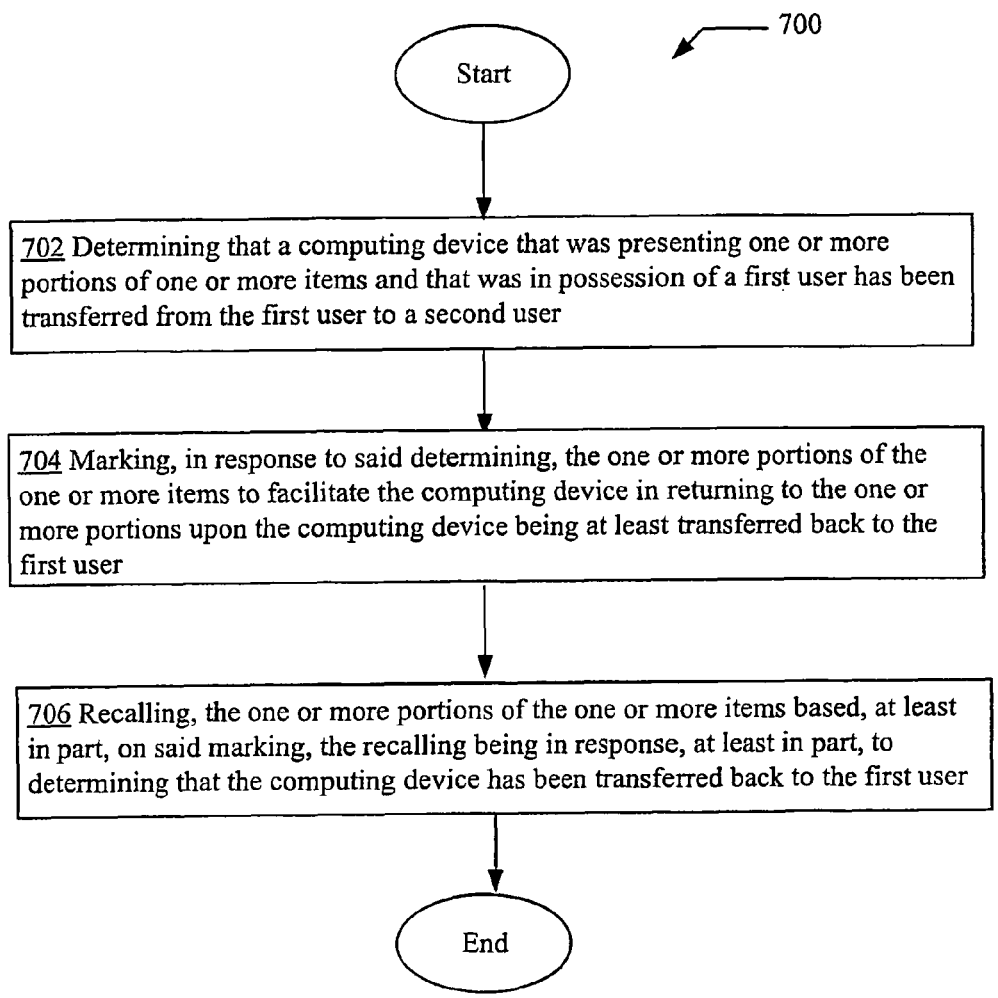
FIG. 7 is another high-level logic flowchart of another process.

Turning now to FIG. 7 illustrating another operational flow 700. Operational flow 700 includes certain operations that mirror the operations included in operational flow 400 of FIG. 4. These operations include a transfer determining operation 702 and a marking operation 704 that corresponds to and mirror the transfer determining operation 402 and the marking operation 404, respectively, of FIG. 4.

In addition, operational flow 700 may include a recalling operation 706 for recalling the one or more portions of the one or more items based, at least in part, on said marking, the recalling being in response, at least in part, to determining that the computing device has been transferred back to the first user. For instance, the recalling module 106*(see, for example, the recalling module 106' of FIG. 3a and the recalling module 106" of FIG. 3b) of the computing device 10* of FIG. 1, for example, recalling (e.g., retrieving, locating, finding again, locating, re-presenting, and so forth) the one or more portions of the one or more items based, at least in part, on said marking, the recalling being in response, at least in part, to determining that the computing device 10* has been transferred back to the first user 20.

Figure 8A:
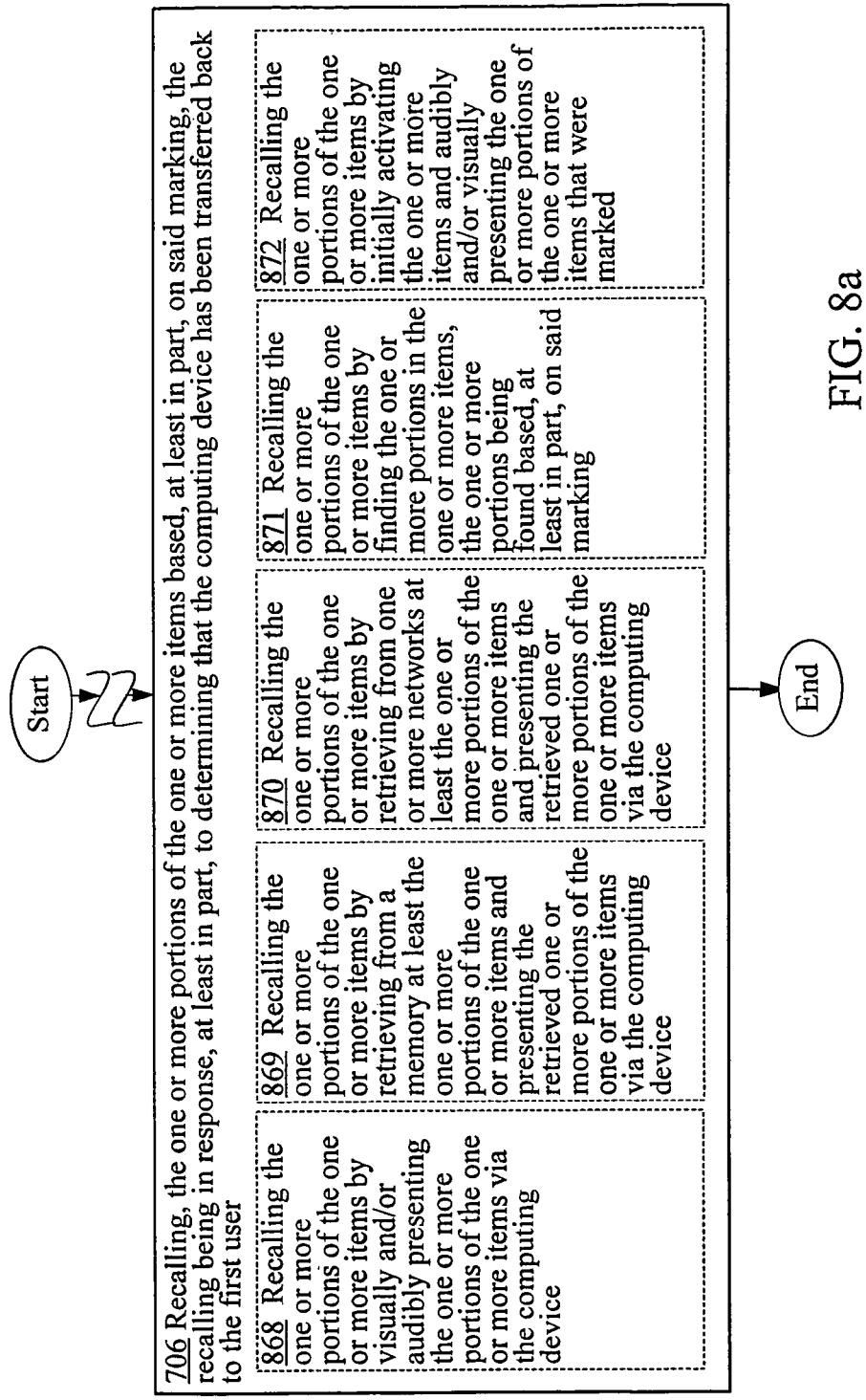
FIG. 8a is a high-level logic flowchart of a process depicting alternate implementations of the recalling operation 706 of FIG. 7.
Figure 8B:
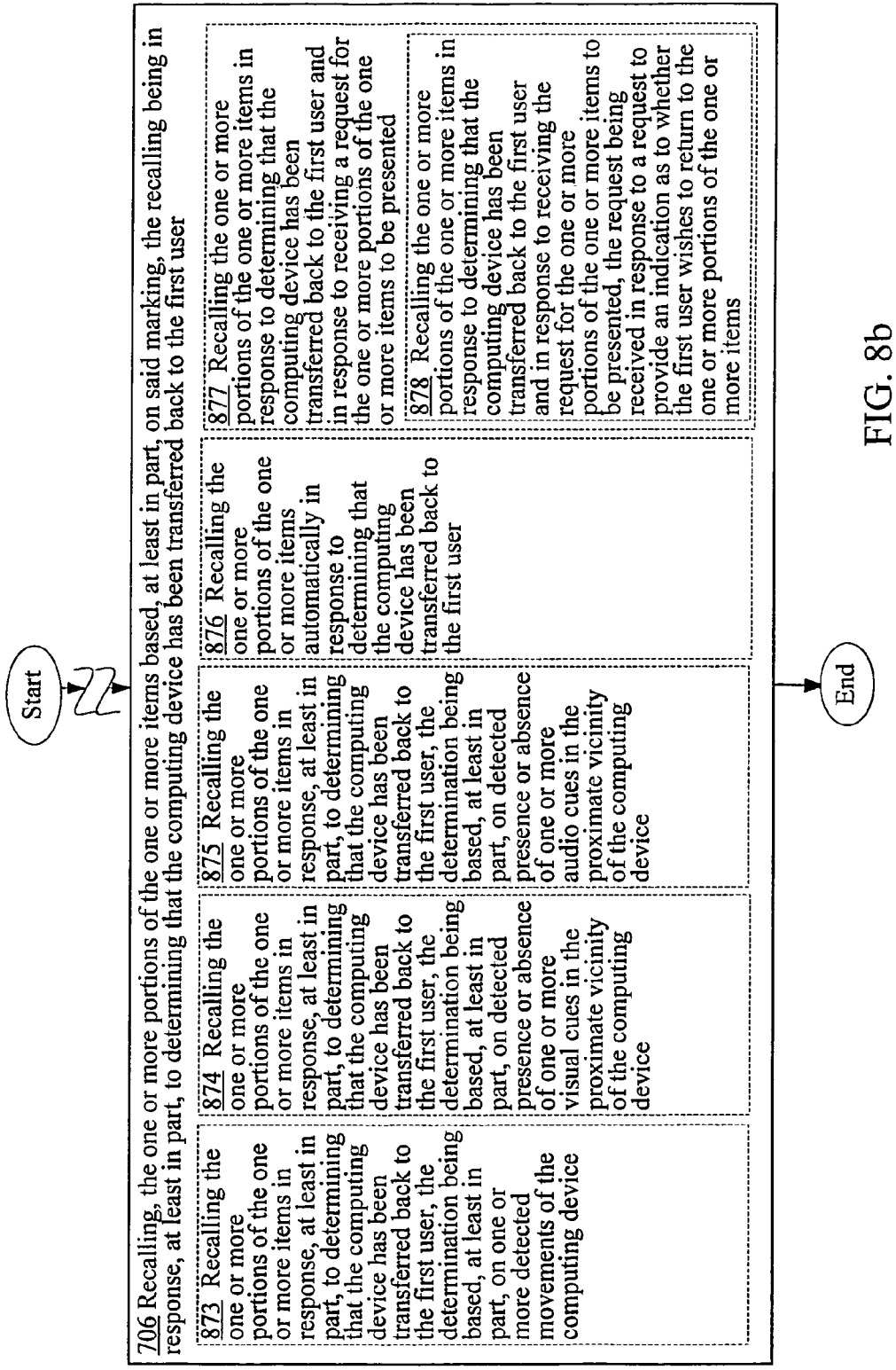
FIG. 8b is a high-level logic flowchart of a process depicting alternate implementations of the recalling operation 706 of FIG. 7.
Figure 9A:
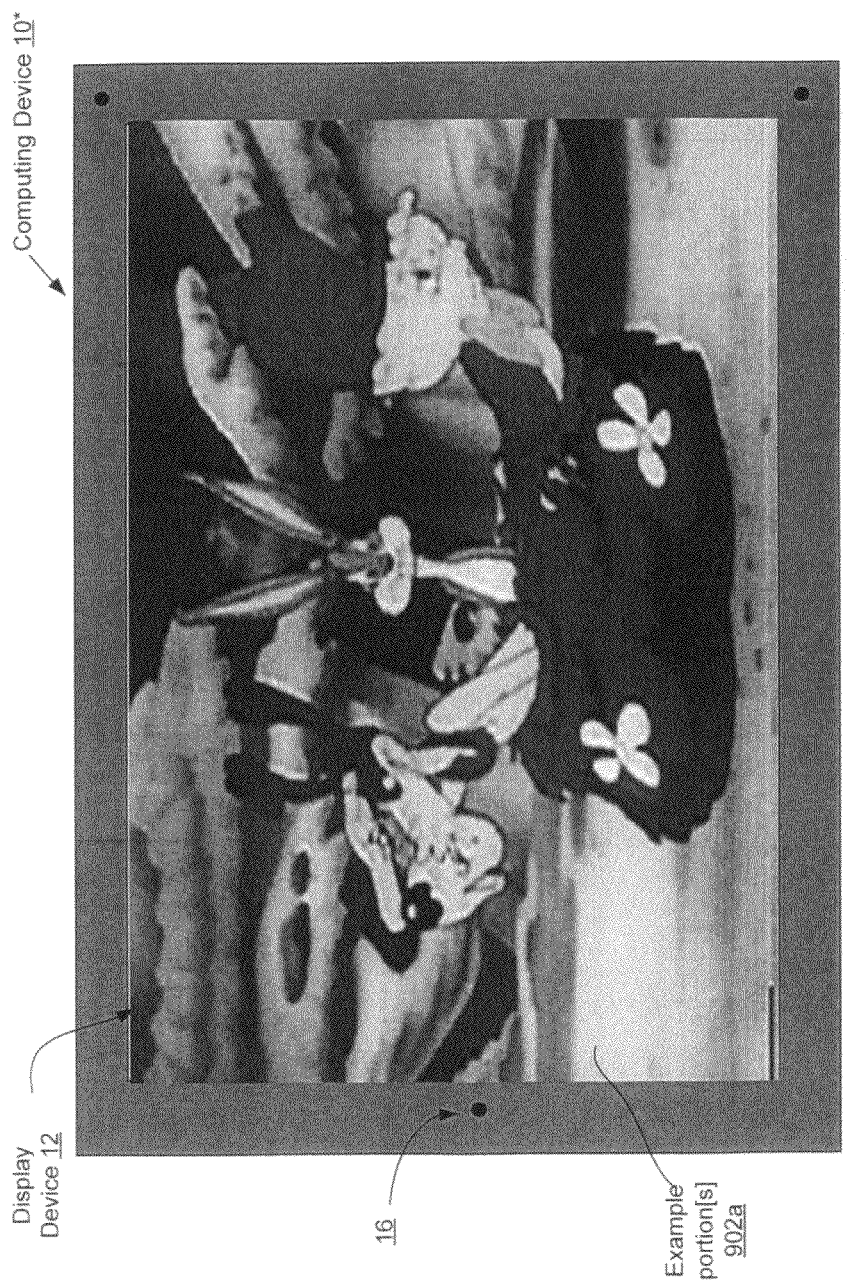
FIG. 9a illustrates one or more exemplary portions 902a of one or more exemplary items being displayed by the computing device 10* of FIG. 1.

Turning now to FIGS. 8a and 8b, which illustrate various ways that the recalling operation 706 of FIG. 7 may be implemented. For example, and as illustrated in FIG. 8a, in some implementations, the recalling operation 706 of FIG. 7 may include one or more operations including an operation 868 for recalling the one or more portions of the one or more items by visually and/or audibly presenting the one or more portions of the one or more items via the computing device. For instance, the recalling module 106* including the presenting module 250 (see FIG. 3e) of the computing device 10* of FIG. 1, recalling the one or more portions of the one or more items by having the presenting module 250 visually and/or audibly present the one or more portions of the one or more items via the computing device 10*. For example, FIG. 9a illustrates one or more example portions 902a of "one or more items" that are being displayed through the display device 12 of the computing device 10* of FIG. 1 after being recalled. In this example illustration, the "one or more items" are at least part of a cartoon feature movie and the one or more example portions 902a of the "one or more items" are at least part of a frame from the cartoon feature movie.

Figure 9B:
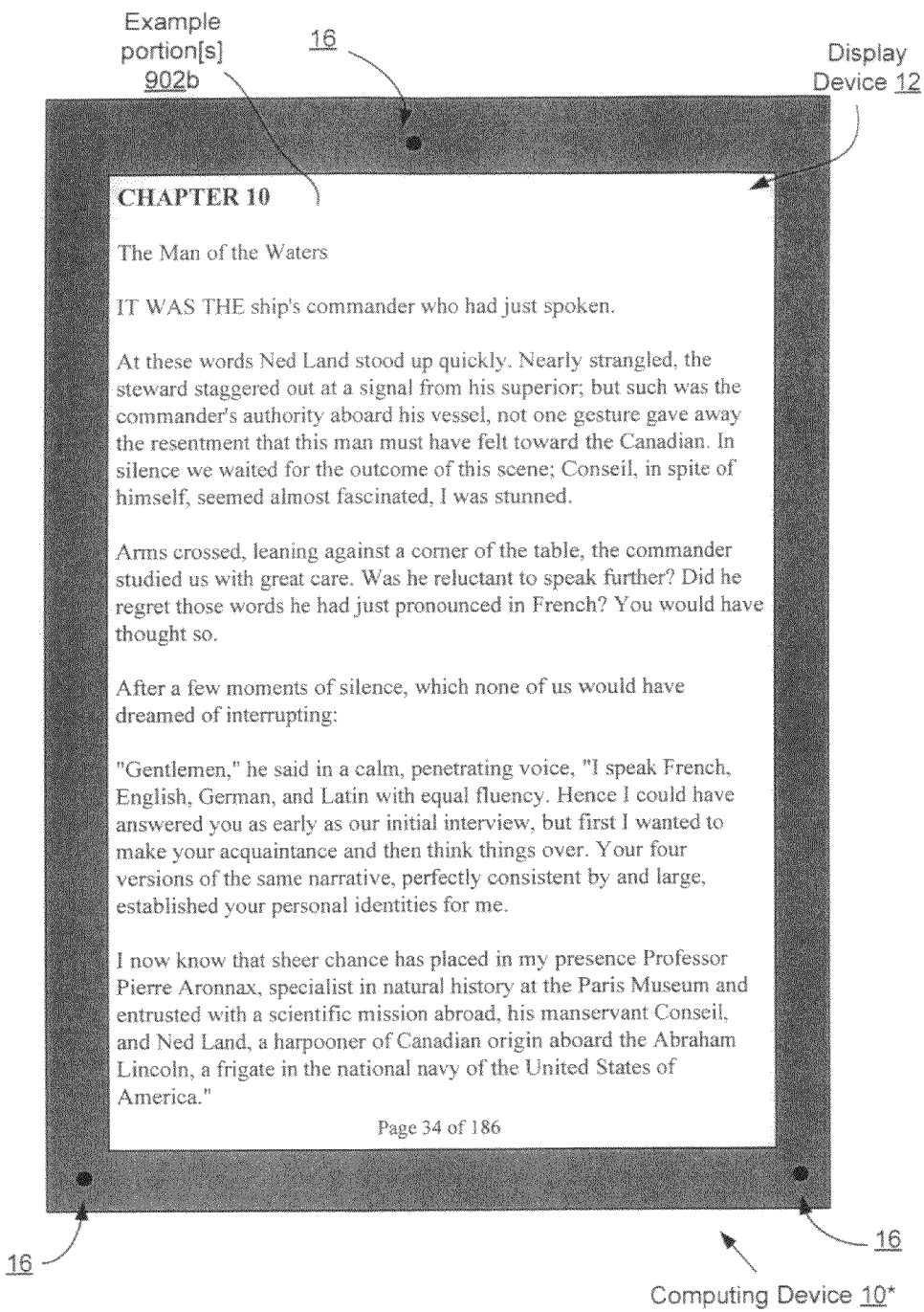
FIG. 9b illustrates one or more exemplary portions 902b of another one or more exemplary items being displayed by the computing device 10* of FIG. 1.

In the same or different implementations, the recall operation 706 may include an operation 869 for recalling the one or more portions of the one or more items by retrieving from a memory at least the one or more portions of the one or more items and presenting the retrieved one or more portions of the one or more items via the computing device. For instance, the recalling module 106* including the retrieving module 240 (see FIG. 3e) and the presenting module 250 of the computing device 10* recalling the one or more portions of the one or more items by having the retrieving module 240 retrieve from a memory 114 at least the one or more portions of the one or more items and having the presenting module 250 presenting the retrieved one or more portions of the one or more items via the computing device 20*. For example, FIG. 9b illustrates one or more example portions 902b of "one or more items" that are being displayed through the display device 12 of the computing device 10* of FIG. 1 after being recalled. In this example illustration, the "one or more items" are at least part of an electronic book and the one or more example portions 902b of the "one or more items" are at least part of a page from the electronic book.

Figure 9C:
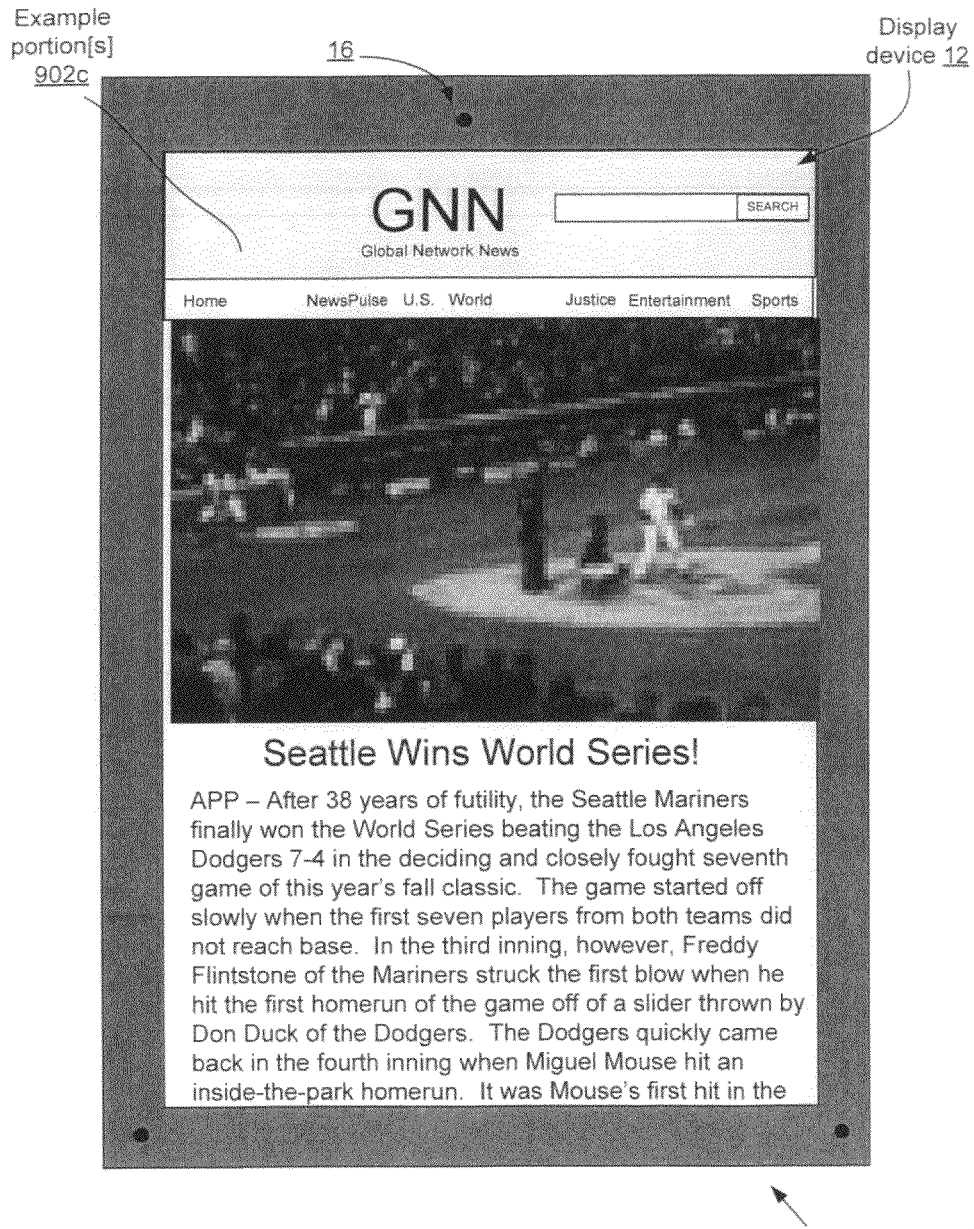
FIG. 9c illustrates one or more exemplary portions 902c of yet another one or more exemplary items being displayed by the computing device 10* of FIG. 1.

In the same or different implementations, the recall operation 706 may include an operation 870 for recalling the one or more portions of the one or more items by retrieving from one or more networks at least the one or more portions of the one or more items and presenting the retrieved one or more portions of the one or more items via the computing device. For instance, the recalling module 106* including the retrieving module 240 (see FIG. 3e) and the presenting module 250 of the computing device 10* recalling the one or more portions of the one or more items by having the retrieving module 240 retrieve from one or more networks at least the one or more portions of the one or more items and by having the presenting module 250 presenting the retrieved one or more portions of the one or more items via the computing device 10*. For example, FIG. 9c illustrates one or more example portions 902c of "one or more items" that are being displayed through the display device 12 of the computing device 10* of FIG. 1 after being recalled. In this example illustration, the "one or more items" are at least part of an Internet newspaper comprising of multiple linked web pages and the one or more example portions 902c of the "one or more items" are at least part of one of the linked web pages of the Internet newspaper.

In the same or different implementations, the recall operation 706 may include an operation 871 for recalling the one or more portions of the one or more items by finding the one or more portions in the one or more items, the one or more portions being found based, at least in part, on said marking. For instance, the recalling module 106* including the finding module 242 (see FIG. 3e) of the computing device 10* recalling the one or more portions of the one or more items by having the finding module 242 find (e.g., locate) the one or more portions in the one or more items, the one or more portions being found based, at least in part, on said marking of the one or more portions of the one or more items.

In the same or different implementations, the recall operation 706 may include an operation 872 for recalling the one or more portions of the one or more items by initially activating the one or more items and audibly and/or visually presenting the one or more portions of the one or more items that were marked. For instance, the recalling module 106* including the activating module 244 (see FIG. 3e) and the presenting module 250 of the computing device 10* recalling the one or more portions of the one or more items by having the activating module 244 initially activating the one or more items (e.g., one or more software applications including one or more gaming applications and/or productivity applications) and having the presenting module 250 audibly and/or visually present the one or more portions of the one or more items that were marked.

Turning now to FIG. 8b, in the same or different implementations, the recall operation 706 may include an operation 873 for recalling the one or more portions of the one or more items in response, at least in part, to determining that the computing device has been transferred back to the first user, the determination being based, at least in part, on one or more detected movements of the computing device. For instance, the recalling module 106* of the computing device 10* recalling the one or more portions of the one or more items in response, at least in part, to determining by the transfer determining module 102*, for example, that the computing device 10* has been transferred back to the first user 10*, the determination being based, at least in part, on one or more detected movements of the computing device 10*.

In the same or different implementations, the recall operation 706 may include an operation 874 for recalling the one or more portions of the one or more items in response, at least in part, to determining that the computing device has been transferred back to the first user, the determination being based, at least in part, on detected presence or absence of one or more visual cues in the proximate vicinity of the computing device. For instance, the recalling module 106* of the computing device 10* recalling the one or more portions of the one or more items in response, at least in part, to determining by the transfer determining module 102*, for example, that the computing device 10* has been transferred back to the first user 20, the determination being based, at least in part, on detected presence or absence of one or more visual cues in the proximate vicinity of the computing device 10*(e.g., in the immediate area around the computing device 10* such as within five or six feet from the computing device 10*).

In the same or different implementations, the recall operation 706 may include an operation 875 for recalling the one or more portions of the one or more items in response, at least in part, to determining that the computing device has been transferred back to the first user, the determination being based, at least in part, on detected presence or absence of one or more audio cues in the proximate vicinity of the computing device. For instance, the recalling module 106* of the computing device 10* recalling the one or more portions of the one or more items in response, at least in part, to determining by the transfer determining module 102*, for example, that the computing device 10* has been transferred back to the first user 20, the determination being based, at least in part, on detected presence or absence of one or more audio cues in the proximate vicinity of the computing device 10*(e.g., in the immediate area around the computing device 10* such as within five or six feet from the computing device 10*).

In the same or different implementations, the recall operation 706 may include an operation 876 for recalling the one or more portions of the one or more items automatically in response to determining that the computing device has been transferred back to the first user. For instance, the recalling module 106* of the computing device 10* recalling the one or more portions of the one or more items automatically in response to determining by the transfer determining module 102*, for example, that the computing device 10* has been transferred back to the first user 20.

In the same or different implementations, the recall operation 706 may include an operation 877 for recalling the one or more portions of the one or more items in response to determining that the computing device has been transferred back to the first user and in response to receiving a request for the one or more portions of the one or more items to be presented. For instance, the recalling module 106* including the request receiving module 246 (see FIG. 3e) of the computing device 10* recalling the one or more portions of the one or more items in response to determining by the transfer determining module 102*, for example, that the computing device 10* has been transferred back to the first user 20 and in response to the request receiving module 246 receiving a request for the one or more portions of the one or more items to be presented. Such an operation may be implemented, for example, if the computing device 10* or at least logic endowed with the computing device 10*, upon determining that the computing device 10* has been transferred back to the first user 20, asks the first user 20 whether he/she wants to return to the one or more portions of the one or more items (e.g., whether the first user 20 wants to view and/or hear again the one or more portions of the one or more items that were being presented prior to the computing device 10* being transfer to the second user 30).

As further illustrated in FIG. 8b, in some implementations, operation 877 may further include an operation 878 for recalling the one or more portions of the one or more items in response to determining that the computing device has been transferred back to the first user and in response to receiving the request for the one or more portions of the one or more items to be presented, the request being received in response to a request to provide an indication as to whether the first user wishes to return to the one or more portions of the one or more items. For instance, the recalling module 106* including the request receiving module 246 of the computing device 10* recalling the one or more portions of the one or more items in response to determining by the transfer determining module 102*, for example, that the computing device 10* has been transferred back to the first user 20 and in response to the request receiving module 246 receiving the request for the one or more portions of the one or more items to be presented, the request being received in response to a request (e.g., a solicitation, a query, a prompt, and so forth), as made by the computing device 10*, to provide an indication as to whether the first user 20 wishes to return to the one or more portions of the one or more items.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:
   (a) a transfer determining module configured to determine that a computing device that was presenting one or more portions of one or more items and that was in possession of a first user has been transferred from the first user to a second user, the transfer determining module configured to determine that a computing device that was presenting one or more portions of one or more items and that was in possession of a first user has been transferred from the first user to a second user including at least:
  (i) a transfer determining module including at least a particular movement detecting module configured to determine that the computing device has been transferred from the first user to the second user when the particular movement detecting module at least detects that the computing device has moved in a particular manner that when detected as occurring at least suggests that the computing device has been transferred between at least two users, the transfer determining module including at least a particular movement detecting module configured to determine that the computing device has been transferred from the first user to the second user including at least:
    (A) a particular movement detecting module including a vibration detecting module configured to detect that the computing device has moved in the particular manner when the vibration detecting module at least detects that the computing device is no longer vibrating in a manner that matches with a vibration pattern that the computing device was detected as having when the computing device was in the possession of the first user prior to said transfer; and
  (b) a marking module configured to mark the one or more portions of the one or more items to facilitate the computing device in returning to the one or more portions upon the computing device being at least transferred back to the first user, the marking module being responsive at least in part to the transfer determining module configured to determine that a computing device that was presenting one or more portions of one or more items and that was in possession of a first user has been transferred from the first user to a second user; and
  wherein at least one of the transfer determining module configured to determine that a computing device that was presenting one or more portions of one or more items and that was in possession of a first user has been transferred from the first user to a second user or the marking module is at least partly implemented with hardware.

2. The system of claim 1, wherein said vibration detecting module comprises:
  a vibration detecting module configured to detect that the computing device is no longer vibrating in the manner that matches with the vibration pattern that the computing device was detected as having when the computing device was in the possession of the first user prior to said transfer by at least detecting that the computing device is vibrating in a manner that matches with a signature vibration pattern associated with the second user.

3. The system of claim 1 wherein the particular movement detecting module including at least a vibration detecting module configured to detect that the computing device has moved in the particular manner when the vibration detecting module at least detects that the computing device is no longer vibrating in a manner that matches with a vibration pattern that the computing device was detected as having when the computing device was in the possession of the first user prior to said transfer comprises:
  a vibration detecting module configured to determine that the computing device has moved in the particular manner including at least detecting that the computing device is no longer vibrating in a manner that matches with a vibration pattern, corresponding to that of at least one of a heart rate or a heartbeat, that the computing device was detected as having when the computing device was in the possession of the first user prior to said transfer.

4. The system of claim 1 wherein the particular movement detecting module including at least a vibration detecting module configured to detect that the computing device has moved in the particular manner when the vibration detecting module at least detects that the computing device is no longer vibrating in a manner that matches with a vibration pattern that the computing device was detected as having when the computing device was in the possession of the first user prior to said transfer comprises:
  a vibration detecting module configured to detect that the computing device has moved in the particular manner including at least detecting that the computing device is no longer vibrating in a manner that matches with a vibration pattern detected when the first user was touching the computing device.

5. A system comprising:
  (a) a transfer determining module configured to determine that a computing device that was presenting one or more portions of one or more items and that was in possession of a first user has been transferred from the first user to a second user, the transfer determining module configured to determine that a computing device that was presenting one or more portions of one or more items and that was in possession of a first user has been transferred from the first user to a second user including at least:
    (i) a transfer determining module including at least a particular movement detecting module configured to determine that the computing device has been transferred from the first user to the second user when the particular movement detecting module at least detects that the computing device has moved in a particular manner that when detected as occurring at least suggests that the computing device has been transferred between at least two users, the transfer determining module including at least a particular movement detecting module configured to determine that the computing device has been transferred from the first user to the second user including at least:
      (A) a particular movement detecting module including at least a vibration detecting module configured to detect that the computing device has moved in the particular manner when the vibration detecting module at least detects that the computing device is not vibrating in a manner that matches with a signature vibration pattern that is associated with the first user; and
  (b) a marking module configured to mark the one or more portions of the one or more items to facilitate the computing device in returning to the one or more portions upon the computing device being at least transferred back to the first user, the marking module being responsive at least in part to the transfer determining module configured to determine that a computing device that was presenting one or more portions of one or more items and that was in possession of a first user has been transferred from the first user to a second user; and
  wherein at least one of the transfer determining module configured to determine that a computing device that was presenting one or more portions of one or more items and that was in possession of a first user has been transferred from the first user to a second user or the marking module is at least partly implemented with hardware.

6. A system comprising:
(a) a transfer determining module configured to determine that a computing device that was presenting one or more portions of one or more items and that was in possession of a first user has been transferred from the first user to a second user, the transfer determining module configured to determine that a computing device that was presenting one or more portions of one or more items and that was in possession of a first user has been transferred from the first user to a second user including at least:
  (i) a transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggests transfer of the computing device between two users, the transfer determining module including at least a visual cue detecting module including at least:
    (A) a visual cue detecting module including at least a face detecting module configured to detect the presence or absence of the one or more visual cues in the proximate vicinity of the computing device when the face detecting module at least detects presence of a first face associated with the first user and a second face associated with the second user in the proximate vicinity of the computing device, the second face being detected as being closer to the computing device than the first face; and
(b) a marking module configured to mark the one or more portions of the one or more items to facilitate the computing device in returning to the one or more portions upon the computing device being at least transferred back to the first user, the marking module being responsive at least in part to the transfer determining module configured to determine that a computing device that was presenting one or more portions of one or more items and that was in possession of a first user has been transferred from the first user to a second user; and
wherein at least one of the transfer determining module configured to determine that a computing device that was presenting one or more portions of one or more items and that was in possession of a first user has been transferred from the first user to a second user or the marking module is at least partly implemented with hardware.

7. The system of claim 6, wherein said transfer determining module configured to determine that a computing device that was presenting one or more portions of one or more items and that was in possession of a first user has been transferred from the first user to a second user comprises:
  a transfer determining module configured to determine that the computing device has been transferred from the first user to the second user based, at least in part, on data provided by one or more sensors.

8. The system of claim 7, wherein said transfer determining module configured to determine that the computing device has been transferred from the first user to the second user based, at least in part, on data provided by one or more sensors, comprises:
  a transfer determining module configured to determine that the computing device has been transferred from the first user to the second user based, at least in part, on data provided by at least one of a movement sensor, an image capturing device, or an audio capturing device.

9. The system of claim 6, wherein said transfer determining module configured to determine that a computing device that was presenting one or more portions of one or more items and that was in possession of a first user has been transferred from the first user to a second user comprises:
  a transfer determining module including at least a particular movement detecting module configured to determine that the computing device has been transferred from the first user to the second user when the particular movement detecting module at least detects that the computing device has moved in a particular manner that when detected as occurring at least suggests that the computing device has been transferred between at least two users.

10. The system of claim 9, wherein said particular movement detecting module comprises:
  a particular movement detecting module including at least a tilt detecting module configured to detect that the computing device has moved in the particular manner when the tilt detecting module at least detects that the computing device is no longer in a particular tilt orientation that the computing device was detected as having when the computing device was in the possession of the first user.

11. The system of claim 10, wherein said tilt detecting module comprises:
  a tilt detecting module configured to detect that the computing device is no longer in a particular tilt orientation that the computing device was detected as having when the computing device was in the possession of the first user by at least detecting that the computing device has been reoriented from the particular tilt orientation to another tilt orientation that when detected at least suggests that the computing device has been transferred between at least two users.

12. The system of claim 10, wherein said tilt detecting module comprises:
  a tilt detecting module configured to detect that the computing device is no longer in a particular tilt orientation that the computing device was detected as having when the computing device was in the possession of the first user by at least detecting that the computing device has been reoriented from the particular tilt orientation to another tilt orientation having an angular tilt that is at least a predefined percentage different from an angular tilt associated with the particular tilt orientation that the computing device was detected as having when the computing device was in the possession of the first user.

13. The system of claim 9, wherein said particular movement detecting module comprises:
  a particular movement detecting module including at least a spatial location detecting module configured to detect that the computing device has moved in the particular manner when the spatial location detecting module at least detects that the computing device is no longer at a particular spatial location that the computing device was detected as being located at when the computing device was in the possession of the first user prior to said transfer.

14. The system of claim 13, wherein said spatial location detecting module comprises:
  a spatial location detecting module configured to detect that the computing device is no longer at the particular spatial location that the computing device was detected as being located at when the computing device was in the possession of the first user prior to said transfer by at least detecting that the computing device has been relocated from the particular spatial location to another spatial location that when detected at least suggests that the computing device has been transferred from the first user to the second user.

15. The system of claim 13, wherein said spatial location detecting module comprises:
a spatial location detecting module configured to detect that the computing device is no longer at a particular spatial location that the computing device was detected as being located at when the computing device was in the possession of the first user prior to said transfer by at least detecting that the computing device has been relocated from the particular spatial location to another spatial location that is at least a predefined distance away from the particular spatial location that the computing device was detected as being located at when the computing device was in the possession of the first user prior to said transfer.

16. The system of claim 9, wherein said particular movement detecting module comprises:
a particular movement detecting module including at least a spin rotation detecting module configured to detect that the computing device has moved in the particular manner when the spin rotation detecting module at least detects that the computing device has been spin rotated from a first orientation to a second orientation, the first orientation being an orientation associated with the computing device when the computing device was in the possession of the first user prior to said transfer.

17. The system of claim 9, wherein said particular movement detecting module comprises:
a particular movement detecting module including at least a moving away detecting module configured to detect that the computing device has moved in the particular manner when the moving away detecting module at least detects that the computing device has moved away from the first user.

18. The system of claim 9, wherein said particular movement detecting module comprises:
a particular movement detecting module including a three-dimensional movement detecting module configured to detect that the computing device has moved in the particular manner when the three-dimensional movement detecting module at least detects that the computing device has moved in a particular three-dimensional way that at least suggests that the computing device has been transferred between two users.

19. The system of claim 18, wherein said three-dimensional movement detecting module comprises:
a three-dimensional movement detecting module configured to detect that the computing device has moved in the particular three-dimensional way that at least suggests that the computing device has been transferred between two users by detecting that the computing device is exhibiting one or more three-dimensional movements that matches with one or more signature three-dimensional movements that when detected as occurring at least suggests transfer of the computing device between two users.

20. The system of claim 19, wherein said three-dimensional movement detecting module comprises:
a three-dimensional movement detecting module configured to detect that the computing device is exhibiting one or more three-dimensional movements that matches with the one or more signature three-dimensional movements by detecting that the computing device is exhibiting one or more three-dimensional movements that matches with one or more signature three-dimensional movements that is particularly associated with the first user and that when detected as occurring at least suggests transfer of the computing device from the first user to another user.

21. The system of claim 19, wherein said three-dimensional movement detecting module comprises:
a three-dimensional movement detecting module configured to detect that the computing device is exhibiting one or more three-dimensional movements that matches with the one or more signature three-dimensional movements by detecting that the computing device is exhibiting one or more three-dimensional movements that matches with one or more generic signature three-dimensional movements that is not particularly associated with the first user and that when detected as occurring at least suggests transfer of the computing device between two users.

22. The system of claim 6, wherein said transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggests transfer of the computing device between two users comprises:
a visual cue detecting module including at least a lighting change detecting module configured to detect the presence or absence of the one or more visual cues in the proximate vicinity of the computing device when the lighting change detecting module detects at least a change in lighting in the proximate vicinity of the computing device that when detected as occurring at least suggests that the computing device has at least moved.

23. The system of claim 6, wherein said transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggests transfer of the computing device between two users comprises:
a visual cue detecting module including at least a face detecting module configured to detect the presence or absence of the one or more visual cues in the proximate vicinity of the computing device when the face detecting module at least detects presence of at least one face in the proximate vicinity of the computing device not associated with the first user.

24. The system of claim 23, wherein said face detecting module comprises:
a face detecting module configured to detect the presence of the at least one face in the proximate vicinity of the computing device not associated with the first user by at least detecting presence of at least one face in the proximate vicinity of the computing device that is recognized as being associated with the second user.

25. The system of claim 6, wherein said transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggests transfer of the computing device between two users comprises:

a visual cue detecting module including at least an eye detecting module configured to detect the presence or absence of the one or more visual cues in the proximate vicinity of the computing device when the eye detecting module detects presence of at least one eye in the proximate vicinity of the computing device not associated with the first user.

26. The system of claim 6, wherein said transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggests transfer of the computing device between two users comprises:

a visual cue detecting module configured to detect the presence or absence of the one or more visual cues in the proximate vicinity of the computing device by at least detecting absence of one or more visual cues associated with the first user in the proximate vicinity of the computing device for at least a predefined period of time, the absence of the one or more visual cues for at least a predefined period of time being indicative of the first user not being in the proximate vicinity of the computing device.

27. The system of claim 26, wherein said visual cue detecting module comprises:

a visual cue detecting module including at least a face detecting module configured to detect the absence of the one or more visual cues associated with the first user in the proximate vicinity of the computing device when the face detecting module at least detects absence of a face associated with the first user in the proximate vicinity of the computing device.

28. The system of claim 26, wherein said visual cue detecting module comprises:

a visual cue detecting module including at least an eye detecting module configured to detect the absence of the one or more visual cues associated with the first user in the proximate vicinity of the computing device when the eye detecting module at least detects absence of one or more eyes associated with the first user in the proximate vicinity of the computing device.

29. The system of claim 6, wherein said transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggests transfer of the computing device between two users comprises:

a visual cue detecting module including at least a visual moving away detecting module configured to detect the presence or absence of the one or more visual cues in the proximate vicinity of the computing device when the visual moving away detecting module at least detects visually that the computing device has moved away from the first user.

30. The system of claim 6, wherein said transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggests transfer of the computing device between two users comprises:

a visual cue detecting module configured to detect the presence or absence of the one or more visual cues in the proximate vicinity of the computing device by at least detecting visually the presence or absence of the one or more visual cues in the proximate vicinity of the computing device and with respect to the specific orientation of the computing device.

31. The system of claim 30, wherein said visual cue detecting module comprises:

a visual cue detecting module configured to detect visually the presence or absence of the one or more visual cues in the proximate vicinity of the computing device and with respect to the specific orientation of the computing device by at least detecting visually the presence or absence of the one or more visual cues at one or more specific locations relative to a front-side of the computing device, the front-side of the computing device being a side of the computing device having a display device.

32. The system of claim 31, wherein said visual cue detecting module comprises:

a visual cue detecting module configured to detect visually the presence or absence of the one or more visual cues at the one or more specific locations relative to the front-side of the computing device by detecting visually at least disappearance of one or more features associated with the first user at the one or more specific locations relative to the front-side of the computing device.

33. The system of claim 6, wherein said transfer determining module configured to determine that a computing device that was presenting one or more portions of one or more items and that was in possession of a first user has been transferred from the first user to a second user comprises:

a transfer determining module including an audio cue detecting module configured to determine that the computing device has been transferred from the first user to the second user when the audio cue detecting module at least detects presence or absence of one or more audio cues in proximate vicinity of the computing device that when detected as occurring at least suggests transfer of the computing device between two users.

34. The system of claim 33, wherein said audio cue detecting module comprises:

an audio cue detecting module including at least a voice pattern detecting module configured to detect the presence or absence of the one or more audio cues in the proximate vicinity of the computing device when the voice pattern detecting module at least detects presence of at least one audio voice pattern not associated with the first user in the proximate vicinity of the computing device.

35. The system of claim 6, wherein said transfer determining module configured to determine that a computing device that was presenting one or more portions of one or more items and that was in possession of a first user has been transferred from the first user to a second user comprises:

a transfer determining module including at least a particular movement detecting module and a visual cue detecting module configured to determine that the computing device has been transferred from the first user to the second user when the particular movement detecting module detects that the computing device has moved in a particular manner and the visual cue detecting module detects presence or absence of one or more visual cues in proximate vicinity of the computing device.

36. The system of claim 6, wherein said transfer determining module configured to determine that a computing device that was presenting one or more portions of one or more items and that was in possession of a first user has been transferred from the first user to a second user comprises:
- a transfer determining module including at least a visual cue detecting module and an audio cue detecting module configured to determine that the computing device has been transferred from the first user to the second user when the visual cue detecting module detects presence or absence of one or more visual cues in the proximate vicinity of the computing device and when the audio cue detecting module detects presence or absence of one or more audio cues in proximate vicinity of the computing device.

37. The system of claim 6, wherein said marking module configured to mark the one or more portions of the one or more items to facilitate the computing device in returning to the one or more portions upon the computing device being at least transferred back to the first user comprises:
- a marking module including at least a memorializing module configured to mark the one or more portions of the one or more items by having the memorializing module memorialize the one or more portions of the one or more items.

38. The system of claim 6, wherein said marking module configured to mark the one or more portions of the one or more items to facilitate the computing device in returning to the one or more portions upon the computing device being at least transferred back to the first user comprises:
- a marking module including at least a memorializing module configured to mark the one or more portions of the one or more items by having the memorializing module memorialize state of the one or more items, the state of the one or more items being the state or states of the one or more items immediately prior to the transfer of the computing device from the first user to the second user.

39. The system of claim 38, wherein said memorializing module comprises:
- a memorializing module including at least an application state saving module configure to memorialize the state of the one or more items by having the application state saving module perform at least one of saving or recording the state of one or more applications, the state of the one or more applications being the state or states of the one or more applications immediately prior to the transfer of the computing device from the first user to the second user.

40. The system of claim 6, further comprising:
- a recalling module configured to recall the one or more portions of the one or more items by at least one of visually or audibly presenting the one or more portions of the one or more items via the computing device.

41. The system of claim 40, wherein said recalling module comprises:
- a recalling module including at least a retrieving module and a presenting module configured to recall the one or more portions of the one or more items by having the retrieving module retrieve from a memory at least the one or more portions of the one or more items and by having the presenting module present the retrieved one or more portions of the one or more items via the computing device.

42. The system of claim 40, wherein said recalling module comprises:
- a recalling module including at least a retrieving module and a presenting module configured to recall the one or more portions of the one or more items by having the retrieving module retrieve from one or more networks at least the one or more portions of the one or more items and by having the presenting module present the retrieved one or more portions of the one or more items via the computing device.

43. The system of claim 40, wherein said recalling module comprises:
- a recalling module configured to recall the one or more portions of the one or more items in response, at least in part, to determining by the transfer determining module that the computing device has been transferred back to the first user, the determination being based, at least in part, on one or more detected movements of the computing device.

44. The system of claim 40, wherein said recalling module comprises:
- a recalling module configured to recall the one or more portions of the one or more items in response, at least in part, to determining by the transfer determining module that the computing device has been transferred back to the first user, the determination being based, at least in part, on detected presence or absence of one or more visual cues in the proximate vicinity of the computing device.

45. The system of claim 40, wherein said recalling module comprises:
- a recalling module configured to recall the one or more portions of the one or more items in response, at least in part, to determining by the transfer determining module that the computing device has been transferred back to the first user, the determination being based, at least in part, on detected presence or absence of one or more audio cues in the proximate vicinity of the computing device.

46. The system of claim 40, wherein said recalling module comprises:
- a recalling module including at least a request receiving module configured to recall the one or more portions of the one or more items in response to determining by the transfer determining module that the computing device has been transferred back to the first user and in response to receiving by the request receiving module a request for the one or more portions of the one or more items to be presented.

47. The system of claim 6, wherein the visual cue detecting module including at least a face detecting module configured to detect the presence or absence of the one or more visual cues in the proximate vicinity of the computing device when the face detecting module at least detects presence of a first face associated with the first user and a second face associated with the second user in the proximate vicinity of the computing device, the second face being detected as being closer to the computing device than the first face comprises:
- a face detecting module configured to detect the presence of the first face associated with the first user and the second face associated with the second user during a transfer of the computing device from the first user to the second user, the transfer consuming a finite period of time.

48. The system of claim 47, wherein the face detecting module configured to detect the presence of the first face associated with the first user and the second face associated with the second user during a transfer of the computing device from the first user to the second user, the transfer consuming a finite period of time comprises:

a face detecting module configured to detect the first face at a first time associated with the transfer of the computing device from the first user to the second user and to detect the second face at a second time associated with the transfer of the computing device from the first user to the second user, the second time being later in time than the first time.

49. A computationally-implemented system, comprising:
circuitry for determining that a computing device that was presenting one or more portions of one or more items and that was in possession of a first user has been transferred from the first user to a second user, including at least:
 circuitry for determining that the computing device has been transferred from the first user to the second user based at least in part on a detection that the computing device has moved in a particular manner that when detected as occurring at least suggests that the computing device has been transferred between at least two users, including at least:
  circuitry for detecting that the computing device has moved in the particular manner based at least in part on a detection that the computing device is no longer vibrating in a manner that matches with a vibration pattern that the computing device was detected as having when the computing device was in the possession of the first user prior to said transfer; and
circuitry for marking the one or more portions of the one or more items to facilitate the computing device in returning to the one or more portions upon the computing device being at least transferred back to the first user, the circuitry for marking configured to be responsive at least in part to the circuitry for determining that a computing device that was presenting one or more portions of one or more items and that was in possession of a first user has been transferred from the first user to a second user.

50. An article of manufacture, comprising:
a non-transitory storage medium bearing at least:
one or more instructions for determining that a computing device that was presenting one or more portions of one or more items and that was in possession of a first user has been transferred from the first user to a second user, including at least:
 one or more instructions for determining that the computing device has been transferred from the first user to the second user based at least in part on a detection of presence or absence of one or more visual cues in proximate vicinity of the computing device that when detected as occurring at least suggests transfer of the computing device between two users, including at least:
  one or more instructions for detecting the presence or absence of the one or more visual cues in the proximate vicinity of the computing device based at least in part on a detection of presence of a first face associated with the first user and a second face associated with the second user in the proximate vicinity of the computing device, the second face being detected as being closer to the computing device than the first face; and
one or more instructions for marking, in response to said determining, the one or more portions of the one or more items to facilitate the computing device in returning to the one or more portions upon the computing device being at least transferred back to the first user.

\* \* \* \* \*